United States Patent
Hendry et al.

(10) Patent No.: US 12,120,328 B2
(45) Date of Patent: Oct. 15, 2024

(54) TRANSMISSION DEVICE OF POINT CLOUD DATA AND METHOD PERFORMED BY TRANSMISSION DEVICE, AND RECEPTION DEVICE OF POINT CLOUD DATA AND METHOD PERFORMED BY RECEPTION DEVICE

(71) Applicant: LG ELECTRONICS INC., Seoul (KR)

(72) Inventors: Hendry Hendry, Seoul (KR); Jong Yeul Suh, Seoul (KR); Jin Won Lee, Seoul (KR); Seung Hwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 75 days.

(21) Appl. No.: 17/855,472

(22) Filed: Jun. 30, 2022

(65) Prior Publication Data
US 2023/0014844 A1    Jan. 19, 2023

Related U.S. Application Data

(60) Provisional application No. 63/223,051, filed on Jul. 18, 2021, provisional application No. 63/219,360, (Continued)

(51) Int. Cl.
*H04N 19/31*    (2014.01)
*H04N 19/132*    (2014.01)
(Continued)

(52) U.S. Cl.
CPC .......... *H04N 19/31* (2014.11); *H04N 19/132* (2014.11); *H04N 19/136* (2014.11); *H04N 19/597* (2014.11)

(58) Field of Classification Search
None
See application file for complete search history.

(56) References Cited

U.S. PATENT DOCUMENTS

| 2015/0016547 A1 | 1/2015 | Tabatabai et al. |
| 2015/0103926 A1 | 4/2015 | Hannuksela |

(Continued)

FOREIGN PATENT DOCUMENTS

| KR | 1020210004885 A | 1/2021 |
| KR | 1020210057161 A | 5/2021 |
| WO | 2021123159 A1 | 6/2021 |

*Primary Examiner* — Christopher Braniff
(74) *Attorney, Agent, or Firm* — Bryan Cave Leighton Paisner LLP

(57) ABSTRACT

A transmission device of point cloud data and method performed by the transmission device, and a reception device and a method performed by the reception device are provided. A method performed by a reception device of point cloud data comprises acquiring geometry-based point cloud compression (G-PCC) file including the point cloud data, wherein the G-PCC file includes information on a sample group in which samples in the G-PCC file are grouped based on one or more temporal levels and wherein the G-PCC file further includes information on the temporal levels, and extracting one or more samples belonging to a target temporal level from the samples in the G-PCC file based on the information on the sample group and the information on the temporal levels.

14 Claims, 40 Drawing Sheets

Related U.S. Application Data filed on Jul. 8, 2021, provisional application No. 63/218,279, filed on Jul. 3, 2021.

(51) Int. Cl.
*H04N 19/136* (2014.01)
*H04N 19/597* (2014.01)
*H04N 19/70* (2014.01)

(56) References Cited

U.S. PATENT DOCUMENTS

| | | | |
|---|---|---|---|
| 2021/0235058 A1* | 7/2021 | Yip | H04N 13/194 |
| 2023/0059516 A1* | 2/2023 | Schwarz | H04N 21/816 |

* cited by examiner

FIG. 6
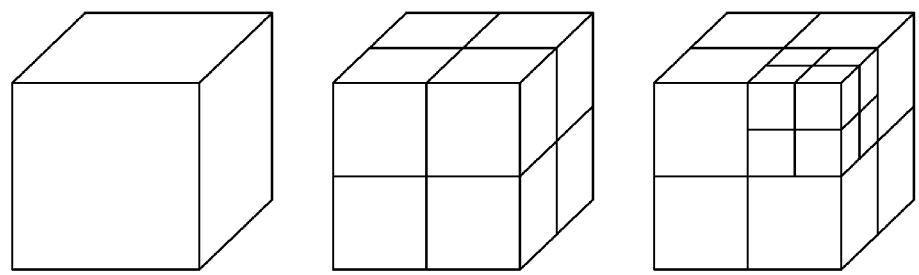
(a)
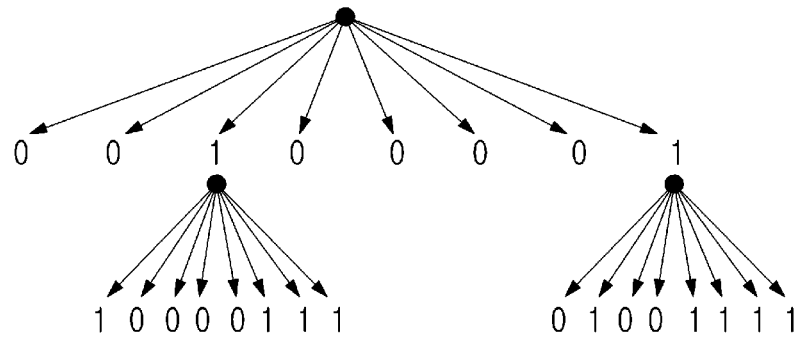
(b)

FIG. 7
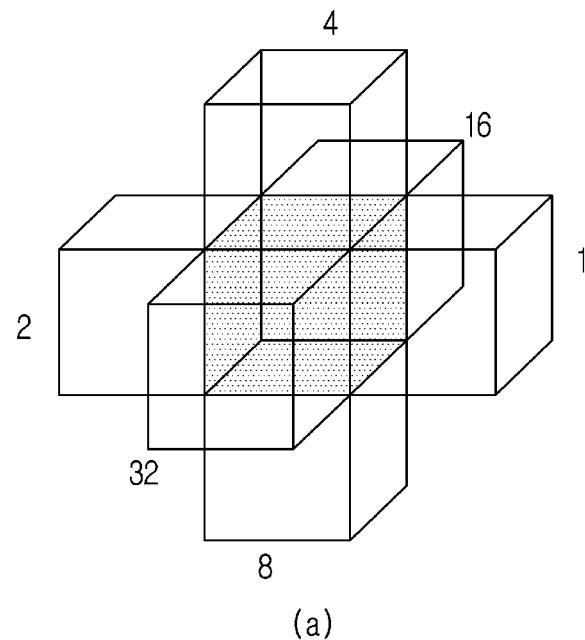
(a)
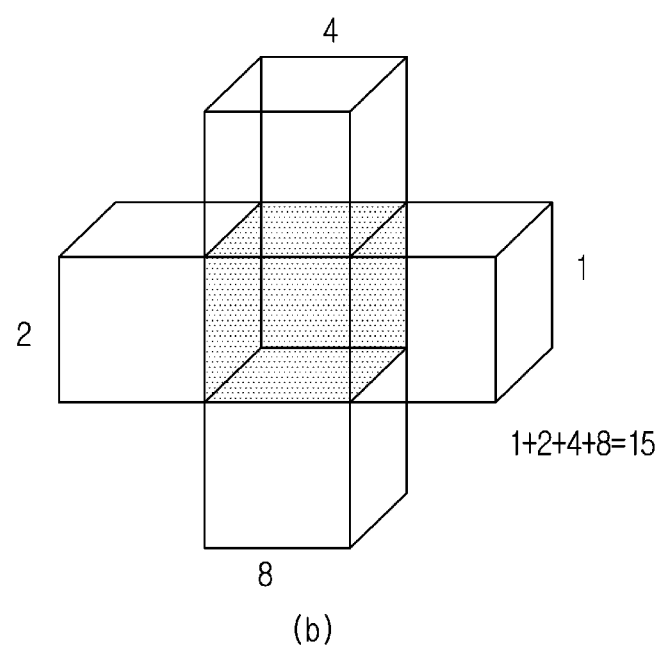
(b)

FIG. 21

| seq_parameter_set( ) { | Descriptor |
|---|---|
|   main_profile_compatibility_flag | u(1) |
|   unique_point_positions_constraint_flag | u(1) |
|   level_idc | u(8) |
|   sps_seq_parameter_set_id | ue(v) |
|   sps_bounding_box_present_flag | u(1) |
|   if( sps_bounding_box_present_flag ) { | |
|     sps_bounding_box_offset_x | se(v) |
|     sps_bounding_box_offset_y | se(v) |
|     sps_bounding_box_offset_z | se(v) |
|     sps_bounding_box_offset_log2_scale | ue(v) |
|     sps_bounding_box_size_width | ue(v) |
|     sps_bounding_box_size_height | ue(v) |
|     sps_bounding_box_size_depth | ue(v) |
|   } | |
|   sps_source_scale_factor_numerator_minus1 | ue(v) |
|   sps_source_scale_factor_denominator_minus1 | ue(v) |
|   sps_num_attribute_sets | ue(v) |
|   for( i = 0; i< sps_num_attribute_sets; i++ ) { | |
|     attribute_dimension_minus1[ i ] | ue(v) |
|     attribute_instance_id[ i ] | ue(v) |
|     if(attribute_dimension_minus1[ i ] > 0 ) | |
|     attribute_secondary_bitdepth_minus1[ i ] | ue(v) |
|     attribute_cicp_colour_primaries[ i ] | ue(v) |
|     attribute_cicp_transfer_characteristics[ i ] | ue(v) |
|     attribute_cicp_matrix_coeffs[ i ] | ue(v) |
|     attribute_cicp_video_full_range_flag[ i ] | u(1) |
|     known_attribute_label_flag[ i ] | u(1) |
|     if( known_attribute_label_flag[ i ] ) | |
|       known_attribute_label[ i ] | ue(v) |
|     else | |
|       attribute_label_four_bytes[ i ] | u(32) |
|   } | |
|   log2_max_frame_idx | u(5) |
|   axis_coding_order | u(3) |
|   sps_bypass_stream_enabled_flag | u(1) |
|   sps_extension_flag | u(1) |
|   if( sps_extension_flag ) | |
|     while( more_data_in_byte_stream( ) ) | |
|       sps_extension_data_flag | u(1) |
|   byte_alignment( ) | |
| } | |

FIG. 22a

| attribute_label_four_bytes[ i ] | Attribute type |
|---|---|
| 0 | Colour |
| 1 | Reflectance |
| 2 | Frame index |
| 3 | Material ID |
| 4 | Transparency |
| 5 | Normals |
| 6...255 | Reserved |
| 256...0xffffffff | unspecified |

FIG. 22b

| axis_coding_order | X | Y | Z |
|---|---|---|---|
| 0 | 2 | 1 | 0 |
| 1 | 0 | 1 | 2 |
| 2 | 0 | 2 | 1 |
| 3 | 2 | 0 | 1 |
| 4 | 2 | 1 | 0 |
| 5 | 1 | 2 | 0 |
| 6 | 1 | 0 | 2 |
| 7 | 0 | 1 | 2 |

FIG. 23

| geometry_parameter_set( ) { | Descriptor |
|---|---|
| gps_geom_parameter_set_id | ue(v) |
| gps_seq_parameter_set_id | ue(v) |
| gps_box_present_flag | u(1) |
| if( gps_box_present_flag ){ | |
| gps_gsh_box_log2_scale_present_flag | u(1) |
| if( gps_gsh_box_log2_scale_present_flag  ==  0 ) | |
| gps_gsh_box_log2_scale | ue(v) |
| } | |
| unique_geometry_points_flag | u(1) |
| geometry_planar_mode_flag | u(1) |
| if( geometry_planar_mode_flag ){ | |
| geom_planar_mode_th_idcm | ue(v) |
| geom_planar_mode_th[ 1 ] | ue(v) |
| geom_planar_mode_th[ 2 ] | ue(v) |
| } | |
| geometry_angular_mode_flag | u(1) |
| if( geometry_angular_mode_flag ){ | |
| lidar_head_position[0] | se(v) |
| lidar_head_position[1] | se(v) |
| lidar_head_position[2] | se(v) |
| number_lasers | ue(v) |
| for( i = 0; i < number_lasers; i++ ) { | |
| laser_angle[ i ] | se(v) |
| laser_correction[ i ] | se(v) |
| } | |
| planar_buffer_disabled | u(1) |
| implicit_qtbt_angular_max_node_min_dim_log2_to_split_z | se(v) |
| implicit_qtbt_angular_max_diff_to_split_z | se(v) |
| } | |
| neighbour_context_restriction_flag | u(1) |
| inferred_direct_coding_mode_enabled_flag | u(1) |
| bitwise_occupancy_coding_flag | u(1) |
| adjacent_child_contextualization_enabled_flag | u(1) |
| log2_neighbour_avail_boundary | ue(v) |
| log2_intra_pred_max_node_size | ue(v) |
| log2_trisoup_node_size | ue(v) |
| geom_scaling_enabled_flag | u(1) |
| if( geom_scaling_enabled_flag ) | |
| geom_base_qp | ue(v) |
| gps_implicit_geom_partition_flag | u(1) |
| if( gps_implicit_geom_partition_flag ) { | |
| gps_max_num_implicit_qtbt_before_ot | ue(v) |
| gps_min_size_implicit_qtbt | ue(v) |
| } | |
| gps_extension_flag | u(1) |
| if( gps_extension_flag ) | |
| while( more_data_in_byte_stream( ) ) | |
| gps_extension_data_flag | u(1) |
| byte_alignment( ) | |
| } | |

FIG. 24

| attribute_parameter_set( ) { | Descriptor |
|---|---|
|   aps_attr_parameter_set_id | ue(v) |
|   aps_seq_parameter_set_id | ue(v) |
|   attr_coding_type | ue(v) |
|   aps_attr_initial_qp | ue(v) |
|   aps_attr_chroma_qp_offset | se(v) |
|   aps_slice_qp_delta_present_flag | u(1) |
|   LodParametersPresent = ( attr_coding_type  ==  0 \|\| attr_coding_type ==  2 ) ? 1 : 0 | |
|   if( LodParametersPresent) { | |
|     lifting_num_pred_nearest_neighbours_minus1 | ue(v) |
|     lifting_search_range_minus1 | ue(v) |
|     for( k = 0; k < 3; k++ ) | |
|       lifting_neighbour_bias[ k ] | ue(v) |
|     if ( attr_coding_type  ==  2 ) | |
|       lifting_scalability_enabled_flag | u(1) |
|     if ( ! lifting_scalability_enabled_flag ) { | |
|       lifting_num_detail_levels_minus1<br>[Ed. The V7.0 code use the variable without minus1. It should be aligned] | ue(v) |
|       if ( lifting_num_detail_levels_minus1 > 0 ) { | |
|         lifting_lod_regular_sampling_enabled_flag | u(1) |
|         for( idx = 0; idx < num_detail_levels_minus1; idx++ ) { | |
|           if ( lifting_lod_regular_sampling_enabled_flag ) | |
|             lifting_sampling_period_minus2[ idx ] | ue(v) |
|           else | |
|             lifting_sampling_distance_squared_scale_minus1[ idx ] | ue(v) |
|           if ( idx != 0 ) | |
|             lifting_sampling_distance_squared_offset[ idx ] | ue(v) |
|         } | |
|       } | |
|     } | |
|     if( attr_coding_type  ==  0 ) { | |
|       lifting_adaptive_prediction_threshold | ue(v) |
|       lifting_intra_lod_prediction_num_layers | ue(v) |
|       lifting_max_num_direct_predictors | ue(v) |
|       inter_component_prediction_enabled_flag | u(1) |
|     } | |
|   } | |
|   if( attribute_coding_type  ==  1 ) { //RAHT | |
|     raht_prediction_enabled_flag | u(1) |
|     if (raht_prediction_enabled_flag) { | |
|       raht_prediction_threshold0 | ue(v) |
|       raht_prediction_threshold1 | ue(v) |
|     } | |
|   } | |
|   aps_extension_flag | u(1) |
|   if( aps_extension_flag ) | |
|     while( more_data_in_byte_stream( ) ) | |
|       aps_extension_data_flag | u(1) |
|   byte_alignment( ) | |
| } | |

FIG. 25

| attr_coding_type | coding type |
|---|---|
| 0 | Predicting Weight Lifting |
| 1 | Region Adaptive Hierarchical Transform (RAHT) |
| 2 | Fix Weight Lifting |

FIG. 26

| tile_inventory( ) { | Descriptor |
|---|---|
|   tile_frame_idx | tbu |
|   tile_seq_parameter_set_id | u(7) |
|   tile_id_present_flag | u(1) |
|   tile_cnt | u(16) |
|   tile_bounding_box_bits | u(8) |
|   for( tileIdx = 0; tileIdx < tile_cnt; tileIdx++ ) { | |
|     if( tile_id_present_flag ) | |
|       tile_id | ue(v) |
|     for( k = 0; k < 3; k++ ) | |
|       tile_bounding_box_offset_xyz[ tile_id ][ k ] | s(v) |
|     for( k = 0; k < 3; k++ ) | |
|       tile_bounding_box_size_xyz[ tile_id ][ k ] | u(v) |
|   } | |
|   for( k = 0; k < 3; k++ ) | |
|     tile_origin_xyz[ k ] | se(v) |
|   tile_origin_log2_scale | ue(v) |
|   byte_alignment( ) | |
| } | |

FIG. 27a

| general_geometry_slice_bitstream( ) { | Descriptor |
|---|---|
|     geometry_slice_header( ) | |
|     geometry_slice_data( ) | |
| } | |

FIG. 27b

| geometry_slice_header( ) { | Descriptor |
|---|---|
|     gsh_geometry_parameter_set_id | ue(v) |
|     gsh_tile_id | ue(v) |
|     gsh_slice_id | ue(v) |
|     frame_idx | u(n) |
|     gsh_num_points | u(24) |
|     if( gps_box_present_flag ) { | |
|         if( gps_gsh_box_log2_scale_present_flag ) | |
|             gsh_box_log2_scale | ue(v) |
|         gsh_box_origin_x | ue(v) |
|         gsh_box_origin_y | ue(v) |
|         gsh_box_origin_z | ue(v) |
|     } | |
|     if ( gps_implicit_geom_partition_flag ) { | |
|         gsh_log2_max_nodesize_x | ue(v) |
|         gsh_log2_max_nodesize_y_minus_x | se(v) |
|         gsh_log2_max_nodesize_z_minus_y | se(v) |
|     } else { | |
|         gsh_log2_max_nodesize | ue(v) |
|     } | |
|     if( geom_scaling_enabled_flag ) { | |
|         geom_slice_qp_offset | se(v) |
|         geom_octree_qp_offsets_enabled_flag | u(1) |
|         if( geom_octree_qp_offsets_enabled_flag ) | |
|             geom_octree_qp_offsets_depth | ue(v) |
|     } | |
|     byte_alignment( ) | |
| } | |

FIG. 28

| geometry_slice_data() { | Descriptor |
|---|---|
|   for( depth = 0; depth < MaxGeometryOctreeDepth; depth++) { | |
|     for( nodeIdx = 0; nodeIdx < NumNodesAtDepth[ depth ]; nodeIdx++) { | |
|       xN = NodeX[ depth ][ nodeIdx ] | |
|       yN = NodeY[ depth ][ nodeIdx ] | |
|       zN = NodeZ[ depth ][ nodeIdx ] | |
|       geometry_node( depth, nodeIdx, xN, yN, zN ) | |
|     } | |
|   } | |
|   if (log2_trisoup_node_size > 0) | |
|     geometry_trisoup_data() | |
| } | |

FIG. 29a

| general_attribute_slice_bitstream( ) { | Descriptor |
|---|---|
|    attribute_slice_header( ) | |
|    attribute_slice_data( ) | |
| } | |

FIG. 29b

| attribute_slice_header( ) { | Descriptor |
|---|---|
|   ash_attr_parameter_set_id | ue(v) |
|   ash_attr_sps_attr_idx | ue(v) |
|   ash_attr_geom_slice_id | ue(v) |
|   if ( aps_slice_qp_delta_present_flag ) { | |
|     ash_attr_qp_delta_luma | se(v) |
|     if( attribute_dimension_minus1[ ash_attr_sps_attr_idx ] > 0 ) | |
|       ash_attr_qp_delta_chroma | se(v) |
|   } | |
|   ash_attr_layer_qp_delta_present_flag | u(1) |
|   if ( ash_attr_layer_qp_delta_present_flag ) { | |
|     ash_attr_num_layer_qp_minus1 | ue(v) |
|     for( i = 0; i < NumLayerQp; i++ ){ | |
|       ash_attr_layer_qp_delta_luma[i] | se(v) |
|       if( attribute_dimension_minus1[ ash_attr_sps_attr_idx ] > 0 ) | |
|         ash_attr_layer_qp_delta_chroma[i] | se(v) |
|     } | |
|   } | |
|   ash_attr_region_qp_delta_present_flag | u(1) |
|   if ( ash_attr_region_qp_delta_present_flag ) { | |
|     ash_attr_qp_region_box_origin_x | ue(v) |
|     ash_attr_qp_region_box_origin_y | ue(v) |
|     ash_attr_qp_region_box_origin_z | ue(v) |
|     ash_attr_qp_region_box_width | ue(v) |
|     ash_attr_qp_region_box_height | ue(v) |
|     ash_attr_qp_region_box_depth | ue(v) |
|     ash_attr_region_qp_delta | se(v) |
|   } | |
|   byte_alignment( ) | |
| } | |

FIG. 30

| attribute_slice_data() { | Descriptor |
|---|---|
|     dimension = attribute_dimension[ ash_attr_sps_attr_idx] | |
|     zerorun | ae(v) |
|     for(i=0; i<pointCount; i++) { | |
|         if( attr_coding_type== 0 && <br>             maxPredDiff[i]> lifting_adaptive_prediction_threshold && <br>             MaxNumPredictors > 1) { | |
|             predIndex[i] | ae(v) |
|         } | |
|         if( zerorun > 0) { | |
|             for(k = 0; k < dimension; k++) | |
|                 values[k][i]=0 | |
|             zerorun -= 1 | |
|         } | |
|         else{ | |
|             attribute_coding(dimension, i) | ae(v) |
|             zerorun | ae(v) |
|         } | |
|     } | |
|     byte_alignment() | |
| } | |

FIG. 31

| metadata_slice_bitstream() { | Descriptor |
|---|---|
| metadata_slice_header() | |
| metadata_slice_data() | |
| } | |

(a)

| metadata_slice_header() { | Descriptor |
|---|---|
| msh_slice_id | ue(v) |
| msh_geom_slice_id | ue(v) |
| msh_attr_id | ue(v) |
| msh_attr_slice_id | ue(v) |
| } | |

(b)

| metadata_slice_data(){ | Descriptor |
|---|---|
| metadata_bitstream() | |
| } | |

| tlv_encapsulation( ) {                          | Descriptor |
|-------------------------------------------------|------------|
|    tlv_type                  | u(8)       |
|    tlv_num_payload_bytes     | u(32)      |
|    for( i = 0; i < tlv_num_payload_bytes; i++ ) |            |
|       tlv_payload_byte[ i ] | u(8)       |
| }                                               |            |

FIG. 33b

| tlv_type | Syntax table | Description |
|----------|--------------|-------------|
| 0 | 7.3.1.1 | Sequence parameter set |
| 1 | 7.3.1.2 | Geometry parameter set |
| 2 | 7.3.2.1 | Geometry data unit |
| 3 | 7.3.1.3 | Attribute parameter set |
| 4 | 7.3.3.1 | Attribute data unit |
| 5 | 7.3.2.2 | Tile inventory |
| 6 | 7.3.2.5 | Frame boundary marker |

FIG. 34
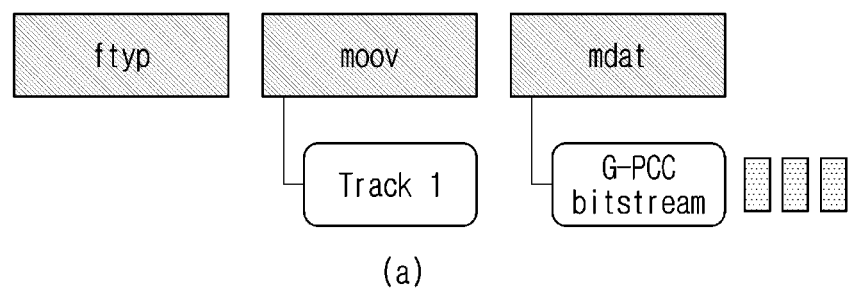
(a)
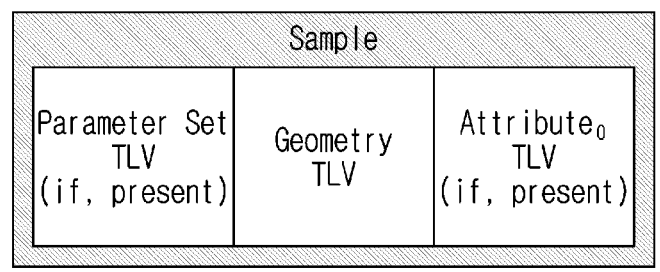
(b)

FIG. 35
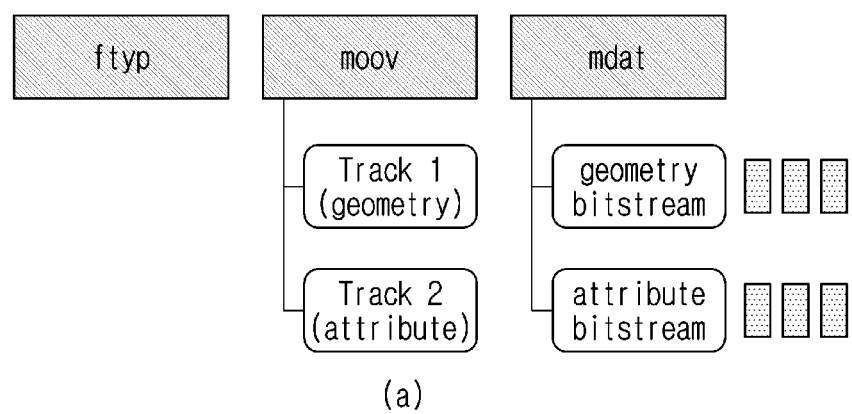
(a)
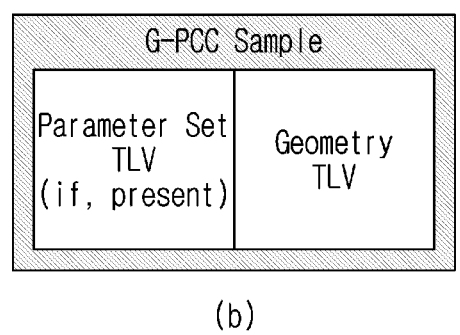
(b)

TRANSMISSION DEVICE OF POINT CLOUD DATA AND METHOD PERFORMED BY TRANSMISSION DEVICE, AND RECEPTION DEVICE OF POINT CLOUD DATA AND METHOD PERFORMED BY RECEPTION DEVICE

This application claims the benefit of and priority to U.S. Provisional Application No. 63/218,279, filed Jul. 3, 2021, U.S. Provisional Application No. 63/219,360, filed Jul. 8, 2021 and U.S. Provisional Application No. 63/223,051, filed Jul. 18, 2021, the disclosures of which are incorporated herein by reference.

TECHNICAL FIELD

The present disclosure relates to a method and device for processing point cloud content.

BACKGROUND ART

Point cloud content is expressed as a point cloud which is a set of points belonging to a coordinate system representing a three-dimensional space. The point cloud content may represent three-dimensional media and is used to provide various services such as virtual reality (VR), augmented reality (AR), mixed reality (MR) and self-driving services. Since tens of thousands to hundreds of thousands of point data are required to express point cloud content, a method of efficiently processing a vast amount of point data is required.

DISCLOSURE

Technical Problem

The present disclosure provides a device and method for efficiently processing point cloud data. The present disclosure provides a point cloud data processing method and device for solving latency and encoding/decoding complexity.

In addition, the present disclosure provides a device and methods for supporting temporal scalability in the carriage of geometry-based point cloud compressed data.

In addition, the present disclosure proposes a device and methods for efficiently storing a G-PCC bitstream in a single track in a file or divisionally storing it in a plurality of tracks and providing a point cloud content service providing signaling thereof.

In addition, the present disclosure proposes a device and methods for processing a file storage technique to support efficient access to a stored G-PCC bitstream.

The technical problems solved by the present disclosure are not limited to the above technical problems and other technical problems which are not described herein will become apparent to those skilled in the art from the following description.

Technical Solution

A method performed by a reception device of point cloud data according to an embodiment of the present disclosure may comprise acquiring geometry-based point cloud compression (G-PCC) file including the point cloud data, wherein the G-PCC file includes information on a sample group in which samples in the G-PCC file are grouped based on one or more temporal levels and wherein the G-PCC file further includes information on the temporal levels, and extracting one or more samples belonging to a target temporal level from the samples in the G-PCC file based on the information on the sample group and the information on the temporal levels.

A reception device of point cloud data according to another embodiment of the present disclosure may comprise a memory and at least one processor. The at least one processor may acquire geometry-based point cloud compression (G-PCC) file including the point cloud data, wherein the G-PCC file includes information on a sample group in which samples in the G-PCC file are grouped based on one or more temporal levels and wherein the G-PCC file further includes information on the temporal levels, and extract one or more samples belonging to a target temporal level from the samples in the G-PCC file, based on the information on the sample group and the information on the temporal levels.

A method performed by a transmission device of point cloud data according to another embodiment of the present disclosure may generating information on a sample group in which geometry-based point cloud compression (G-PCC) samples are grouped based on one or more temporal levels and generating a G-PCC file including the information on the sample group, the information on the temporal levels and the point cloud data.

A transmission device of point cloud data according to another embodiment of the present disclosure may comprise a memory and at least one processor. The at least one processor may generate information on a sample group in which geometry-based point cloud compression (G-PCC) samples are grouped based on one or more temporal levels and generate a G-PCC file including the information on the sample group, the information on the temporal levels and the point cloud data.

Advantageous Effects

The device and method according to embodiments of the present disclosure may process point cloud data with high efficiency.

The device and method according to embodiments of the present disclosure may provide a high-quality point cloud service.

The device and method according to embodiments of the present disclosure may provide point cloud content for providing universal services such as a VR service and a self-driving service.

The device and method according to embodiments of the present disclosure may provide temporal scalability for effectively accessing a desired component among G-PCC components.

The device and method according to the embodiments of the present disclosure may support temporal scalability, such that data may be manipulated at a high level consistent with a network function or a decoder function, and thus performance of a point cloud content provision system can be improved.

The device and method according to embodiments of the present disclosure may increase bit efficiency by reducing bits for signaling frame rate information.

The device and method according to embodiments of the present disclosure may enable smooth and gradual playback by reducing an increase in playback complexity.

DESCRIPTION OF DRAWINGS

FIG. 6 illustrates an example of an octree and occupancy code according to embodiments of the present disclosure.

FIG. 7 illustrates an example of a neighbor pattern according to embodiments of the present disclosure.

FIG. 21 illustrates an example of an SPS syntax structure according to embodiments of the present disclosure.

FIGS. 22a and 22b illustrate examples of indication of an attribute type and correspondence between position components according to embodiments of the present disclosure.

FIG. 23 illustrates an example of a GPS syntax structure according to embodiments of the present disclosure.

FIG. 24 illustrates an example of an APS syntax structure according to embodiments of the present disclosure.

FIG. 25 illustrates an example of an attribute coding type table according to embodiments of the present disclosure.

FIG. 26 illustrates an example of a tile inventory syntax structure according to embodiments of the present disclosure.

FIGS. 27a and 27b, and 28 illustrate an example of a geometry slice syntax structure according to embodiments of the present disclosure.

FIGS. 29a and 29b, and 30 illustrate an example of an attribute slice syntax structure according to embodiments of the present disclosure.

FIG. 31 illustrates a metadata slice syntax structure according to embodiments of the present disclosure.

FIGS. 33a and 33b illustrate an example of a TLV encapsulation syntax structure and a payload type according to embodiments of the present disclosure.

FIG. 34 illustrates an example of a file including a single track according to embodiments of the present disclosure.

FIG. 35 illustrates an example of a file including multiple tracks according to embodiments of the present disclosure.

MODE FOR INVENTION

Figure 1:
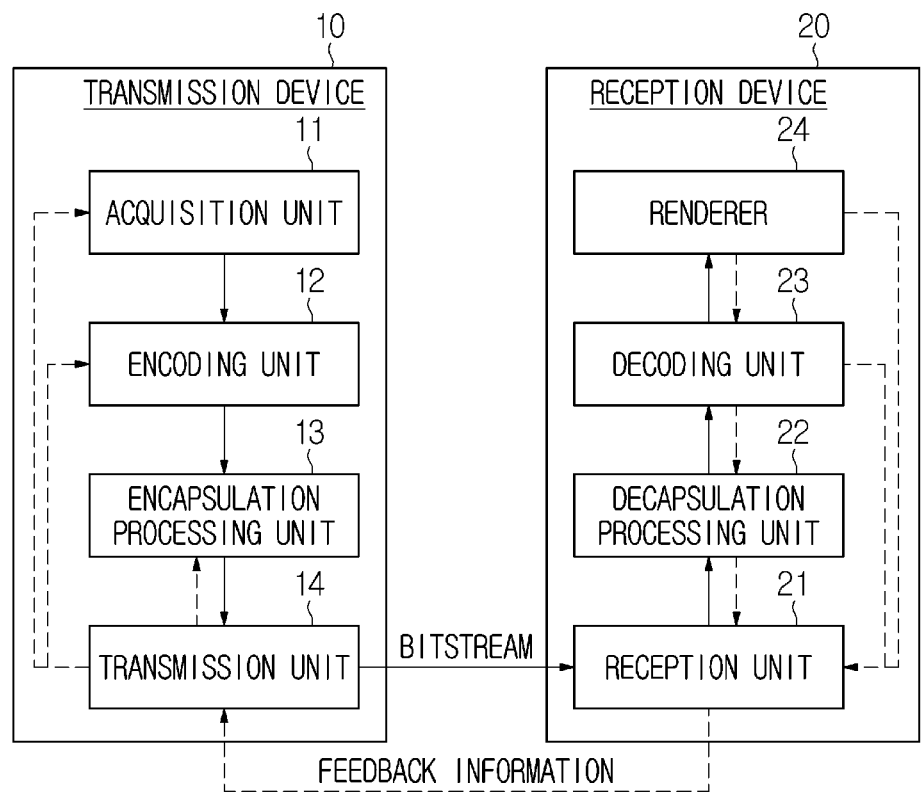
FIG. 1 is a block diagram illustrating an example of a system for providing point cloud content according to embodiments of the present disclosure.

Hereinafter, embodiments of the present disclosure will be described in detail with reference to the accompanying drawings so that those of ordinary skill in the art to which the present disclosure pertains can easily implement them. The present disclosure may be embodied in several different forms and is not limited to the embodiments described herein.

In describing the present disclosure, a detailed description of known functions and configurations will be omitted when it may obscure the subject matter of the present disclosure. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which another component exists in therebetween. In addition, when it is said that a component "includes" or "has" another component, this indicates that the other components are not excluded, but may be further included unless specially described.

In the present disclosure, terms such as first, second, etc. are used only for the purpose of distinguishing one component from other components, and, unless otherwise specified, the order or importance of the components is not limited. Accordingly, within the scope of the present disclosure, a first component in one embodiment may be referred to as a second component in another embodiment, and, similarly, a second component in one embodiment is referred to as a first component in another embodiment.

In the present disclosure, components that are distinguished from each other are for clearly explaining features thereof, and do not necessarily mean that the components are separated. That is, a plurality of components may be integrated to form one hardware or software unit, or one component may be distributed to form a plurality of hardware or software units. Accordingly, even if not specifically mentioned, such integrated or distributed embodiments are also included in the scope of the present disclosure.

In the present disclosure, components described in various embodiments do not necessarily mean essential components, and some thereof may be optional components. Accordingly, an embodiment composed of a subset of components described in one embodiment is also included in the scope of the present disclosure. In addition, embodiments including other components in addition to components described in various embodiments are also included in the scope of the present disclosure.

The present disclosure relates to encoding and decoding of point cloud-related data, and terms used in the present disclosure may have general meanings commonly used in the technical field to which the present disclosure belongs unless they are newly defined in the present disclosure.

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

The present disclosure relates to compression of point cloud-related data. Various methods or embodiments of the present disclosure may be applied to a point cloud compression or point cloud coding (PCC) standard (e.g., G-PCC or V-PCC standard) of a moving picture experts group (MPEG) or a next-generation video/image coding standard.

In the present disclosure, a "point cloud" may mean a set of points located in a three-dimensional space. Also, in the present disclosure, "point cloud content" is expressed as a point cloud, and may mean a "point cloud video/image". Hereinafter, the 'point cloud video/image' is referred to as a 'point cloud video'. A point cloud video may include one or more frames, and one frame may be a still image or a picture. Accordingly, the point cloud video may include a point cloud image/frame/picture, and may be referred to as any one of a "point cloud image", a "point cloud frame", and a "point cloud picture".

In the present disclosure, "point cloud data" may mean data or information related to each point in the point cloud. Point cloud data may include geometry and/or attribute. In addition, the point cloud data may further include metadata. The point cloud data may be referred to as "point cloud content data" or "point cloud video data" or the like. In addition, the point cloud data may be referred to as "point cloud content", "point cloud video", "G-PCC data", and the like.

In the present disclosure, a point cloud object corresponding to point cloud data may be represented in a box shape based on a coordinate system, and the box shape based on the coordinate system may be referred to as a bounding box. That is, the bounding box may be a rectangular cuboid capable of accommodating all points of the point cloud, and may be a cuboid including a source point cloud frame.

In the present disclosure, geometry includes the position (or position information) of each point, and the position may be expressed by parameters (e.g., for example, an x-axis value, a y-axis value, and a z-axis value) representing a three-dimensional coordinate system (e.g., a coordinate system consisting of an x-axis, y-axis, and z-axis). The geometry may be referred to as "geometric information".

In the present disclosure, the attribute may include properties of each point, and the properties may include one or more of texture information, color (RGB or YCbCr), reflectance (r), transparency, etc. of each point. The attribute may be referred to as "attribute information". Metadata may include various data related to acquisition in an acquisition process to be described later.

Overview of Point Cloud Content Provision System

Figure 2:
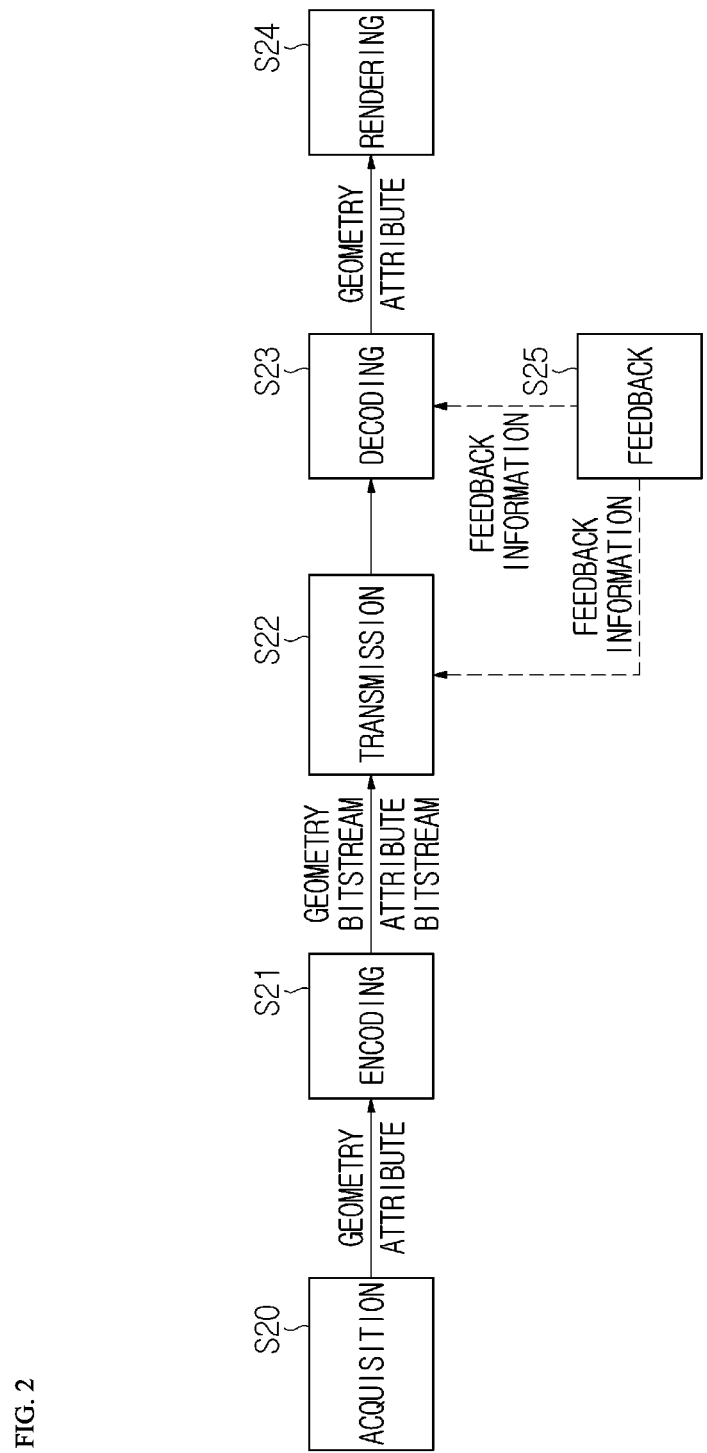
FIG. 2 is a block diagram illustrating an example of a process of providing point cloud content according to embodiments of the present disclosure.

FIG. 1 illustrates an example of a system for providing point cloud content (hereinafter, referred to as a 'point cloud content provision system') according to embodiments of the present disclosure. FIG. 2 illustrates an example of a process in which the point cloud content provision system provides point cloud content.

As shown in FIG. 1, the point cloud content provision system may include a transmission device 10 and a reception device 20. The point cloud content provision system may perform an acquisition process S20, an encoding process S21, a transmission process S22, a decoding process S23, a rendering process S24 and/or a feedback process S25 shown in FIG. 2 by operation of the transmission device 10 and the reception device 20.

The transmission device 10 acquires point cloud data and outputs a bitstream through a series of processes (e.g., encoding process) for the acquired point cloud data (source point cloud data), in order to provide point cloud content. Here, the point cloud data may be output in the form of a bitstream through an encoding process. In some embodiments, the transmission device 10 may transmit the output bitstream in the form of a file or streaming (streaming segment) to the reception device 20 through a digital storage medium or a network. The digital storage medium may include a variety of storage media such as USB, SD, CD, DVD, Blu-ray, HDD, and SSD. The reception device 20 may process (e.g., decode or reconstruct) the received data (e.g., encoded point cloud data) into source point cloud data and render it. The point cloud content may be provided to the user through these processes, and the present disclosure may provide various embodiments necessary to effectively perform a series of these processes.

As illustrated in FIG. 1, the transmission device 10 may include an acquisition unit 11, an encoding unit 12, an encapsulation processing unit 13 and a transmission unit 14, and the reception device 20 may include a reception unit 21, a decapsulation processing unit 22, a decoding unit 23, and a rendering unit 24.

The acquisition unit 11 may perform a process S20 of acquiring a point cloud video through a capturing, synthesizing or generating process. Accordingly, the acquisition unit 11 may be referred to as a 'point cloud video acquisition unit'.

Point cloud data (geometry and/or attribute, etc.) for a plurality of points may be generated by the acquisition process (S20). Also, through the acquisition process (S20), metadata related to the acquisition of the point cloud video may be generated. Also, mesh data (e.g., triangular data) indicating connection information between point clouds may be generated by the acquisition process (S20).

The metadata may include initial viewing orientation metadata. The initial viewing orientation metadata may indicate whether the point cloud data is data representing the front or the back. The metadata may be referred to as "auxiliary data" that is metadata for the point cloud.

The acquired point cloud video may include the polygon file format or the Stanford triangle format (PLY) file. Since the point cloud video has one or more frames, the acquired point cloud video may include one or more PLY files. The PLY file may include point cloud data of each point.

In order to acquire a point cloud video (or point cloud data), the acquisition unit 11 may be composed of a combination of camera equipment capable of acquiring depth (depth information) and RGB cameras capable of extracting color information corresponding to the depth information. Here, the camera equipment capable of acquiring the depth information may be a combination of an infrared pattern projector and an infrared camera. In addition, the acquisition unit 11 may be composed of a LiDAR, and the LiDAR may use a radar system for measuring the position coordinates of a reflector by measuring a time required for a laser pulse to be emitted and returned after being reflected.

The acquisition unit 110 may extract a shape of geometry composed of points in a three-dimensional space from the depth information, and may extract an attribute representing a color or reflection of each point from the RGB information.

Figure 3:
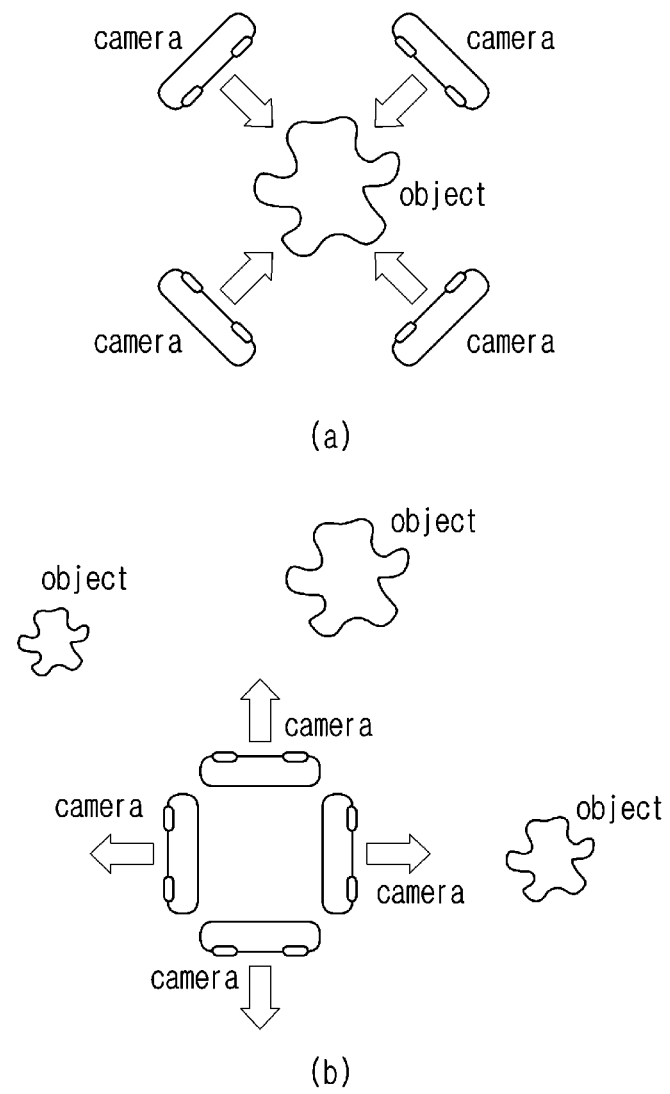
FIG. 3 illustrates an example of a process of acquiring a point cloud video according to embodiments of the present disclosure.

As a method of extracting (or capturing, acquiring, etc.) a point cloud video (or point cloud data), there may be an inward-facing method of capturing a central object and an outward-facing method of capturing an external environment. Examples of the inward-facing method and the outward-facing method are shown in FIG. 3. (a) of FIG. 3 shows an example of the inward-facing method and (b) of FIG. 3 shows an example of the outward-facing method.

As illustrated in (a) of FIG. 3, the inward-facing method may be used when configuring a current surrounding environment in a vehicle as point cloud content, such as in self-driving. As illustrated in (b) of FIG. 3, the outward-facing method may be used when configuring a core object such as characters, players, objects, actors, etc. in a VR/AR environment as point cloud content capable of being freely viewed by a user at 360 degrees. When configuring point cloud content through multiple cameras, in order to set a global coordinate system between cameras, a process of calibrating the camera may be performed before capturing the content. A method of synthesizing an arbitrary point cloud video based on the captured point cloud video may be utilized.

On the other hand, in the case of providing a point cloud video for a virtual space generated by a computer, capturing through a real camera may not be performed. In this case, post-processing to improve the quality of the captured point cloud content may be required. For example, in the acquisition process (S20), a maximum/minimum depth value may be adjusted within the range provided by the camera equipment, but post-processing to remove a unwanted area (e.g., background) or point data of the unwanted area or post-processing to recognize a connected space and fill a spatial hole may be performed. As another example, post-processing to integrate point cloud data extracted from cameras sharing a spatial coordinate system into single content through a transform process into a global coordinate system for each point based on the position coordinates of each camera may be performed. Through this, point cloud content in one wide range may be generated, or point cloud content having a high density of points may be acquired.

The encoding unit 12 may perform the encoding process (S21) of encoding the data (e.g., geometry, attribute and/or metadata, and/or mesh data, etc.) generated by the acquisition unit 11 into one or more bitstreams. Accordingly, the encoding unit 12 may be referred to as a 'point cloud video encoder'. The encoding unit 12 may encode the data generated by the acquisition unit 11 in series or in parallel.

The encoding process S21 performed by the encoding unit 12 may be geometry-based point cloud compression (G-PCC). The encoding unit 12 may perform a series of procedures such as prediction, transform, quantization, and entropy coding for compression and coding efficiency.

The encoded point cloud data may be output in the form of a bitstream. Based on the G-PCC procedure, the encoding unit 12 may partition the point cloud data into geometry and attribute and encode them as described below. In this case, the output bitstream may include a geometry bitstream including the encoded geometry and an attribute bitstream including the encoded attribute. In addition, the output bitstream may further include one or more of a metadata bitstream including metadata, an auxiliary bitstream including auxiliary data, and a mesh data bitstream including mesh data. The encoding process (S21) will be described in more detail below. A bitstream including the encoded point cloud data may be referred to as a 'point cloud bitstream' or a 'point cloud video bitstream'.

The encapsulation processing unit 13 may perform a process of encapsulating one or more bitstreams output from the decoding unit 12 in the form of a file or a segment. Accordingly, the encapsulation processing unit 13 may be referred to as a 'file/segment encapsulation module'. Although the drawing shows an example in which the encapsulation processing unit 13 is composed of a separate component/module in relation to the transmission unit 14, the encapsulation processing unit 13 may be included in the transmission unit 14 in some embodiments.

The encapsulation processing unit 13 may encapsulate the data in a file format such as ISO Base Media File Format (ISOBMFF) or process the data in the form of other DASH segments. In some embodiments, the encapsulation processing unit 13 may include metadata in a file format. Metadata may be included, for example, in boxes of various levels in the ISOBMFF file format, or as data in a separate track within the file. In some embodiments, the encapsulation processing unit 130 may encapsulate the metadata itself into a file. The metadata processed by the encapsulation processing unit 13 may be transmitted from a metadata processing unit not shown in the drawing. The metadata processing unit may be included in the encoding unit 12 or may be configured as a separate component/module.

The transmission unit 14 may perform the transmission process (S22) of applying processing (processing for transmission) according to a file format to the 'encapsulated point cloud bitstream'. The transmission unit 140 may transmit the bitstream or a file/segment including the bitstream to the reception unit 21 of the reception device 20 through a digital storage medium or a network. Accordingly, the transmission unit 14 may be referred to as a 'transmitter' or a 'communication module'.

The transmission unit 14 may process point cloud data according to an arbitrary transmission protocol. Here, 'processing the point cloud data according to the arbitrary transmission protocol' may be 'processing for transmission'. The processing for transmission may include processing for transmission through a broadcast network, processing for transmission through a broadband, and the like. In some embodiments, the transmission unit 14 may receive not only point cloud data but also metadata from the metadata processing unit, and may perform processing for transmission on the transmitted metadata. In some embodiments, the processing for transmission may be performed by the transmission processing unit, and the transmission processing unit may be included in the transmission unit 14 or configured as a component/module separate from the transmission unit 14.

The reception unit 21 may receive the bitstream transmitted by the transmission device 10 or a file/segment including the bitstream. Depending on the transmitted channel, the reception unit 21 may receive a bitstream or a file/segment including the bitstream through a broadcast network, or may receive a bitstream or a file/segment including the bitstream through a broadband. Alternatively, the reception unit 21 may receive a bitstream or a file/segment including the bitstream through a digital storage medium.

The reception unit 21 may perform processing according to a transmission protocol on the received bitstream or the file/segment including the bitstream. The reception unit 21 may perform a reverse process of transmission processing (processing for transmission) to correspond to processing for transmission performed by the transmission device 10. The reception unit 21 may transmit the encoded point cloud data among the received data to the decapsulation processing unit 22 and may transmit metadata to a metadata parsing unit. The metadata may be in the form of a signaling table. In some embodiments, the reverse process of the processing for transmission may be performed in the reception processing unit. Each of the reception processing unit, the decapsulation processing unit 22, and the metadata parsing unit may be included in the reception unit 21 or may be configured as a component/module separate from the reception unit 21.

The decapsulation processing unit 22 may decapsulate the point cloud data (i.e., a bitstream in a file format) in a file format received from the reception unit 21 or a reception processing unit. Accordingly, the decapsulation processing unit 22 may be referred to as a 'file/segment decapsulation module'.

The decapsulation processing unit 22 may acquire a point cloud bitstream or a metadata bitstream by decapsulating files according to ISOBMFF or the like. In some embodiments, metadata (metadata bitstream) may be included in the point cloud bitstream. The acquired point cloud bitstream may be transmitted to the decoding unit 23, and the acquired metadata bitstream may be transmitted to the metadata processing unit. The metadata processing unit may be included in the decoding unit 23 or may be configured as a separate component/module. The metadata obtained by the decapsulation processing unit 23 may be in the form of a box or track in a file format. If necessary, the decapsulation processing unit 23 may receive metadata required for decapsulation from the metadata processing unit. The metadata may be transmitted to the decoding unit 23 and used in the decoding process (S23), or may be transmitted to the rendering unit 24 and used in the rendering process (S24).

The decoding unit 23 may receive the bitstream and perform operation corresponding to the operation of the encoding unit 12, thereby performing the decoding process (S23) of decoding the point cloud bitstream (encoded point cloud data). Accordingly, the decoding unit 23 may be referred to as a 'point cloud video decoder'.

The decoding unit 23 may partition the point cloud data into geometry and attribute and decode them. For example, the decoding unit 23 may reconstruct (decode) geometry from a geometry bitstream included in the point cloud bitstream, and restore (decode) attribute based on the reconstructed geometry and an attribute bitstream included in the point cloud bitstream. A three-dimensional point cloud video/image may be reconstructed based on position information according to the reconstructed geometry and attribute (such as color or texture) according to the decoded attribute. The decoding process (S23) will be described in more detail below.

The rendering unit 24 may perform the rendering process S24 of rendering the reconstructed point cloud video. Accordingly, the rendering unit 24 may be referred to as a 'renderer'.

The rendering process S24 may refer to a process of rendering and displaying point cloud content in a 3D space. The rendering process S24 may perform rendering according to a desired rendering method based on the position information and attribute information of the points decoded through the decoding process.

The points of the point cloud content may be rendered in a vertex having a certain thickness, a cube having a specific minimum size centered at the vertex position, or a circle centered at the vertex position. The user may view whole or part of the rendered result through a VR/AR display or a general display. The rendered video may be displayed through the display unit. The user may view whole or part of the rendered result through a VR/AR display or a general display.

The feedback process S25 may include a process of transmitting various feedback information that may be acquired during the rendering process S24 or the display process to the transmission device 10 or to other components in the reception device 20. The feedback process S25 may be performed by one or more of the components included in the reception device 20 of FIG. 1 or may be performed by one or more of the components shown in FIGS. 10 and 11. In some embodiments, the feedback process S25 may be performed by a 'feedback unit' or a 'sensing/tracking unit'.

Interactivity for point cloud content consumption may be provided through the feedback process (S25). In some embodiments, in the feedback process S25, head orientation information, viewport information indicating an area currently being viewed by the user, and the like may be fed back. In some embodiments, the user may interact with those implemented in the VR/AR/MR/self-driving environment. In this case, information related to the interaction is transmitted from the transmission device 10 to a service provider in the feedback process S25. In some embodiments, the feedback process (S25) may not be performed.

The head orientation information may refer to information on the user's head position, angle, movement, and the like. Based on this information, information on an area currently being viewed by the user in the point cloud video, that is, viewport information, may be calculated.

The viewport information may be information on an area currently being viewed by the user in the point cloud video. A viewpoint is a point being viewed by the user in a point cloud video, and may mean a central point of the viewport area. That is, the viewport is an area centered on a viewpoint, and the size and shape of the area may be determined by the field of view (FOV). Through gaze analysis using viewport information, how the user consumes the point cloud video, which area of the point cloud video the user gazes at for how long, and the like may be checked. Gaze analysis may be performed at the receiving side (reception device) and transmitted to the transmitting side (transmission device) through a feedback channel. A device such as a VR/AR/MR display may extract a viewport area based on a user's head position/direction, a vertical or horizontal FOV supported by the device, and the like.

In some embodiments, the feedback information may be not only transmitted to the transmitting side (transmission device) but also consumed at the receiving side (reception device). That is, a decoding process, a rendering process, etc. of the receiving side (reception device) may be performed using the feedback information.

For example, the reception device 20 may preferentially decode and render only a point cloud video for the area currently being viewed by the user using the head orientation information and/or the viewport information. In addition, the reception unit 21 may receive all point cloud data or receive point cloud data indicated by the orientation information and/or viewport information based on the orientation information and/or viewport information. Also, the decapsulation processing unit 22 may decapsulate all point cloud data or decapsulate point cloud data indicated by the orientation information and/or viewport information based on the orientation information and/or viewport information. 15 Also, the decoding unit 23 may decode all point cloud data or decode point cloud data indicated by the orientation information and/or viewport information based on the orientation information and/or viewport information.

Overview of Point Cloud Encoding Apparatus

Figure 4:
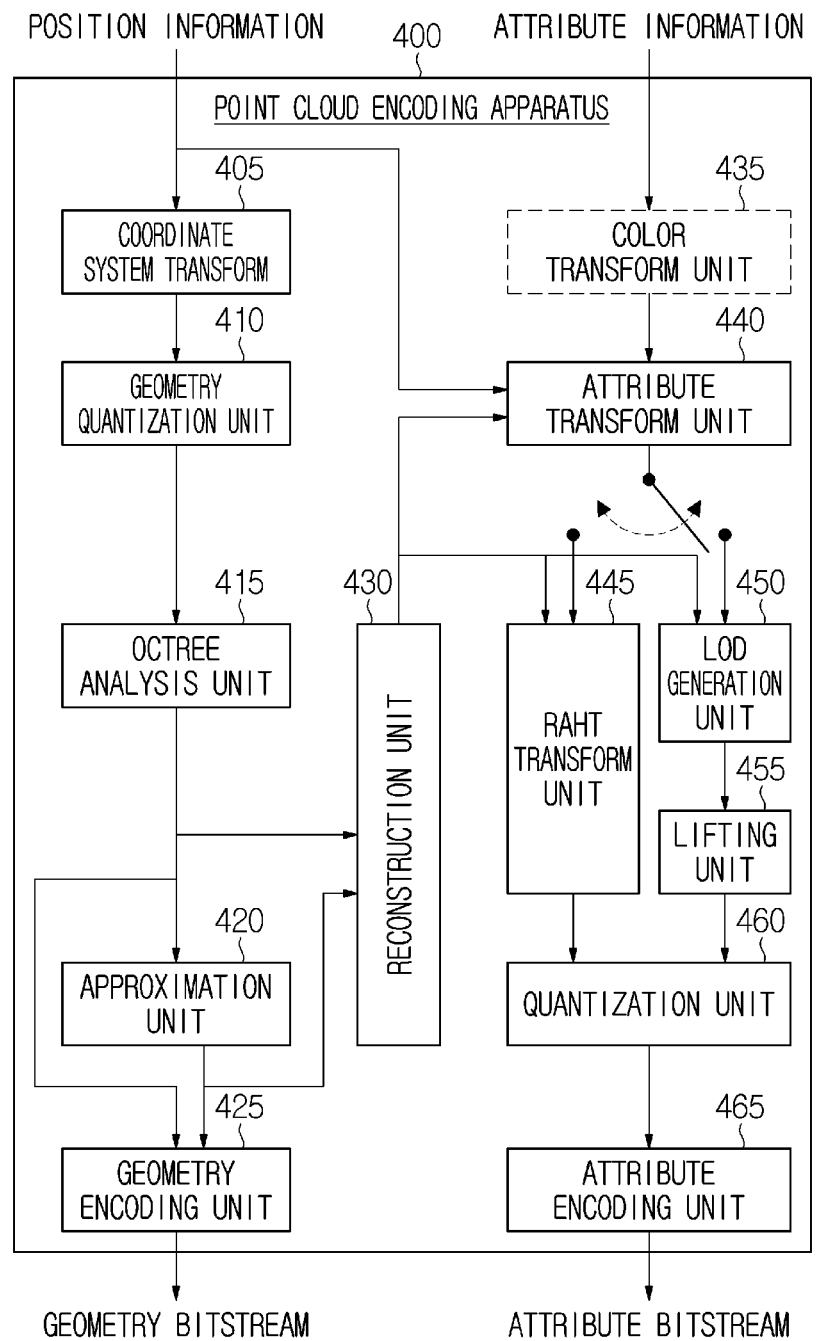
FIG. 4 illustrates an example of a point cloud encoding apparatus according to embodiments of the present disclosure.

FIG. 4 illustrates an example of a point cloud encoding apparatus 400 according to embodiments of the present disclosure. The point cloud encoding apparatus 400 of FIG. 4 may correspond to the encoding unit 12 of FIG. 1 in terms of the configuration and function.

As shown in FIG. 4, the point cloud encoding apparatus 400 may include a coordinate system transform unit 405, a geometry quantization unit 410, an octree analysis unit 415, an approximation unit 420, a geometry encoding unit 425, a reconstruction unit 430, and an attribute transform unit 440, a RAHT transform unit 445, an LOD generation unit 450, a lifting unit 455, an attribute quantization unit 460, an attribute encoding unit 465, and/or a color transform unit 435.

The point cloud data acquired by the acquisition unit 11 may undergo processes of adjusting the quality of the point cloud content (e.g., lossless, lossy, near-lossless) according to the network situation or application. In addition, each point of the acquired point cloud content may be transmitted without loss, but, in that case, real-time streaming may not be possible because the size of the point cloud content is large. Therefore, in order to provide the point cloud content smoothly, a process of reconstructing the point cloud content according to a maximum target bitrate is required.

Processes of adjusting the quality of the point cloud content may be processes of reconstructing and encoding the position information (position information included in the geometry information) or color information (color information included in the attribute information) of the points. A process of reconstructing and encoding position information of points may be referred to as geometry coding, and a process of reconstructing and encoding attribute information associated with each point may be referred to as attribute coding.

Geometry coding may include a geometry quantization process, a voxelization process, an octree analysis process, an approximation process, a geometry encoding process, and/or a coordinate system transform process. Also, geometry coding may further include a geometry reconstruction process. Attribute coding may include a color transform process, an attribute transform process, a prediction transform process, a lifting transform process, a RAHT transform process, an attribute quantization process, an attribute encoding process, and the like.

Geometry Coding

The coordinate system transform process may correspond to a process of transforming a coordinate system for positions of points. Therefore, the coordinate system transform process may be referred to as 'transform coordinates'. The coordinate system transform process may be performed by the coordinate system transform unit 405. For example, the coordinate system transform unit 405 may transform the positions of the points from the global space coordinate system to position information in a three-dimensional space (e.g., a three-dimensional space expressed in coordinate system of the X-axis, Y-axis, and Z-axis). Position information in the 3D space according to embodiments may be referred to as 'geometric information'.

The geometry quantization process may correspond to a process of quantizing the position information of points, and may be performed by the geometry quantization unit 410. For example, the geometry quantization unit 410 may find position information having minimum (x, y, z) values among the position information of the points, and subtract position information having the minimum (x, y, z) positions from the position information of each point. In addition, the geometry quantization unit 410 may multiply the subtracted value by a preset quantization scale value, and then adjust (lower or raise) the result to a near integer value, thereby performing the quantization process.

The voxelization process may correspond to a process of matching geometry information quantized through the quantization process to a specific voxel present in a 3D space. The voxelization process may also be performed by the geometry quantization unit 410. The geometry quantization unit 410 may perform octree-based voxelization based on position information of the points, in order to reconstruct each point to which the quantization process is applied.

Figure 5:
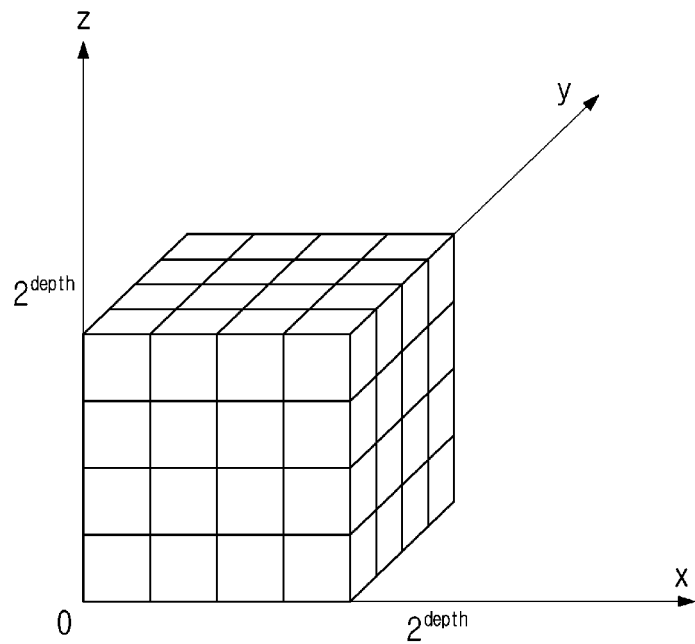
FIG. 5 illustrates an example of a voxel according to embodiments of the present disclosure.

An example of a voxel according to embodiments of the present disclosure is shown in FIG. 5. A voxel may mean a space for storing information on points present in 3D, similarly to a pixel, which is a minimum unit having information on a 2D image/video. The voxel is a hybrid word obtained by combining a volume and a pixel. As illustrated in FIG. 5, a voxel refers to a three-dimensional cubic space formed by partitioning a three-dimensional space (2depth, 2depth, 2depth) to become a unit (unit=1.0) based on each axis (x-axis, y-axis, and z-axis). The voxel may estimate spatial coordinates from a positional relationship with a voxel group, and may have color or reflectance information similarly to a pixel.

Only one point may not exist (match) in one voxel. That is, information related to a plurality of points may exist in one voxel. Alternatively, information related to a plurality of points included in one voxel may be integrated into one point information. Such adjustment can be performed selectively. When one voxel is integrated and expressed as one point information, the position value of the center point of the voxel may be set based on the position values of points existing in the voxel, and an attribute transform process related thereto needs to be performed. For example, the attribute transform process may be adjusted to the position value of points included in the voxel or the center point of the voxel, and the average value of the color or reflectance of neighbor points within a specific radius.

The octree analysis unit 415 may use an octree to efficiently manage the area/position of the voxel. An example of an octree according to embodiments of the present disclosure is shown in (a) of FIG. 6. In order to efficiently manage the space of a two-dimensional image, if the entire space is partitioned based on the x-axis and y-axis, four spaces are created, and, when each of the four spaces is partitioned based on the x-axis and y-axis, four spaces are created for each small space. An area may be partitioned until a leaf node becomes a pixel, and a quadtree may be used as a data structure for efficient management according to the size and position of the area.

Likewise, the present disclosure may apply the same method to efficiently manage a 3D space according to the position and size of the space. However, as shown in the middle of (a) of FIG. 6, since the z-axis is added, 8 spaces may be created when the three-dimensional space is partitioned based on the x-axis, the y-axis, and the z-axis. In addition, as shown on the right side of (a) of FIG. 6, when each of the eight spaces is partitioned again based on the x-axis, the y-axis, and the z-axis, eight spaces may be created for each small space.

The octree analysis unit 415 may partition the area until the leaf node becomes a voxel, and may use an octree data structure capable of managing eight children node areas for efficient management according to the size and position of the area.

Since voxels reflecting the positions of points are managed using the octree, the total volume of the octree shall be set to (0,0,0) to (2d, 2d, 2d). 2d is set to a value constituting the smallest bounding box surrounding all points of the point cloud, and d is the depth of the octree. The equation for calculating the d value may be the same as in Equation 1 below, where $(x_n^{int}, y_n^{int}, z_n^{int})$ is the position value of the points to which the quantization process is applied.

$$d = \text{Ceil}(\text{Log2}(\text{Max}(x_n^{int}, y_n^{int}, z_n^{int}, n=1, \ldots, N)+1)) \quad \text{[Equation 1]}$$

The octree may be expressed as an occupancy code, and an example of the occupancy code according to embodiments of the present disclosure is shown in (b) of FIG. 6. The octree analysis unit 415 may express the occupancy code of the node as 1 when a point is included in each node and express the occupancy code of the node as 0 when the point is not included.

Each node may have an 8-bit bitmap indicating occupancy of the 8 children nodes. For example, since the occupancy code of node corresponding to the second depth (1-depth) of (b) of FIG. 6 is 00100001, spaces (voxels or areas) corresponding to the third node and the eighth node may include at least one point. Also, since the occupancy code of the children nodes (leaf nodes) of the third node is 10000111, spaces corresponding to the first leaf node, the sixth leaf node, the seventh leaf node, and the eighth leaf node among the leaf nodes may include at least one point. In addition, since the occupancy code of the children nodes (leaf nodes) of the eighth node is 01001111, spaces corresponding to the second leaf node, the fifth leaf node, the sixth leaf node, the seventh leaf node, and the eighth leaf among the leaf nodes may include at least one point.

The geometry encoding process may correspond to a process of performing entropy coding on the occupancy code. The geometry encoding process may be performed by the geometry encoding unit 425. The geometry encoding unit 425 may perform entropy coding on the occupancy code. The generated occupancy code may be immediately encoded or may be encoded through an intra/inter coding process to increase compression efficiency. The reception device 20 may reconstruct the octree through the occupancy code.

On the other hand, in the case of a specific area having no points or very few points, it may be inefficient to voxelize all areas. That is, since there are few points in a specific area, it may not be necessary to construct the entire octree. For this case, an early termination method may be required.

The point cloud encoding apparatus 400 may directly transmit the positions of points only for the specific area, or reconfigure positions of points within the specific area based on the voxel using a surface model, instead of partitioning a node (specific node) corresponding to this specific area into 8 sub-nodes (children nodes) for the specific area (a specific area that does not correspond to a leaf node).

A mode for directly transmitting the position of each point for a specific node may be a direct mode. The point cloud encoding apparatus 400 may check whether conditions for enabling the direct mode are satisfied.

The conditions for enabling the direct mode are: 1) the option to use the direct mode shall be enabled, 2) the specific node does not correspond to a leaf node, and 3) points below a threshold shall exist within the specific node, and 4) the total number of points to be directly transmitted does not exceed a limit value.

When all of the above conditions are satisfied, the point cloud encoding apparatus 400 may entropy-code and transmit the position value of the point directly for the specific node through the geometry encoding unit 425.

A mode in which a position of a point in a specific area is reconstructed based on a voxel using a surface model may be a trisoup mode. The trisoup mode may be performed by the approximation unit 420. The approximation unit 420 may determine a specific level of the octree and reconstruct the positions of points in the node area based on the voxel using the surface model from the determined specific level.

The point cloud encoding apparatus 400 may selectively apply the trisoup mode. Specifically, the point cloud encoding apparatus 400 may designate a level (specific level) to which the trisoup mode is applied, when the trisoup mode is used. For example, when the specified specific level is equal to the depth (d) of the octree, the trisoup mode may not be applied. That is, the designated specific level shall be less than the depth value of the octree.

A three-dimensional cubic area of nodes of the designated specific level is called a block, and one block may include one or more voxels. A block or voxel may correspond to a brick. Each block may have 12 edges, and the approximation unit 420 may check whether each edge is adjacent to an occupied voxel having a point. Each edge may be adjacent to several occupied voxels. A specific position of an edge adjacent to a voxel is called a vertex, and, when a plurality of occupied voxels are adjacent to one edge, the approximation unit 420 may determine an average position of the positions as a vertex.

The point cloud encoding apparatus 400 may entropy-code the starting points (x, y, z) of the edge, the direction vector ($\Delta x$, $\Delta y$, $\Delta z$) of the edge and position value of the vertex (relative position values within the edge) through the geometry encoding unit 425, when a vertex is present.

The geometry reconstruction process may correspond to a process of generating a reconstructed geometry by reconstructing an octree and/or an approximated octree. The geometry reconstruction process may be performed by the reconstruction unit 430. The reconstruction unit 430 may perform a geometry reconstruction process through triangle reconstruction, up-sampling, voxelization, and the like.

When the trisoup mode is applied in the approximation unit 420, the reconstruction unit 430 may reconstruct a triangle based on the starting point of the edge, the direction vector of the edge and the position value of the vertex. To this end, the reconstruction unit 430 may calculate the centroid value $$\begin{bmatrix} \mu_x \\ \mu_y \\ \mu_z \end{bmatrix}$$

of each vertex as shown in Equation 2 below, subtract the centroid value from the value $$\begin{bmatrix} x_i \\ y_i \\ z_i \end{bmatrix}$$

of each vertex as shown in Equation 3 below to derive a subtracted value $$\begin{bmatrix} \bar{x}_i \\ \bar{y}_i \\ \bar{z}_i \end{bmatrix},$$

and then derive a value $$\begin{bmatrix} \sigma_x^2 \\ \sigma_y^2 \\ \sigma_z^2 \end{bmatrix}$$

obtained by adding all squares of the subtracted values as shown in Equation 4 below.

$$\begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix} \quad \text{[Equation 2]}$$

$$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix} \quad \text{[Equation 3]}$$

$$\begin{bmatrix} \sigma_x^2 \\ \sigma_y^2 \\ \sigma_z^2 \end{bmatrix} = \sum_{i=1}^{n} \begin{bmatrix} \bar{x}_i^2 \\ \bar{y}_i^2 \\ \bar{z}_i^2 \end{bmatrix} \quad \text{[Equation 4]}$$

Also, the reconstruction unit 430 may obtain a minimum value of the added value, and may perform a projection process along an axis having the minimum value.

For example, when an x element is smallest, the reconstruction unit 430 may project each vertex along the x-axis based on the center of the block and project them in the (y, z) plane. In addition, the reconstruction unit 430 may obtain a θ value through atan2(bi, ai) when the value derived by projecting the vertices onto the (y, z) plane is (ai, bi), and align the vertices based on the θ value.

A method of reconstructing a triangle according to the number of vertices may generate triangles by combining them as shown in Table 1 below according to the aligned order. For example, if there are 4 vertices (n=4), two triangles (1, 2, 3) and (3, 4, 1) may be formed. The first triangle (1, 2, 3) may consist of the first, second and third vertices from the aligned vertices, the second triangle (3, 4, 1) may consist of the third, fourth and first vertices.

TABLE 1

Triangles formed from vertices ordered 1, . . . , n

| n | Triangles |
|---|---|
| 3 | (1, 2, 3) |
| 4 | (1, 2, 3), (3, 4, 1) |
| 5 | (1, 2, 3), (3, 4, 5), (5, 1, 3) |

TABLE 1-continued

Triangles formed from vertices ordered 1, . . . , n

| n | Triangles |
|---|---|
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The reconstruction unit 430 may perform an upsampling process for voxelization by adding points in the middle along the edge of the triangle. The reconstruction unit 430 may generate additional points based on an up sampling factor and the width of the block. These points may be called refined vertices. The reconstruction unit 430 may voxel the refined vertices, and the point cloud encoding apparatus 400 may perform attribute coding based on the voxelized position value.

In some embodiments, the geometry encoding unit 425 may increase compression efficiency by applying context adaptive arithmetic coding. The geometry encoding unit 425 may directly entropy-code the occupancy code using the arithmetic code. In some embodiments, the geometry encoding unit 425 adaptively performs encoding based on occupancy of neighbor nodes (intra coding), or adaptively performs encoding based on the occupancy code of a previous frame (inter-coding). Here, the frame may mean a set of point cloud data generated at the same time. Intra coding and inter coding are optional processes and thus may be omitted.

Compression efficiency may vary depending on how many neighbor nodes are referenced, and when the bit is large, the encoding process becomes more complicated, but the compression efficiency may be increased by biasing it to one side. For example, in case of having 3-bit context, coding may be performed by partitioning it into 23=8. Since the partitioned and coded part may affect implementation complexity, it is necessary to adjust an appropriate level of complexity and compression efficiency.

In the case of intra coding, the geometry encoding unit 425 may first obtain a value of a neighbor pattern using occupancy of the neighbor nodes. An example of a neighbor pattern is shown in FIG. 7.

(a) of FIG. 7 shows a cube corresponding to a node (a cube located in the center) and six cubes (neighbor nodes) sharing at least one surface with the cube. The nodes shown in the figure are nodes of the same depth. The numbers shown in the figure represent the weights (1, 2, 4, 8, 16, 32, etc.) respectively associated with the six nodes. Each weight is sequentially given according to the positions of neighbor nodes.

(b) of FIG. 7 shows neighbor pattern values. The neighbor pattern value is the sum of values multiplied by the weight of the occupied neighbor node (a neighbor node having a point). Accordingly, the neighbor pattern value may have a value ranging from 0 to 63. When the neighbor pattern value is 0, it indicates that there is no node (occupied node) having a point among the neighbor nodes of the node. When the neighbor pattern value is 63, it indicates that the neighbor nodes are all occupied nodes. In (b) of FIG. 7, since neighbor nodes to which weights 1, 2, 4, and 8 are given are occupied nodes, the neighbor pattern value is 15, which is the sum of 1, 2, 4, and 8.

The geometry encoding unit 425 may perform coding according to a neighbor pattern value. For example, when the neighbor pattern value is 63, the geometry encoding unit 425 may perform 64 types of coding. In some embodiments, the geometry encoding unit 425 may reduce coding complexity by changing the neighbor pattern value, and, for example, the change of the neighbor pattern value may be performed based on a table that changes 64 to 10 or 6.

Attribute Coding

Attribute coding may correspond to a process of coding attribute information based on reconstructed geometry and geometry before coordinate system transform (source geometry). Since the attribute may be dependent on the geometry, the reconstructed geometry may be utilized for attribute coding.

As described above, the attribute may include color, reflectance, and the like. The same attribute coding method may be applied to information or parameters included in the attribute. Color has three elements, reflectance has one element, and each element can be processed independently.

Attribute coding may include a color transform process, an attribute transform process, a prediction transform process, a lifting transform process, a RAHT transform process, an attribute quantization process, an attribute encoding process, and the like. The prediction transform process, the lifting transform process, and the RAHT transform process may be selectively used, or a combination of one or more thereof may be used.

The color transform process may correspond to a process of transforming the format of the color in the attribute into another format. The color transform process may be performed by the color transform unit 435. That is, the color transform unit 435 may transform the color in the attribute. For example, the color transform unit 435 may perform a coding operation for transforming the color in the attribute from RGB to YCbCr. In some embodiments, the operation of the color transform unit 435, that is, the color transform process, may be optionally applied according to a color value included in the attribute.

As described above, when one or more points exist in one voxel, position values for points existing in the voxel are set to the center point of the voxel in order to display them by integrating them into one point information for the voxel. Accordingly, a process of transforming the values of attributes related to the points may be required. Also, even when the trisoup mode is performed, the attribute transform process may be performed.

The attribute transform process may correspond to a process of transforming the attribute based on a position on which geometry coding is not performed and/or reconstructed geometry. For example, the attribute transform process may correspond to a process of transforming the attribute having a point of the position based on the position of a point included in a voxel. The attribute transform process may be performed by the attribute transform unit 440.

The attribute transform unit 440 may calculate the central position value of the voxel and an average value of the attribute values of neighbor points within a specific radius. Alternatively, the attribute transform unit 440 may apply a weight according to a distance from the central position to the attribute values and calculate an average value of the attribute values to which the weight is applied. In this case, each voxel has a position and a calculated attribute value.

When searching for neighbor points existing within a specific location or radius, a K-D tree or a Morton code may be utilized. The K-D tree is a binary search tree, and supports a data structure capable of managing points based on the position so that a nearest neighbor search (NNS) is quickly performed. The Morton code may be generated by mixing bits of 3D position information (x, y, z) for all points. For example, when (x, y, z) is (5, 9, 1), and (5, 9, 1) is expressed as a bit, it becomes (0101, 1001, 0001), and when this value is mixed in order of z, y and x according to the bit index, it becomes 010001000111, and this value becomes 1095. That is, 1095 becomes the Morton code value of (5, 9, 1). The points are aligned based on the Morton code and the nearest neighbor search (NNS) may be possible through a depth-first traversal process.

After the attribute transform process, there may be a case in which a nearest neighbor search (NNS) is required even in another transform process for attribute coding. In this case, a K-D tree or a Morton code may be utilized.

The prediction transform process may correspond to a process of predicting an attribute value of a current point based on attribute values of one or more points (neighbor points) adjacent to the current point (a point corresponding to a prediction target). The prediction transform process may be performed by a level-of-detail (LOD) generation unit 450.

Prediction transform is a method to which the LOD transform technique is applied, and the LOD generation unit 450 may calculate and set the LOD value of each point based on the LOD distance value of each point.

Figure 8:
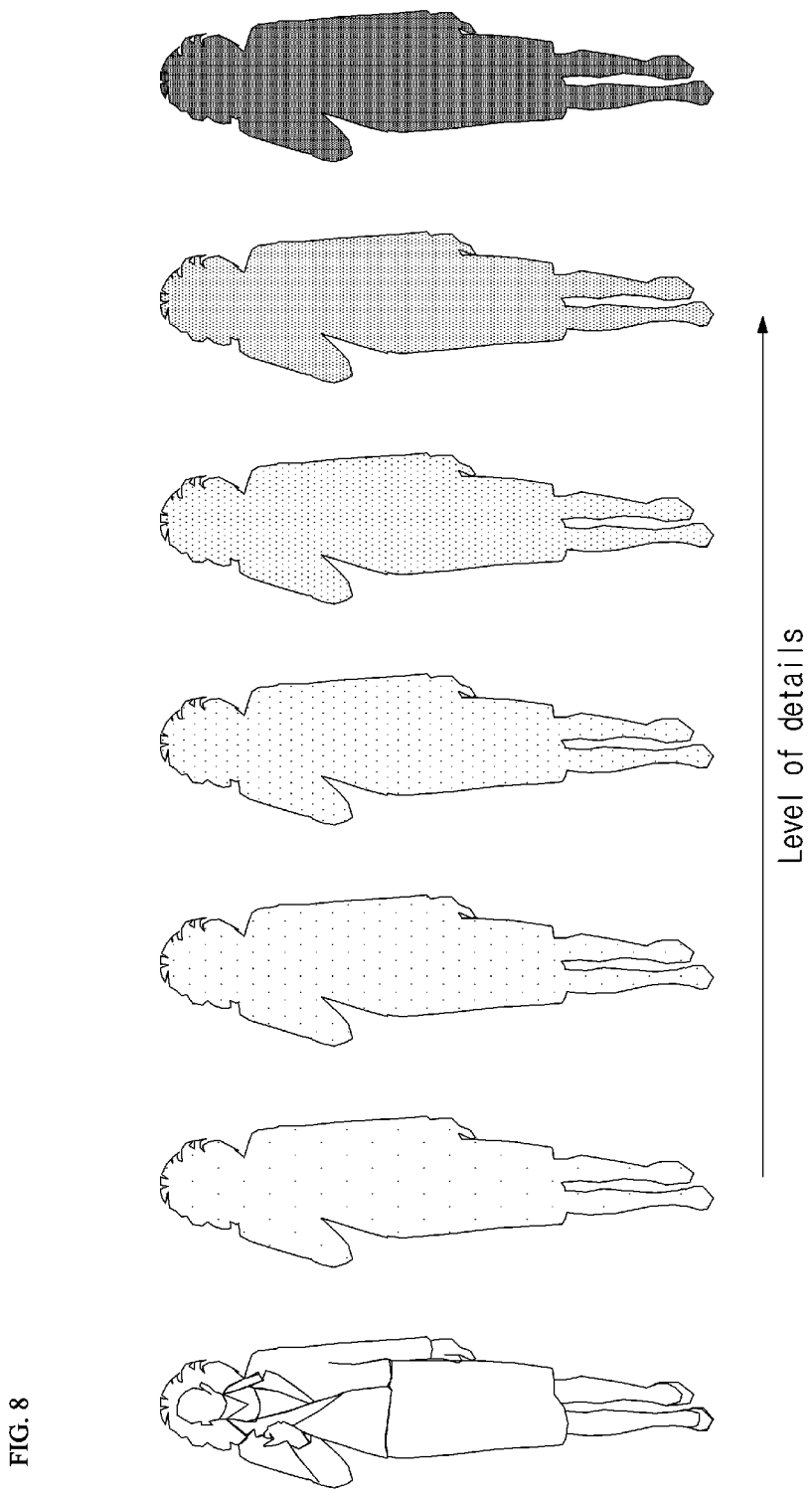
FIG. 8 illustrates an example of a configuration of points according to an LOD distance value according to embodiments of the present disclosure.

An example of the configuration of points according to the LOD distance value is shown in FIG. 8. In FIG. 8, based on the direction of the arrow, the first figure represents original point cloud content, the second figure represents the distribution of points of the lowest LOD, and the seventh figure represents the distribution of points of the highest LOD. As illustrated in FIG. 8, the points of the lowest LOD may be sparsely distributed, and the points of the highest LOD may be densely distributed. That is, as the LOD increases, the interval (or distance) between points may become shorter.

Each point existing in the point cloud may be separated for each LOD, and the configuration of the points for each LOD may include points belonging to an LOD lower than the LOD value. For example, the configuration of points having LOD level 2 may include all points belonging to LOD level 1 and LOD level 2.

Figure 9:
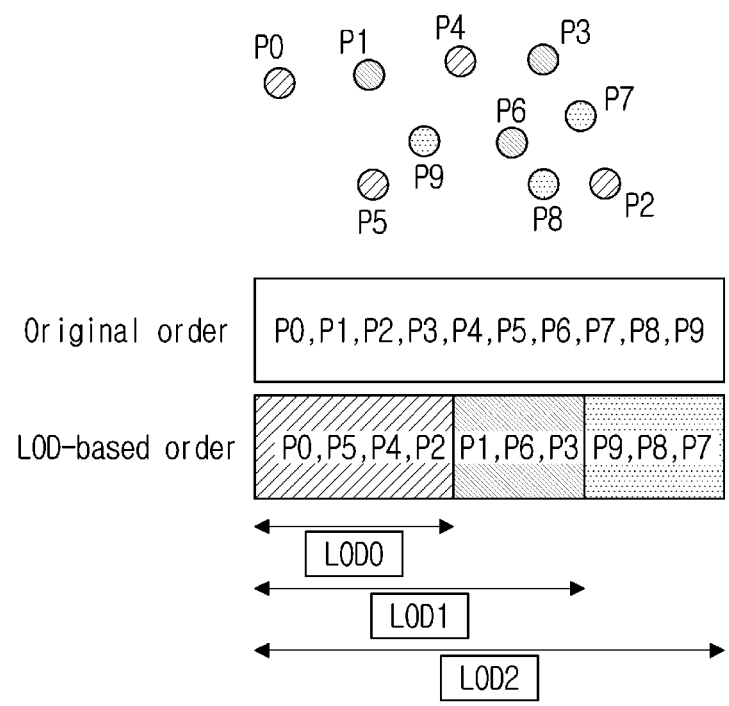
FIG. 9 illustrates an example of points for each LOD according to embodiments of the present disclosure.

An example of the configuration of points for each LOD is shown in FIG. 9. The upper figure of FIG. 9 shows examples (P0 to P9) of points in the point cloud content distributed in a three-dimensional space. The original order of FIG. 9 indicates the order of points P0 to P9 before LOD generation, and the LOD-based order of FIG. 9 indicates the order of points according to LOD generation.

As illustrated in FIG. 9, points may be rearranged for each LOD, and a high LOD may include points belonging to a low LOD. For example, LOD0 may include P0, P5, P4 and P2, and LOD1 may include points of LOD0 and P1, P6 and P3. Also, LOD2 may include points of LOD0, points of LOD1, P9, P8 and P7.

The LOD generation unit 450 may generate a predictor for each point for prediction transform. Accordingly, when there are N points, N predictors may be generated. The predictor may calculate and set a weight value (=1/distance) based on the LOD value for each point, the indexing information for the neighbor points, and distance values from the neighbor points. Here, the neighbor points may be points existing within a distance set for each LOD from the current point.

In addition, the predictor may multiply the attribute values of neighbor points by the 'set weight value', and set a value obtained by averaging the attribute values multiplied by the weight value as the predicted attribute value of the current point. An attribute quantization process may be performed on a residual attribute value obtained by subtracting the predicted attribute value of the current point from the attribute value of the current point.

The lifting transform process may correspond to a process of reconstructing points into a set of detail levels through the LOD generation process, like the prediction transform process. The lifting transform process may be performed by the lifting unit 455. The lifting transform process may also include a process of generating a predictor for each point, a process of setting the calculated LOD in the predictor, a process of registering neighbor points, and a process of setting a weight according to distances between the current point and the neighbor points.

A difference between the lifting transform process and the prediction transform process is that the lifting transform process may be a method of cumulatively applying the weight to the attribute value. The method of cumulatively applying the weight to the attribute value may be as follows.

1) An array QW (quantization weight) for storing a weight value for each point may be separately present. The initial value of all elements of QW is 1.0. A value obtained by multiplying the weight of the predictor of the current point by the QW value of the predictor index of the neighbor node (neighbor point) registered in the predictor is added.

2) In order to calculate the predicted attribute value, a value obtained by multiplying an attribute value of a point by a weight is subtracted from the existing attribute value. This process may be referred to as a lift prediction process.

3) Temporary arrays called 'updateweight' and 'update' are generated, and the elements in the array are initialized to 0.

4) For all predictors, the calculated weight is further multiplied by the weight stored in QW to derive a new weight, the new weight is cumulatively added to the updateweight as the index of the neighbor node, and a value obtained by the new weight by the attribute value of the index of the neighbor node is cumulatively added to update.

5) For all predictors, the attribute value of update is partitioned by the weight of updateweight of the predictor index, and the result is added to the existing attribute values. This process may be referred to as a lift update process.

6) For all predictors, the attribute value updated through the lift update process is multiplied by the weight updated through the lift prediction process (stored in QW), the result (the multiplied value) is quantized, and then the quantized value is entropy-encoded.

The RAHT transform process may correspond to a method of predicting attribute information of nodes at a higher level using attribute information associated with a node at a lower level of the octree. That is, the RATH transform process may correspond to an attribute information intra coding method through octree backward scan. The RAHT transform process may be performed by the RAHT transform unit 445.

The RAHT transform unit 445 scans the entire area in the voxel, and may perform the RAHT transform process up to the root node while summing (merging) the voxel into a larger block at each step. Since the RAHT transform unit 445 performs a RAHT transform process only on an occupied node, in the case of an empty node that is not occupied, the RAHT transform process may be performed on a node at a higher level immediately above it.

When assuming an average attribute value of voxels at a level 1 is $g_{l_{x,y,z}}$, $g_{l_{x,y,z}}$ may be calculated from $g_{l+1_{2x,y,z}}$ and $g_{l+1_{2x+1,y,z}}$. When the weights of $g_{l_{2x,y,z}}$ and $g_{l_{2x+1,y,z}}$ are respectively $w1=w_{l_{2x,y,z}}$ and $w2=w_{l_{2x+1,y,z}}$, a RAHT transform matrix shown in Equation 5 below may be obtained.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}, \qquad \text{[Equation 5]}$$

$$T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

In Equation 5, $g_{l-1_{x,y,z}}$ is a low-pass value and may be used in the merging process at the next higher level. $h_{l-1_{x,y,z}}$ is a high-pass coefficient and high-pass coefficients in each step may be quantized and entropy-encoded. The weight may be calculated by $w_{l-1_{x,y,z}} = w_{l_{2x,y,z}} + w_{l_{2x+1,y,z}}$. The root node may be generated through the last $g_{1_{0,0,0}}$ and $g_{1_{0,0,1}}$ as shown in Equation 6 below.

$$\begin{bmatrix} gDC \\ h0_{0,0,0} \end{bmatrix} = T_{w1000w1001} \begin{bmatrix} g_{1_{0,0,0z}} \\ g_{1_{0,0,1}} \end{bmatrix} \qquad \text{[Equation 6]}$$

In Equation 6, a gDC value may also be quantized and entropy-coded similarly to the high-pass coefficient.

The attribute quantization process may correspond to a process of quantizing the attribute output from the RAHT transform unit 445, the LOD generation unit 450, and/or the lifting unit 455. The attribute quantization process may be performed by the attribute quantization unit 460. The attribute encoding process may correspond to a process of encoding a quantized attribute and outputting an attribute bitstream. The attribute encoding process may be performed by the attribute encoding unit 465.

For example, when the predicted attribute value of the current point is calculated by the LOD generation unit 450, the attribute quantization unit 460 may quantize a residual attribute value obtained by subtracting the predicted attribute value of the current point from the attribute value of the current point. An example of the attribute quantization process of the present disclosure is shown in Table 2.

TABLE 2

```
int PCCQuantization(int value, int quantStep) {
    if( value >=0) {
        return floor(value / quantStep + 1.0 / 3.0);
    } else {
        return −floor(−value / quantStep + 1.0 / 3.0);
    }
}
```

If there is no neighbor point in the predictor of each point, the attribute encoding unit 465 may directly entropy-code the attribute value (non-quantized attribute value) of the current point. In contrast, when there are neighbor points in the predictor of current points, the attribute encoding unit 465 may entropy-encode the quantized residual attribute value.

As another example, when a value obtained by multiplying an attribute value updated through a lift update process by a weight updated through the lift prediction process (stored in QW) is output from the lifting unit 460, the attribute quantization unit 460 may quantize the result (the multiplied value), and the attribute encoding unit 465 may entropy-encode the quantized value.

Overview of Point Cloud Decoding Apparatus

Figure 10:
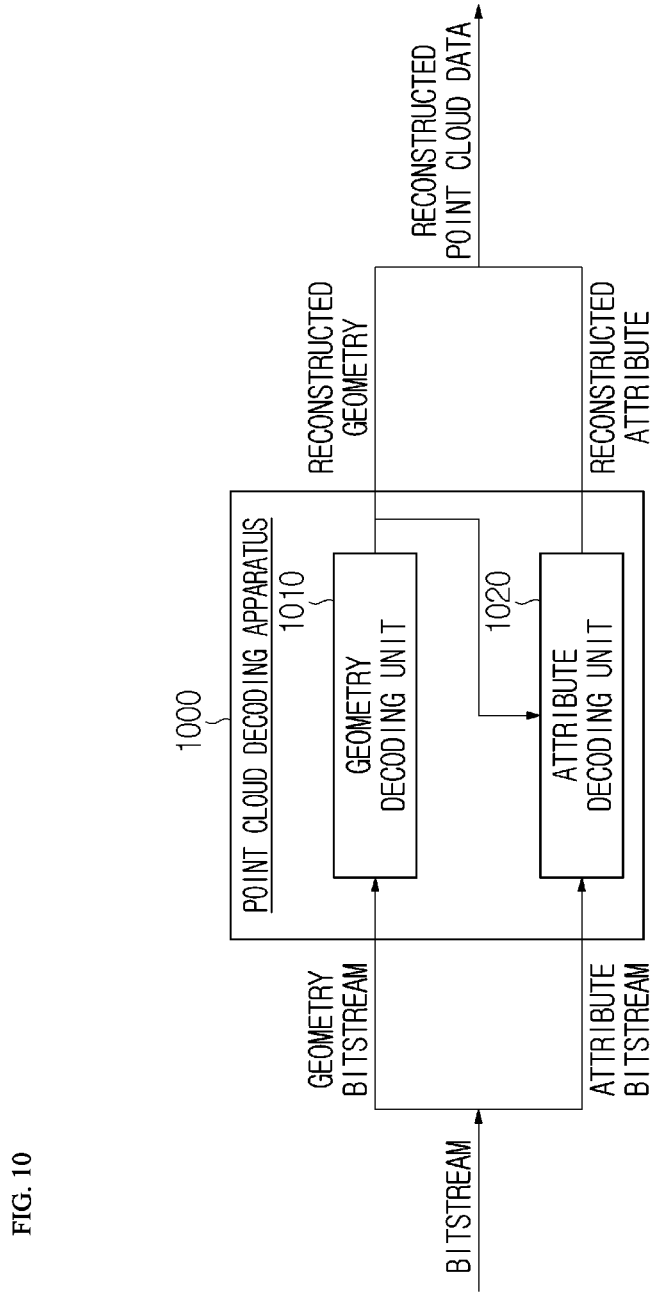
FIG. 10 is a block diagram illustrating an example of a point cloud decoding apparatus according to embodiments of the present disclosure.

FIG. 10 illustrates an example of a point cloud decoding apparatus 1000 according to an embodiment of the present disclosure. The point cloud decoding apparatus 1000 of FIG. 10 may correspond to the decoding unit 23 of FIG. 1 in terms of configuration and function.

The point cloud decoding apparatus 1000 may perform a decoding process based on data (bitstream) transmitted from the transmission device 10. The decoding process may include a process of reconstructing (decoding) a point cloud video by performing operation corresponding to the above-described encoding operation on the bitstream.

As illustrated in FIG. 10, the decoding process may include a geometry decoding process and an attribute decoding process. The geometry decoding process may be performed by a geometry decoding unit 1010, and an attribute decoding process may be performed by an attribute decoding unit 1020. That is, the point cloud decoding apparatus 1000 may include the geometry decoding unit 1010 and the attribute decoding unit 1020.

The geometry decoding unit 1010 may reconstruct geometry from a geometry bitstream, and the attribute decoder 1020 may reconstruct attribute based on the reconstructed geometry and the attribute bitstream. Also, the point cloud decoding apparatus 1000 may reconstruct a three-dimensional point cloud video (point cloud data) based on position information according to the reconstructed geometry and attribute information according to the reconstructed attribute.

Figure 11:
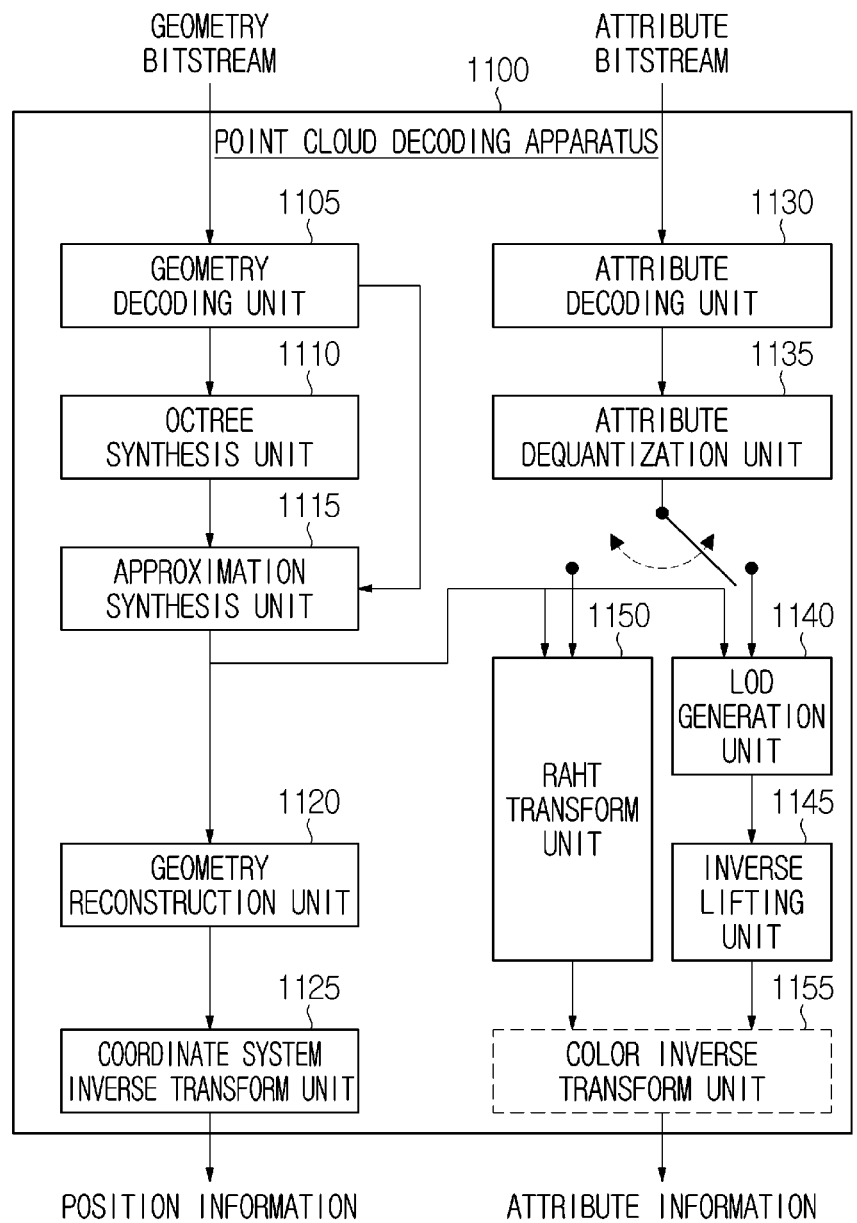
FIG. 11 is a block diagram illustrating another example of a point cloud decoding apparatus according to embodiments of the present disclosure.

FIG. 11 illustrates a specific example of a point cloud decoding apparatus 1100 according to another embodiment of the present disclosure. As illustrated in FIG. 11, the point cloud decoding apparatus 1100 includes a geometry decoding unit 1105, an octree synthesis unit 1110, an approximation synthesis unit 1115, a geometry reconstruction unit 1120, and a coordinate system inverse transform unit 1125, an attribute decoding unit 1130, an attribute dequantization unit 1135, a RATH transform unit 1150, an LOD generation unit 1140, an inverse lifting unit 1145, and/or a color inverse transform unit 1155.

The geometry decoding unit 1105, the octree synthesis unit 1110, the approximation synthesis unit 1115, the geometry reconstruction unit 1120 and the coordinate system inverse transform unit 1150 may perform geometry decoding. Geometry decoding may be performed as a reverse process of the geometry coding described with reference to FIGS. 1 to 9. Geometry decoding may include direct coding and trisoup geometry decoding. Direct coding and trisoup geometry decoding may be selectively applied.

The geometry decoding unit 1105 may decode the received geometry bitstream based on arithmetic coding. Operation of the geometry decoding unit 1105 may correspond to a reverse process of operation performed by the geometry encoding unit 435.

The octree synthesis unit 1110 may generate an octree by obtaining an occupancy code from the decoded geometry bitstream (or information on a geometry obtained as a result of decoding). Operation of the octree synthesis unit 1110 may correspond to a reverse process of operation performed by the octree analysis unit 415.

The approximation synthesis unit 1115 may synthesize a surface based on the decoded geometry and/or the generated octree, when trisoup geometry encoding is applied.

The geometry reconstruction unit 1120 may reconstruct geometry based on the surface and the decoded geometry. When direct coding is applied, the geometry reconstruction unit 1120 may directly bring and add position information of points to which direct coding is applied. In addition, when trisoup geometry encoding is applied, the geometry reconstruction unit 1120 may reconstruct the geometry by performing reconstruction operation, for example, triangle reconstruction, up-sampling, voxelization operation and the like. The reconstructed geometry may include a point cloud picture or frame that does not include attributes.

The coordinate system inverse transform unit 1150 may acquire positions of points by transforming the coordinate system based on the reconstructed geometry. For example, the coordinate system inverse transform unit 1150 may inversely transform the positions of points from a three-dimensional space (e.g., a three-dimensional space expressed by the coordinate system of X-axis, Y-axis, and Z-axis, etc.) to position information of the global space coordinate system.

The attribute decoding unit 1130, the attribute dequantization unit 1135, the RATH transform unit 1230, the LOD generation unit 1140, the inverse lifting unit 1145, and/or the color inverse transform unit 1250 may perform attribute decoding. Attribute decoding may include RAHT transform decoding, prediction transform decoding, and lifting transform decoding. The above three decoding may be used selectively, or a combination of one or more decoding may be used.

The attribute decoding unit 1130 may decode an attribute bitstream based on arithmetic coding. For example, when there is no neighbor point in the predictor of each point and thus the attribute value of the current point is directly entropy-encoded, the attribute decoding unit 1130 may decode the attribute value (non-quantized attribute value) of the current point. As another example, when there are neighbor points in the predictor of the current points and thus the quantized residual attribute value is entropy-encoded, the attribute decoding unit 1130 may decode the quantized residual attribute value.

The attribute dequantization unit 1135 may dequantize the decoded attribute bitstream or information on the attribute obtained as a result of decoding, and output dequantized attributes (or attribute values). For example, when the quantized residual attribute value is output from the attribute decoding unit 1130, the attribute dequantization unit 1135 may dequantize the quantized residual attribute value to output the residual attribute value. The dequantization process may be selectively applied based on whether the attribute is encoded in the point cloud encoding apparatus 400. That is, when there is no neighbor point in the predictor of each point and thus the attribute value of the current point is directly encoded, the attribute decoding unit 1130 may output the attribute value of the current point that is not quantized, and the attribute encoding process may be skipped. An example of the attribute dequantization process of the present disclosure is shown in Table 3.

TABLE 3

```
int PCCInverseQuantization(int value, int quantStep) {
    if( quantStep ==0) {
        return value;
```

TABLE 3-continued

```
  } else {
    return value * quantStep;
  }
```

The RATH transform unit 1150, the LOD generation unit 1140, and/or the inverse lifting unit 1145 may process the reconstructed geometry and dequantized attributes. The RATH transform unit 1150, the LOD generation unit 1140, and/or the inverse lifting unit 1145 may selectively perform decoding operation corresponding to the encoding operation of the point cloud encoding apparatus 400.

The color inverse transform unit 1155 may perform inverse transform coding for inverse transforming s color value (or texture) included in the decoded attributes. Operation of the inverse color transform unit 1155 may be selectively performed based on whether the color transform unit 435 operates.

Figure 12:
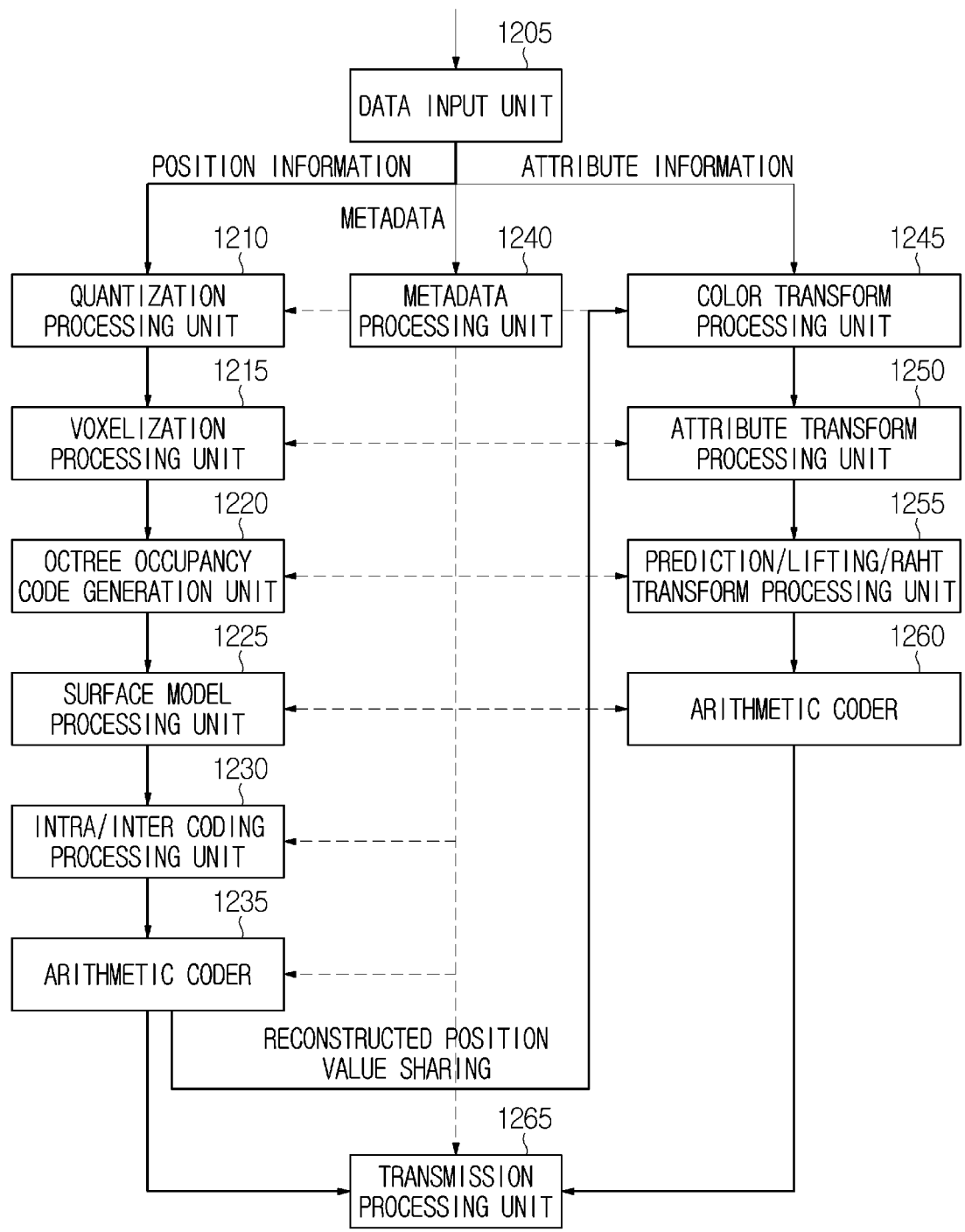
FIG. 12 is a block diagram illustrating another example of a transmission device according to embodiments of the present disclosure.

FIG. 12 shows another example of a transmission device according to embodiments of the present disclosure. As illustrated in FIG. 12, the transmission device may include a data input unit 1205, a quantization processing unit 1210, a voxelization processing unit 1215, an octree occupancy code generation unit 1220, a surface model processing unit 1225, an intra/inter coding processing unit 1230, an arithmetic coder 1235, a metadata processing unit 1240, a color transform processing unit 1245, an attribute transform processing unit 1250, a prediction/lifting/RAHT transform processing unit 1255, an arithmetic coder 1260 and a transmission processing unit 1265.

A function of the data input unit 1205 may correspond to an acquisition process performed by the acquisition unit 11 of FIG. 1. That is, the data input unit 1205 may acquire a point cloud video and generate point cloud data for a plurality of points. Geometry information (position information) in the point cloud data may be generated in the form of a geometry bitstream through the quantization processing unit 1210, the voxelization processing unit 1215, the octree occupancy code generation unit 1220, the surface model processing unit 1225, the intra/inter coding processing unit 1230 and the arithmetic coder 1235. Attribute information in the point cloud data may be generated in the form of an attribute bitstream through the color transform processing unit 1245, the attribute transform processing unit 1250, the prediction/lifting/RAHT transform processing unit 1255, and the arithmetic coder 1260. The geometry bitstream, the attribute bitstream, and/or the metadata bitstream may be transmitted to the reception device through the processing of the transmission processing unit 1265.

Specifically, the function of the quantization processing unit 1210 may correspond to the quantization process performed by the geometry quantization unit 410 of FIG. 4 and/or the function of the coordinate system transform unit 405. The function of the voxelization processing unit 1215 may correspond to the voxelization process performed by the geometry quantization unit 410 of FIG. 4, and the function of the octree occupancy code generation unit 1220 may correspond to the function performed by the octree analysis unit 415 of FIG. 4. The function of the surface model processing unit 1225 may correspond to the function performed by the approximation unit 420 of FIG. 4, and the function of the intra/inter coding processing unit 1230 and the function of the arithmetic coder 1235 may correspond to the functions performed by the geometry encoding unit 425. The function of the metadata processing unit 1240 may correspond to the function of the metadata processing unit described with reference to FIG. 1.

In addition, the function of the color transform processing unit 1245 may correspond to the function performed by the color transform unit 435 of FIG. 4, and the function of the attribute transform processing unit 1250 may correspond to the function performed by the attribute transform unit 440 of FIG. 4. The function of the prediction/lifting/RAHT transform processing unit 1255 may correspond to the functions performed by the RAHT transform unit 4450, the LOD generation unit 450, and the lifting unit 455 of FIG. 4, and the function of the arithmetic coder 1260 may correspond to the function of the attribute encoding unit 465 of FIG. 4. The function of the transmission processing unit 1265 may correspond to the function performed by the transmission unit 14 and/or the encapsulation processing unit 13 of FIG. 1.

Figure 13:
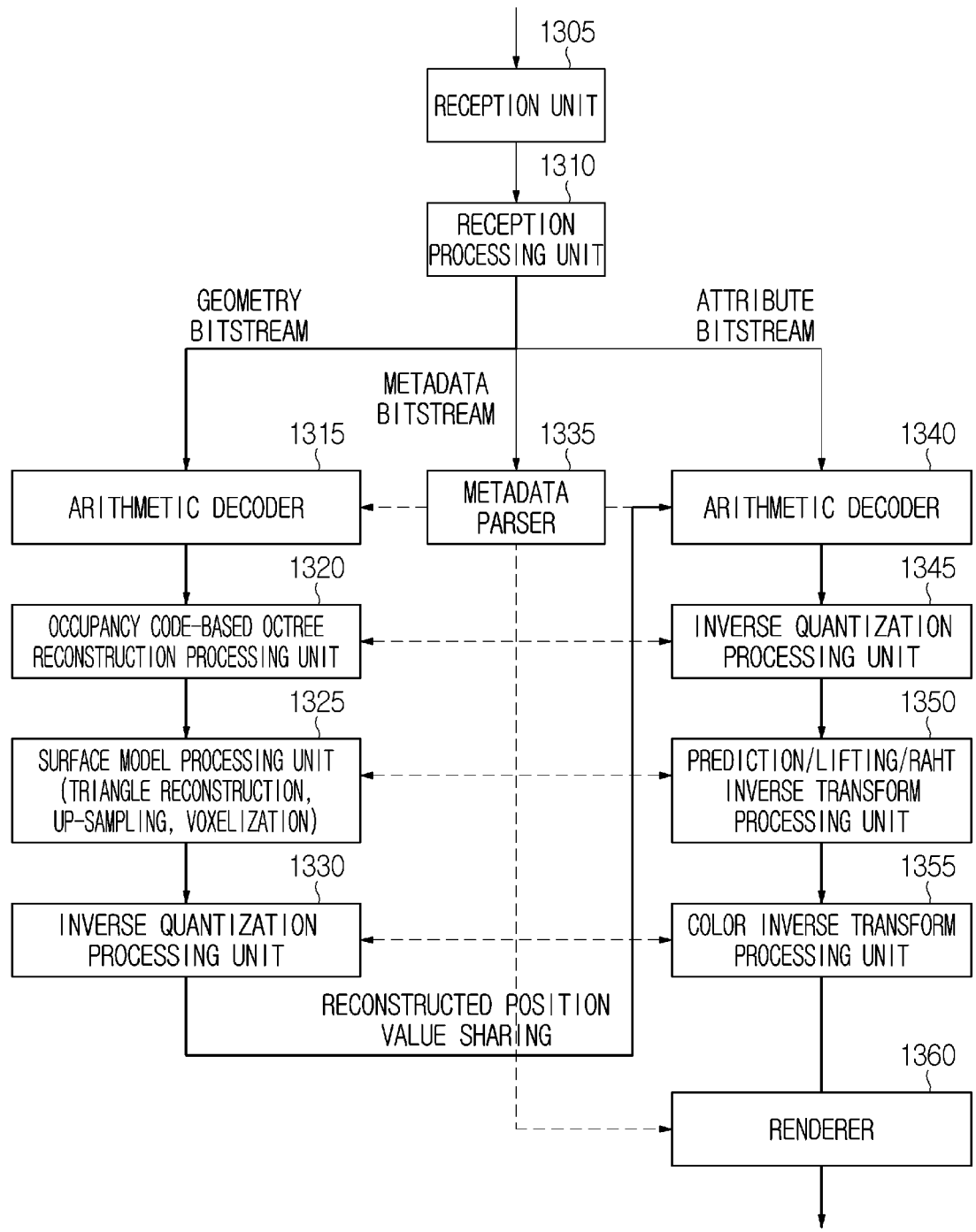
FIG. 13 is a block diagram illustrating another example of a reception device according to embodiments of the present disclosure.

FIG. 13 shows another example of a reception device according to embodiments of the present disclosure. As illustrated in FIG. 13, the reception device includes a reception unit 1305, a reception processing unit 1310, an arithmetic decoder 1315, a metadata parser 1335, an occupancy code-based octree reconstruction processing unit 1320, a surface model processing unit 1325, an inverse quantization processing unit 1330, an arithmetic decoder 1340, an inverse quantization processing unit 1345, a prediction/lifting/RAHT inverse transform processing unit 1350, a color inverse transform processing unit 1355, and a renderer 1360.

The function of the reception unit 1305 may correspond to the function performed by the reception unit 21 of FIG. 1, and the function of the reception processing unit 1310 may correspond to the function performed by the decapsulation processing unit 22 of FIG. 1. That is, the reception unit 1305 may receive a bitstream from the transmission processing unit 1265, and the reception processing unit 1310 may extract a geometry bitstream, an attribute bitstream, and/or a metadata bitstream through decapsulation processing. The geometry bitstream may be generated as a reconstructed position value (position information) through the arithmetic decoder 1315, the occupancy code-based octree reconstruction processing unit 1320, the surface model processing unit 1325, and the inverse quantization processing unit 1330. The attribute bitstream may be generated as a reconstructed attribute value through the arithmetic decoder 1340, the inverse quantization processing unit 1345, the prediction/lifting/RAHT inverse transform processing unit 1350, and the color inverse transform processing unit 1355. The metadata bitstream may be generated as reconstructed metadata (or meta data information) through the metadata parser 1335. The position value, attribute value, and/or metadata may be rendered in the renderer 1360 to provide the user with experiences such as VR/AR/MR/self-driving.

Specifically, the function of the arithmetic decoder 1315 may correspond to the function performed by the geometry decoding unit 1105 of FIG. 11, and the function of the occupancy code-based octree reconstruction unit 1320 may correspond to the function performed by the octree synthesis unit 1110 of FIG. 11. The function of the surface model processing unit 1325 may correspond to the function performed by the approximation synthesis unit of FIG. 11, and the function of the inverse quantization processing unit 1330 may correspond to the function performed by the geometry reconstruction unit 1120 and/or the coordinate system inverse transform unit 1125 of FIG. 11. The function of the metadata parser 1335 may correspond to the function performed by the metadata parser described with reference to FIG. 1.

In addition, the function of the arithmetic decoder 1340 may correspond to the function performed by the attribute decoding unit 1130 of FIG. 11, and the function of the inverse quantization processing unit 1345 may correspond to the function of the attribute inverse quantization unit 1135 of FIG. 11. The function of the prediction/lifting/RAHT inverse transform processing unit 1350 may correspond to the function performed by the RAHT transform unit 1150, the LOD generation unit 1140, and the inverse lifting unit 1145 of FIG. 11, and the function of the color inverse transform processing unit 1355 may correspond to the function performed by the color inverse transform unit 1155 of FIG. 11.

Figure 14:
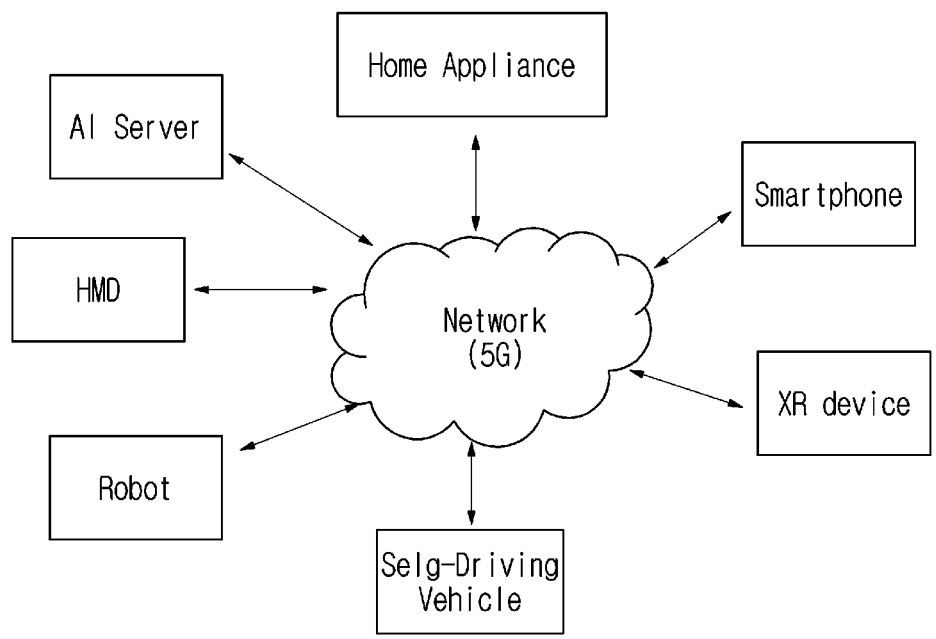
FIG. 14 illustrates an example of a structure capable of interworking with a method/device for transmitting and receiving point cloud data according to embodiments of the present disclosure.

FIG. 14 illustrates an example of a structure capable of interworking with a method/device for transmitting and receiving point cloud data according to embodiments of the present disclosure.

The structure of FIG. 14 illustrates a configuration in which at least one of a server (AI Server), a robot, a self-driving vehicle, an XR device, a smartphone, a home appliance and/or a HMD is connected to a cloud network. The robot, the self-driving vehicle, the XR device, the smartphone, or the home appliance may be referred to as a device. In addition, the XR device may correspond to a point cloud data device (PCC) according to embodiments or may interwork with the PCC device.

The cloud network may refer to a network that forms part of the cloud computing infrastructure or exists within the cloud computing infrastructure. Here, the cloud network may be configured using a 3G network, a 4G or Long Term Evolution (LTE) network, or a 5G network.

The server may be connected to at least one of the robot, the self-driving vehicle, the XR device, the smartphone, the home appliance, and/or the HMD through a cloud network, and may help at least a part of processing of the connected devices.

The HMD may represent one of the types in which an XR device and/or the PCC device according to embodiments may be implemented. The HMD type device according to the embodiments may include a communication unit, a control unit, a memory unit, an I/O unit, a sensor unit, and a power supply unit.

<PCC+XR>

The XR/PCC device may be implemented by a HMD, a HUD provided in a vehicle, a TV, a mobile phone, a smartphone, a computer, a wearable device, a home appliance, a digital signage, a vehicle, a fixed robot or a mobile robot, etc., by applying PCC and/or XR technology.

The XR/PCC device may obtain information on a surrounding space or a real object by analyzing 3D point cloud data or image data acquired through various sensors or from an external device to generate position (geometric) data and attribute data for 3D points, and render and output an XR object to be output. For example, the XR/PCC device may output an XR object including additional information on the recognized object in correspondence with the recognized object.

<PCC+XR+Mobile Phone>

The XR/PCC device may be implemented by a mobile phone or the like by applying PCC technology. A mobile phone can decode and display point cloud content based on PCC technology.

<PCC+Self-Driving+XR>

The self-driving vehicle may be implemented by a mobile robot, a vehicle, an unmanned aerial vehicle, etc. by applying PCC technology and XR technology. The self-driving vehicle to which the XR/PCC technology is applied may mean a self-driving vehicle equipped with a unit for providing an XR image or a self-driving vehicle which is subjected to control/interaction within the XR image. In particular, the self-driving vehicle which is subjected to control/interaction within the XR image is distinguished from the XR device and may be interwork with each other.

The self-driving vehicle equipped with a unit for providing an XR/PCC image may acquire sensor information from sensors including a camera, and output an XR/PCC image generated based on the acquired sensor information. For example, the self-driving vehicle has a HUD and may provide a passenger with an XR/PCC object corresponding to a real object or an object in a screen by outputting an XR/PCC image.

In this case, when the XR/PCC object is output to the HUD, at least a portion of the XR/PCC object may be output so as to overlap an actual object to which a passenger's gaze is directed. On the other hand, when the XR/PCC object is output to a display provided inside the self-driving vehicle, at least a portion of the XR/PCC object may be output to overlap the object in the screen. For example, the self-driving vehicle may output XR/PCC objects corresponding to objects such as a lane, other vehicles, traffic lights, traffic signs, two-wheeled vehicles, pedestrians, and buildings.

The VR technology, AR technology, MR technology, and/or PCC technology according to the embodiments are applicable to various devices. That is, VR technology is display technology that provides objects or backgrounds in the real world only as CG images. On the other hand, AR technology refers to technology that shows a virtual CG image on top of an actual object image. Furthermore, MR technology is similar to AR technology described above in that a mixture and combination of virtual objects in the real world is shown. However, in AR technology, the distinction between real objects and virtual objects made of CG images is clear, and virtual objects are used in a form that complements the real objects, whereas, in MR technology, virtual objects are regarded as equivalent to real objects unlike the AR technology. More specifically, for example, applying the MR technology described above is a hologram service. VR, AR and MR technologies may be integrated and referred to as XR technology.

Space Partition

Point cloud data (i.e., G-PCC data) may represent volumetric encoding of a point cloud consisting of a sequence of frames (point cloud frames). Each point cloud frame may include the number of points, the positions of the points, and the attributes of the points. The number of points, the positions of the points, and the attributes of the points may vary from frame to frame. Each point cloud frame may mean a set of three-dimensional points specified by zero or more attributes and Cartesian coordinates (x, y, z) of three-dimensional points in a particular time instance. Here, the Cartesian coordinates (x, y, z) of the three-dimensional points may be a position or a geometry.

In some embodiments, the present disclosure may further perform a space partition process of partitioning the point cloud data into one or more 3D blocks before encoding the point cloud data. The 3D block may mean whole or part of a 3D space occupied by the point cloud data. The 3D block may be one or more of a tile group, a tile, a slice, a coding unit (CU), a prediction unit (PU), or a transform unit (TU).

A tile corresponding to a 3D block may mean whole or part of the 3D space occupied by the point cloud data. Also, a slice corresponding to a 3D block may mean whole or part of a 3D space occupied by the point cloud data. A tile may be partitioned into one or more slices based on the number of points included in one tile. A tile may be a group of slices with bounding box information. The bounding box information of each tile may be specified in a tile inventory (or a tile parameter set, a tile parameter set (TPS)). A tile may overlap another tile in the bounding box. A slice may be a unit of data on which encoding is independently performed, or a unit of data on which decoding is independently performed. That is, a slice may be a set of points that may be independently encoded or decoded. In some embodiments, a slice may be a series of syntax elements representing part or whole of a coded point cloud frame. Each slice may include an index for identifying a tile to which the slice belongs.

The spatially partitioned 3D blocks may be processed independently or non-independently. For example, spatially partitioned 3D blocks may be encoded or decoded independently or non-independently, respectively, and may be transmitted or received independently or non-independently, respectively. In addition, the spatially partitioned 3D blocks may be quantized or dequantized independently or non-independently, and may be transformed or inversely transformed independently or non-independently, respectively. In addition, spatially partitioned 3D blocks may be rendered independently or non-independently. For example, encoding or decoding may be performed in units of slices or units of tiles. In addition, quantization or dequantization may be performed differently for each tile or slice, and may be performed differently for each transformed or inversely transformed tile or slice.

In this way, when the point cloud data is spatially partitioned into one or more 3D blocks and the spatially partitioned 3D blocks are processed independently or non-independently, the process of processing the 3D blocks is performed in real time and the process is performed with low latency. In addition, random access and parallel encoding or parallel decoding in a three-dimensional space occupied by point cloud data may be enabled, and errors accumulated in the encoding or decoding process may be prevented.

Figure 15:
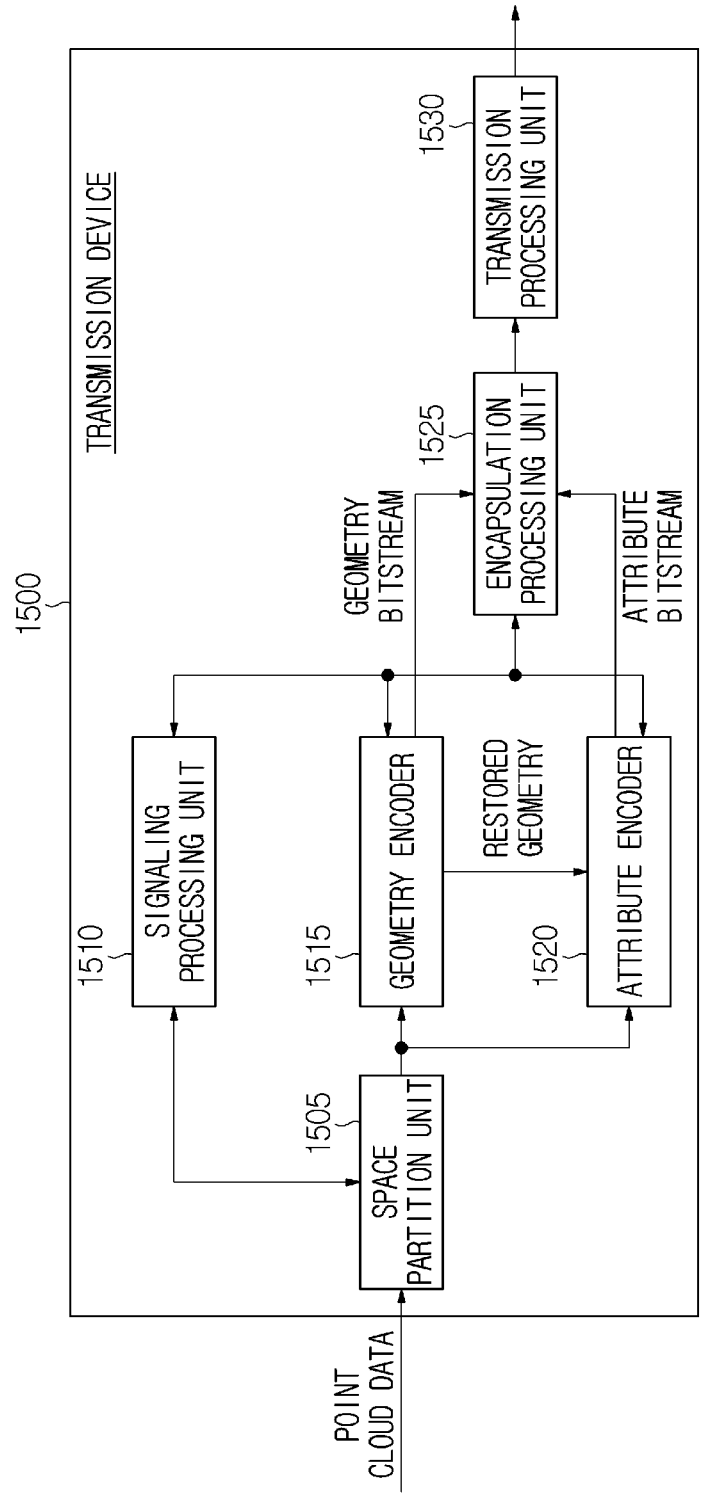
FIG. 15 is a block diagram illustrating another example of a transmission device according to embodiments of the present disclosure.

FIG. 15 is a block diagram illustrating an example of a transmission device 1500 for performing a space partition process according to embodiments of the present disclosure. As illustrated in FIG. 15, the transmission device 1500 may include a space partition unit 1505 for performing a space partition process, a signaling processing unit 1510, a geometry encoder 1515, an attribute encoder 1520, and an encapsulation processing unit 1525 and/or a transmission processing unit 1530.

The space partition unit 1505 may perform a space partition process of partitioning the point cloud data into one or more 3D blocks based on a bounding box and/or a sub-bounding box. Through the space partition process, point cloud data may be partitioned into one or more tiles and/or one or more slices. In some embodiments, the point cloud data may be partitioned into one or more tiles, and each partitioned tile may be further partitioned into one or more slices, through a space partition process.

Figure 16:
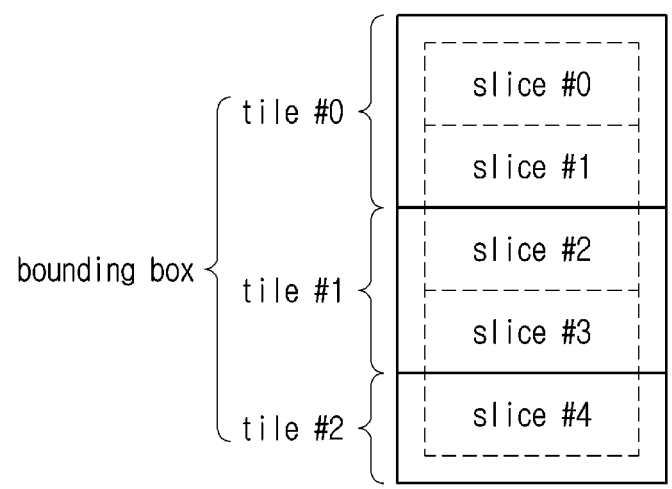
FIG. 16 illustrates an example in which a bounding box according to embodiments of the present disclosure is spatially partitioned into three-dimensional blocks.

FIG. 16 illustrates an example in which a bounding box (that is, point cloud data) is spatially partitioned into one or more 3D blocks. As illustrated in FIG. 16, the overall bounding box of the point cloud data has three tiles, that is, tile #0, tile #1, and tile #2. Also, tile #0 may be partitioned into two slices, that is, slice #0 and slice #1. In addition, tile #1 may be partitioned into two slices, that is, slice #2 and slice #3, again. Also, tile #2 may be partitioned into slice #4 again.

The signaling processing unit 1510 may generate and/or process (e.g., entropy-encode) signaling information and output it in the form of a bitstream. Hereinafter, a bitstream (in which signaling information is encoded) output from the signaling processing unit is referred to as a 'signaling bitstream'. The signaling information may include information for space partition or information on space partition. That is, the signaling information may include information related to the space partition process performed by the space partition unit 1505.

When the point cloud data is partitioned into one or more 3D blocks, information for decoding some point cloud data corresponding to a specific tile or a specific slice among the point cloud data may be required. In addition, in order to support spatial access (or partial access) to point cloud data, information related to 3D spatial areas may be required. Here, the spatial access may mean extracting, from a file, only necessary partial point cloud data in the entire point cloud data. The signaling information may include information for decoding some point cloud data, information related to 3D spatial areas for supporting spatial access, and the like. For example, the signaling information may include 3D bounding box information, 3D spatial area information, tile information, and/or tile inventory information.

The signaling information may be provided from the space partition unit 1505, the geometry encoder 1515, the attribute encoder 1520, the transmission processing unit 1525, and/or the encapsulation processing unit 1530. In addition, the signaling processing unit 1510 may provide the feedback information fed back from the reception device 1700 of FIG. 17 to the space partition unit 1505, the geometry encoder 1515, the attribute encoder 1520, the transmission processing unit 1525 and/or the encapsulation processing unit 1530.

The signaling information may be stored and signaled in a sample in a track, a sample entry, a sample group, a track group, or a separate metadata track. In some embodiments, the signaling information may be signaled in units of sequence parameter sets (SPSs) for signaling of a sequence level, geometry parameter sets (GPSs) for signaling of geometry coding information, and attribute parameter sets (APSs) for signaling of attribute coding information, tile parameter sets (TPSs) (or tile inventory) for signaling of a tile level, etc. In addition, the signaling information may be signaled in units of coding units such as slices or tiles.

Meanwhile, positions (position information) of the 3D blocks may be output to the geometry encoder 1515, and attributes (attribute information) of the 3D blocks may be output to the attribute encoder 1520.

The geometry encoder 1515 may construct an octree based on the position information, encode the constructed octree, and output a geometry bitstream. Also, the geometry encoder 1515 may reconstruct the octree and/or the approximated octree and output it to the attribute encoder 1520. The reconstructed octree may be reconstructed geometry. The geometry encoder 1515 may perform all or some of operations performed by the coordinate system transform unit 405, the geometry quantization unit 410, the octree analysis unit 415, the approximation unit 420, the geometry encoding unit 425 and/or the reconstruction unit 430 of FIG. 4. In some embodiments, the geometry encoder 1515 may perform all or some of operations performed by the quantization processing unit 1210, the voxelization processing unit 1215, the octree occupancy code generation unit 1220, the surface model processing unit 1225, and the intra/intercoding processing unit 1230 and the arithmetic coder 1235.

The attribute encoder 1520 may output an attribute bitstream by encoding an attribute based on the reconstructed geometry. The attribute encoder 1520 may perform all or some of operations performed by the attribute transform unit 440, the RAHT transform unit 445, the LOD generation unit 450, the lifting unit 455, the attribute quantization unit 460, the attribute encoding unit 465 and/or the color transform nit 435 of FIG. 4. In some embodiments, the attribute encoder 1520 may perform all or some of operations performed by the attribute transform processing unit 1250, the prediction/lifting/RAHT transform processing unit 1255, the arithmetic coder 1260, and/or the color transform processing unit 1245 of FIG. 12.

The encapsulation processing unit 1525 may encapsulate one or more input bitstreams into a file or segment. For example, the encapsulation processing unit 1525 may encapsulate each of the geometry bitstream, the attribute bitstream, and the signaling bitstream, or multiplex and encapsulate the geometry bitstream, the attribute bitstream, and the signaling bitstream. In some embodiments, the encapsulation processing unit 1525 may encapsulate a bitstream (G-PCC bitstream) consisting of a sequence of a type-length-value (TLV) structure into a file. TLV (or TLV encapsulation) structures constituting the G-PCC bitstream may include a geometry bitstream, an attribute bitstream, a signaling bitstream, and the like. In some embodiments, the G-PCC bitstream may be generated by the encapsulation processing unit 1525 or generated by the transmission processing unit 1530. The TLV structure or the TLV encapsulation structure will be described in detail later. In some embodiments, the encapsulation processing unit 1525 may perform all or some of operations performed by the encapsulation processing unit 13 of FIG. 1.

The transmission processing unit 1530 may process an encapsulated bitstream or file/segment according to an arbitrary transmission protocol. The transmission processing unit 1530 may perform all or some of operations performed by the transmission unit 14 and the transmission processing unit described with reference to FIG. 1 or the transmission processing unit 1265 of FIG. 12.

Figure 17:
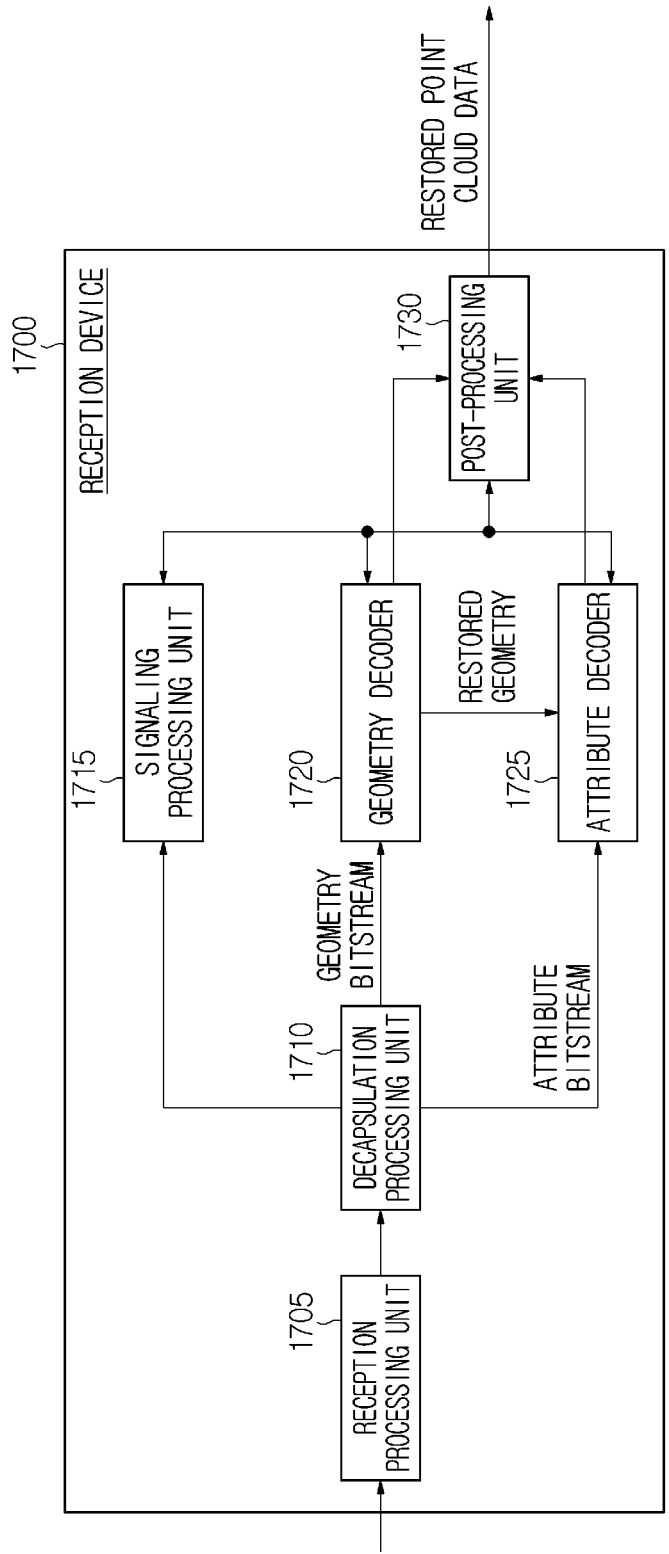
FIG. 17 is a block diagram illustrating another example of a reception device according to embodiments of the present disclosure.

FIG. 17 is a block diagram illustrating an example of a reception device 1700 according to embodiments of the present disclosure. The reception device 1700 may perform operations corresponding to the operations of the transmission device 1500 for performing space partition. As illustrated in FIG. 17, the reception device 1700 may include a reception processing unit 1705, a decapsulation processing unit 1710, a signaling processing unit 1715, a geometry decoder 1720, an attribute encoder 1725, and/or a post-processing unit 1730.

The reception processing unit 1705 may receive a file/segment in which a G-PCC bitstream is encapsulated, a G-PCC bitstream or a bitstream, and perform processing according to a transport protocol on them. The reception processing unit 1705 may perform all or some of operations performed by the reception unit 21 and the reception processing unit described with reference to FIG. 1 or the reception unit 1305 or the reception processing unit 1310 of FIG. 13.

The decapsulation processing unit 1710 may acquire a G-PCC bitstream by performing a reverse process of operations performed by the encapsulation processing unit 1525. The decapsulation processing unit 1710 may acquire a G-PCC bitstream by decapsulating a file/segment. For example, the decapsulation processing unit 1710 may acquire a signaling bitstream and output it to the signaling processing unit 1715, acquire a geometry bitstream and output it to the geometry decoder 1720, and acquire an attribute bitstream and output it to the attribute decoder 1725. The decapsulation processing unit 1710 may perform all or some of operations performed by the decapsulation processing unit 22 of FIG. 1 or the reception processing unit 1410 of FIG. 13.

The signaling processing unit 1715 may parse and decode signaling information by performing a reverse process of operations performed by the signaling processing unit 1510. The signaling processing unit 1715 may parse and decode signaling information from a signaling bitstream. The signaling processing unit 1715 may provide the decoded signaling information to the geometry decoder 1720, the attribute decoder 1720, and/or the post-processing unit 1730.

The geometry decoder 1720 may reconstruct geometry from the geometry bitstream by performing a reverse process of operations performed by the geometry encoder 1515. The geometry decoder 1720 may reconstruct geometry based on signaling information (parameters related to the geometry). The reconstructed geometry may be provided to the attribute decoder 1725.

The attribute decoder 1725 may reconstruct attribute from the attribute bitstream by performing a reverse process of the operations performed by the attribute encoder 1520. The attribute decoder 1725 may reconstruct the attribute based on the signaling information (parameters related to the attribute) and the reconstructed geometry.

The post-processing unit 1730 may reconstruct point cloud data based on the reconstructed geometry and the reconstructed attribute. Reconstruction of point cloud data may be performed through a process of matching the reconstructed geometry with the reconstructed attribute. In some embodiments, when the reconstructed point cloud data is in units of tiles and/or slices, the post-processing unit 1730 may reconstruct the bounding box of the point cloud data, by performing a reverse process of the space partition process of the transmission device 1500 based on signaling information. In some embodiments, when the bounding box is partitioned into a plurality of tiles and/or a plurality of slices through a space partition process, the post-processing unit 1730 may reconstruct part of the bounding box, by combining some slices and/or some tiles based on the signaling information. Here, some slices and/or some tiles used to reconstruct the bounding box may be slices and/or some tiles related to a 3D spatial area in which spatial access is desired.

Bitstream

Figure 18:
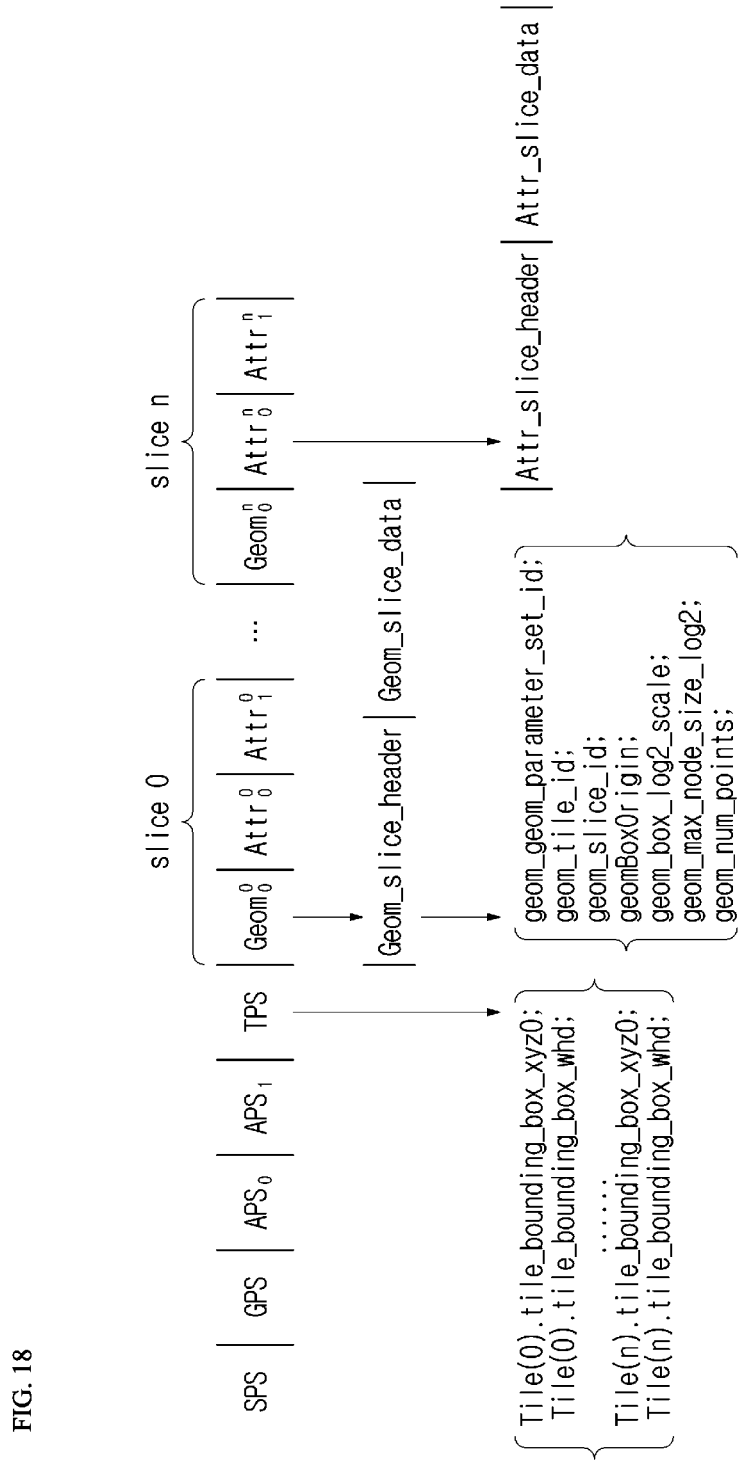
FIG. 18 illustrates an example of a structure of a bitstream according to embodiments of the present disclosure.
Figure 19:
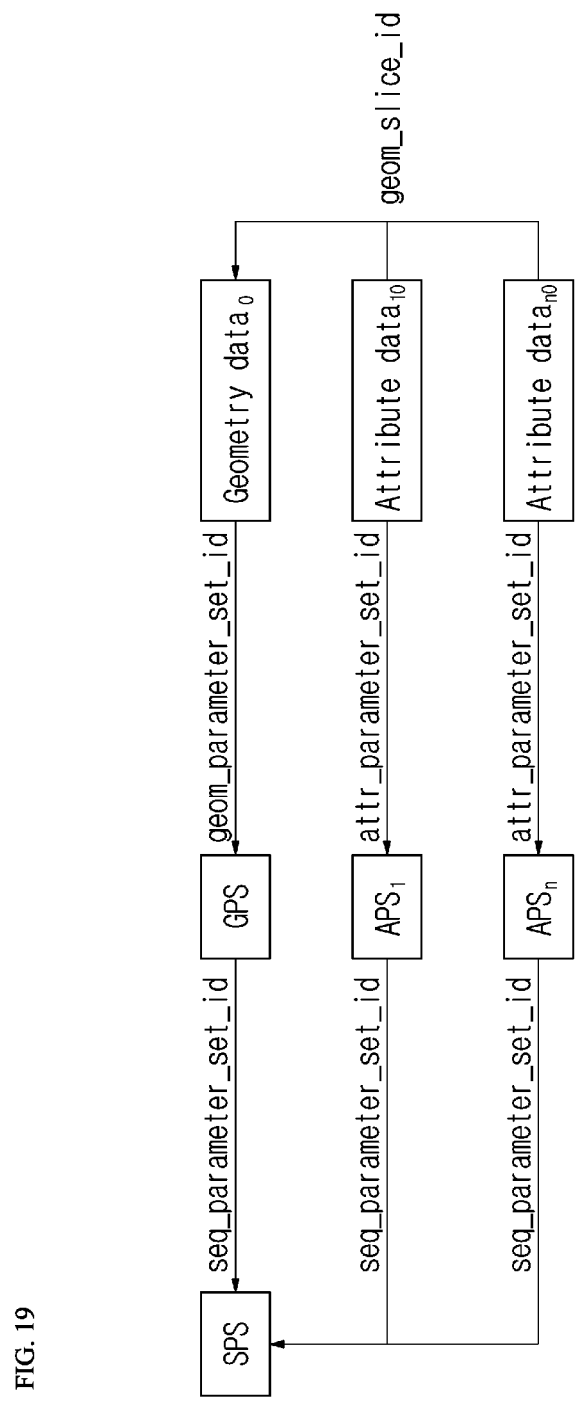
FIG. 19 illustrates an example of an identification relationship between components in a bitstream according to embodiments of the present disclosure.
Figure 20:
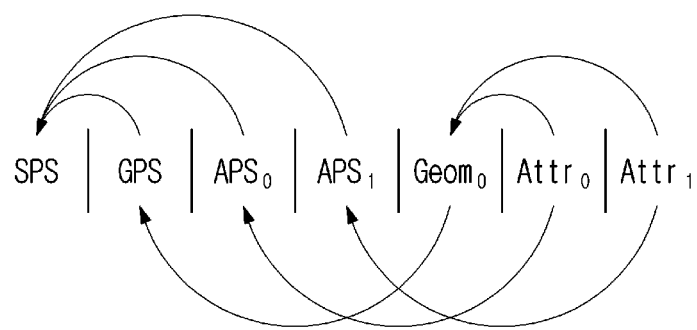
FIG. 20 illustrates a reference relationship between components in a bitstream according to embodiments of the disclosure.

FIG. 18 illustrates an example of a structure of a bitstream according to embodiments of the present disclosure, FIG. 19 illustrates an example of an identification relationship between components in a bitstream according to embodiments of the present disclosure, and FIG. 20 illustrates a reference relationship between components in a bitstream according to embodiments of the disclosure.

When a geometry bitstream, an attribute bitstream, and/or a signaling bitstream consists of one bitstream (or a G-PCC bitstream), the bitstream may include one or more sub-bitstreams.

As illustrated in FIG. 18, a bitstream may include one or more SPSs, one or more GPSs, one or more APSs APS0 and APS1), one or more TPSs, and/or one or more slices slice 0, . . . , slice n. Since a tile is a slice group including one or more slices, a bitstream may include one or more tiles. The TPS may include information on each tile (e.g., information such as a coordinate value, height, and/or size of a bounding box), and each slice may include a geometry bitstream Geom0 and/or one or more attribute bitstreams Attr0 and Attr1. For example, slice 0 may include a geometry bitstream Geom00 and/or one or more attribute bitstreams Attr00 and Attr10.

A geometry bitstream in each slice may be composed of a geometry slice header (Geom_slice_header) and geometry slice data (Geom_slice_data). The geometry slice header includes identification information (geom_parameter_set_id) of a parameter set included in a GPS, a tile identifier (geom_tile_id), a slice identifier (geom_slice_id), and/or information (geomBoxOrigin, geom_box_log2_scale, geom_max_node_size_log2, geom_num_points) on data included in geometry slice data (geom_slice_data) and the like. geomBoxOrigin is geometry box origin information indicating the box origin of the geometry slice data, geom_box_log2_scale is information indicating the log scale of the geometry slice data, geom_max_node_size_log2 is information indicating the size of the root geometry octree node, geom_num_points is information related to the number of points of the geometry slice data. The geometry slice data may include geometry information (or geometry data) of the point cloud data in the slice.

Each attribute bitstream in each slice may include an attribute slice header (Attr_slice_header) and attribute slice data (Attr_slice_data). The attribute slice header may include information on the attribute slice data, and the attribute slice data may include attribute information (or attribute data) of the point cloud data in the slice. When there is a plurality of attribute bitstreams in one slice, each attribute bitstream may include different attribute information. For example, one attribute bitstream may include attribute information corresponding to color, and another attribute bitstream may include attribute information corresponding to reflectance.

As shown in FIGS. 19 and 20, the SPS may include an identifier (seq_parameter_set_id) for identifying the SPS, and the GPS may include an identifier (geom_parameter_set_id) for identifying the GPS and an identifier (seq_parameter_set_id) indicating an active SPS to which the GPS belongs (refers). In addition, the APS may include an identifier (attr_parameter_set_id) for identifying the APS and an identifier (seq_parameter_set_id) indicating an active SPS referred to by the APS. The geometry data includes a geometry slice header and geometry slice data, and the geometry slice header may include an identifier (geom_parameter_set_id) of an active GPS referred to by the geometry slice. The geometry slice header may further include an identifier (geom_slice_id) for identifying the geometry slice and/or an identifier (geom_tile_id) for identifying the tile. The attribute data includes an attribute slice header and attribute slice data, and the attribute slice header may include an identifier (attr_parameter_set_id) of an active APS referred to by the attribute slice and an identifier (geom_slice_id) for identifying a geometry slice related to the attribute slice.

By such a reference relationship, the geometry slice may refer to the GPS, and the GPS may refer to the SPS. In addition, the SPS may list available attributes, assign an identifier to each of the listed attributes, and identify a decoding method. An attribute slice may be mapped to output attributes according to an identifier, and an attribute slice itself may have dependencies on a previously decoded geometry slice and APS.

In some embodiments, parameters necessary to encode the point cloud data may be newly defined in a parameter set of the point cloud data and/or the slice header. For example, when performing attribute encoding, parameters necessary for the encoding may be newly defined in (added to) the APS, and when performing tile-based encoding, parameters necessary for the encoding are newly defined in (added to) the tile and/or slice header.

SPS Syntax Structure

FIG. 21 illustrates an example of a syntax structure of an SPS according to embodiments of the present disclosure. In FIG. 21, syntax elements (or fields) expressed in the syntax structure of the SPS may be syntax elements included in the SPS or syntax elements signaled through the SPS.

main_profile_compatibility_flag may specify whether a bitstream conforms to a main profile. For example, main_profile_compatibility_flag equal to a first value (e.g., 1) may specify that the bitstream conforms to the main profile. main_profile_compatibility_flag equal to a second value (e.g., 0) may specify that the bitstream conforms to a profile other than the main profile.

unique_point_positions_constraint_flag may indicate whether, in each point cloud frame that refers to the current SPS, all output points have unique positions. For example, unique_point_positions_constraint_flag equal to a first value (e.g., 1) may indicate that, in each point cloud frame that refers to the current SPS, all output points have unique positions, and unique_point_positions_constraint_flag equal to a second value (e.g., 0) may indicate that, in any point cloud frame that refers to the current SPS, two and more output points may have the same position. Although all points are unique in each slice, slices in a frame and other points may overlap. In that case, the value of unique_point_positions_constraint_flag may be set to 0.

level_idc may indicate a level to which the bitstream conforms. sps_seq_parameter_set_id may indicate an identifier for the SPS for reference by other syntax elements.

sps_bounding_box_present_flag may indicate whether a bounding box is present. For example, sps_bounding_box_present_flag equal to a first value (e.g., 1) may indicate that the bounding box is present in the SPS and sps_bounding_box_present_flag equal to a second value (e.g., 0) may indicate that the size of the bounding box is undefined. When sps_bounding_box_present_flag is equal to a first value (e.g., 1), sps_bounding_box_offset_x, sps_bounding_box_offset_y, sps_bounding_box_offset_z, sps_bounding_box_offset_log2_scale, sps_bounding_box_size_width, sps_bounding_box_size_height, and/or sps_bounding_box_size_depth may be further signaled.

sps_bounding_box_offset_x may indicate a quantized x offset of the source bounding box in Cartesian coordinates, and, when the x offset of the source bounding box is not present, the value of sps_bounding_box_offset_x may be inferred to 0. sps_bounding_box_offset_y may indicate a quantized y offset of the source bounding box in Cartesian coordinates, and, when the y offset of the source bounding box is not present, the value of sps_bounding_box_offset_y may be inferred to 0. sps_bounding_box_offset_z may indicate a quantized z offset of the source bounding box in Cartesian coordinates, and, when the z offset of the source bounding box is not present, the value of sps_bounding_box_offset_z may be inferred to 0. sps_boundingbox_offset_log2_scale may indicate the scaling factor to scale the quantized x, y, and z source bounding box offsets. sps_bounding_box_size_width may indicate the width of the source bounding box in Cartesian coordinates and, when the width of the source bounding box is not present, the value of sps_bounding_box_size_width may be inferred to 1. sps_bounding_box_size_height may indicate the height of the source bounding box in Cartesian coordinates and, when the height of the source bounding in Cartesian coordinates is not present, the sps_bounding_box_size_height may be inferred to 1. sps_bounding_box_size_depth indicate the depth of the source bounding box in Cartesian coordinates, and, when the depth of the source bounding in Cartesian coordinate is not present, the sps_bounding_box_size_depth may be inferred to 1.

sps_source_scale_factor_numerator_minus1 plus 1 may indicate the scale factor numerator of the source point cloud. sps_source_scale_factor_denominator_minus1 plus 1 may indicate the scale factor denominator of the source point cloud. sps_num_attribute_sets may indicate the number of coded attributes in the bitstream. The value of sps_num_attribute_sets shall be in the range of 0 to 63.

Attribute_dimension_minus1[i] and attribute_instance_id [i] by 'the number of coded attributes in the bitstream' indicated by sps_num_attribute_sets may be further signaled. i may increase by 1 from 0 to 'the number of coded attributes in the bitstream−1'. attribute_dimension_minus1 [i] plus 1 may specify the number of components of the i-th attribute. attribute_instance_id[i] may specify the instance id for the i-th attribute.

When the value of attribute_dimension_minus1[i] is greater than 1, attribute_bitdepth_minus1[i], attribute_secondary_bitdepth_minus1[i], attribute_cicp_colour_primaries[i], attribute_cicp_transfer_characteristics[i], attribute_cicp_matrix_coeffs[i], and/or attribute_cicp_video_full_range_flag[i] may be further signaled. attribute_bitdepth_minus1[i] plus 1 may specify the bitdepth for a first component of the i-th attribute signal(s). attribute_secondary_bitdepth_minus1[i] plus 1 may specify the bitdepth for a secondary component of the i-th attribute signal(s). attribute_cicp_colour_primaries[i] may indicate the chromaticity coordinates of the colour attribute source primaries of the i-th attribute. attribute_cicp_transfer_characteristics[i] may indicate the reference opto-electronic transfer characteristic function as a source input linear optical intensity with a nominal real-valued range of 0 to 1 or indicate the inverse of the reference electro-optical transfer characteristic function as a function of an output linear optical intensity. attribute_cicp_matrix_coeffs[i] may describe the matrix coefficients used to derive luma and chroma signals from the green, blue, and red (or Y, Z, and X primaries) of the i-th attribute. attribute_cicp_video_full_range_flag[i] may specify the black level and range of the luma and chroma signals derived from E'Y, E'PB, and E'PR or E'R, E'G, and E'B real-valued component signals. known_attribute_label_flag[i] may indicate whether know_attribute_label[i] or attribute_label_four_bytes[i] is signaled for the i-th attribute. For example, known_attribute_label_flag[i] equal to a first value (e.g., 1) may specify that known_attribute_label is signaled for the i-th attribute, and known_attribute_label_flag[i] equal to a second value (e.g., 0) may specify attribute_label_four_bytes[i] is signaled for the i-th attribute. known_attribute_label[i] may specify the type of the i-th attribute. For example, known_attribute_label[i] equal to a first value (e.g., 0) may specify that the attribute is colour. known_attribute_label[i] equal to a second value (e.g., 1) may specify that the attribute is reflectance. known_attribute_label[i] equal to a third value (e.g., 2) may specify that the attribute is a frame index. attribute_label_four_bytes[i] may indicate the known attribute type with the 4-byte code, as shown in FIG. 22a.

log2_max_frame_idx may specify the number of bits used to a frame_idx syntax variable. For example, log2_max_frame_idx plus 1 may specify the number of bits used to signal the frame_idx syntax variable. As shown in FIG. 22b, axis_coding_order may indicate the correspondence between the X, Y, and Z output axis labels and the three position components in the reconstructed point cloud RecPic[pointIdx][axis] with axis=0 . . . 2.

sps_bypass_stream_enabled_flag may specify whether the bypass coding mode is used on reading the bitstream. For example, sps_bypass_stream_enabled_flag equal to a first value (e.g., 1) may specify that the bypass coding mode may be used on reading the bitstream. As another example, sps_bypass_stream_enabled_flag equal to a second value (e.g., 0) may specify that the bypass coding mode is not used on reading the bitstream. sps_extension_flag may specify whether the sps_extension_data syntax elements are present in the SPS syntax structure. For example, sps_extension_flag equal to a first value (e.g., 1) may specify that the sps_extension_data syntax elements are present in the SPS syntax structure. sps_extension_flag equal to a second value (e.g., 0) may specify that no sps_extension_data_flag syntax elements are present in the SPS syntax structure. sps_extension_flag shall be equal to 0 in the bitstream. When the value of sps_extension_flag is equal to a first value (e.g., 1), sps_extension_data_flag may be further signaled. sps_extension_data_flag may have any value, and presence and value of sps_extension_data_flag may not affect decoder conformance to the profile.

GPS Syntax Structure

FIG. 23 shows an example of a GPS syntax structure. In FIG. 23, syntax elements (or fields) expressed in the syntax structure of the GPS may be syntax elements included in the GPS or syntax elements signaled through the GPS.

gps_geom_parameter_set_id may specify the identifier of the GPS referenced by other syntax elements. gps_seq_parameter_set_id may specify the value of seq_parameter_set_id for the active SPS. gps_box_present_flag may specify whether additional bounding box information is provided in a geometry header that references the current CPS. For example, gps_box_present_flag equal to a first value (e.g., 1) may specify that the additional bounding box information is provided in the geometry header that references the current GPS. gps_bounding_box_present_flag equal to a second value (e.g., 0) may specify that the additional bounding box information is not provided in the geometry header that references the current GPS. When the value of gps_box_present_flag is equal to a first value (e.g., 1), gps_gsh_box_log2_scale_present_flag may be further signaled. gps_gsh_box_log2_scale_present_flag may specify whether gps_gsh_box_log2_scale is signaled in each geometry slice header that references the current GPS. For example, gps_gsh_box_log2_scale_present_flag equal to a first value (e.g., 1) may specify that gps_gsh_box_log2_scale is signalled in each geometry slice header that references the current GPS. gps_gsh_box_log2_scale_present_flag equal to a second value (e.g., 0) may specify that gps_gsh_box_log2_scale is not signalled in each geometry slice header that references the current GPS, and common scale for all slices is signalled in gps_gsh_box_log2_scale of the current GPS. When the value of gps_gsh_box_log2_scale_present_flag is equal to a second value (e.g., 0), gps_gsh_box_log2_scale may be further signaled. gps_gsh_box_log2_scale may indicate the common scale factor of bounding box origin for all slices that references the current GPS.

unique_geometry_points_flag may indicate whether, in all slices that refer to the current GPS, all output points have unique positions within one slice. For example, unique_geometry_points_flag equal to a first value (e.g., 1) may indicate that, in all slices that refer to the current GPS, all output points have unique positions within a slice.

unique_geometry_points_flag equal to a second value (e.g., 0) may indicate that, in all slices that refer to the current GPS, two or more of the output points may have the same positions within one slice.

geometry_planar_mode_flag may indicate whether the planar coding mode is activated. geometry_planar_mode_flag equal to a first value (e.g., 1) may indicate that the planar coding mode is activated. geometry_planar_mode_flag equal to a second value (e.g., 0) may indicate that the planar coding mode is not activated. When the value of geometry_planar_mode_flag is equal to a first value (e.g., 1), geom_planar_mode_th_idcm, geom_planar_mode_th[1], and/or geom_planar_mode_th[2] may be further signaled. geom_planar_mode_th_idcm may specify the value of the threshold of activation for the direct coding mode. geom_planar_mode_th_idcm is an integer in the range 0 to 127 inclusive. geom_planar_mode_th[i], for i in the range 0 . . . 2, may specify the value of the threshold of activation for planar coding mode along the i-th most probable direction for the planar coding mode to be efficient. geom_planar_mode_th[i] is an integer in the range 0 . . . 127.

geometry_angular_mode_flag may indicate whether an angular coding mode is activated. For example, geometry_angular_mode_flag equal to a first value (e.g., 1) may indicate that the angular coding mode is activated. geometry_angular_mode_flag equal to a second value (e.g., 0) may indicate that the angular coding mode is not activated. When the value of geometry_angular_mode_flag is a first value (e.g., 1), lidar_head_position[0], lidar_head_position[1], lidar_head_position[2], number_lasers, planar_buffer_disabled, implicit_qtbt_angular_max_node_min_dim_log2_to_split_z, and/or implicit_qtbt_angular_max_diff_to_split_z may be further signaled.

lidarhead_position[0], lidar_head_position[1], and/or lidar_head_position[2] may specify the (X, Y, Z) coordinate of the lidar head in the coordinate system with the internal axes. number_lasers may specify the number of lasers used for the angular coding mode. Each laser_angle[i] and laser_correction[i] may be signaled by the number indicated by number_lasers. Here, i may increase by 1 from 0 to the 'value 'number_lasers 1'. laser_angle[i] may specify the tangent of the elevation angle of the i-th laser relative to the horizontal plane defined by the 0-th and the 1-th internal axes. laser_correction [i] may specify the correction, along the 2-th internal axis, of the i-th laser position relative to the lidar_head_position[2]. planar_buffer_disabled may indicate whether tracking the closest nodes using a buffer is used in the process of coding a planar mode flag and a plane position in the planar mode. For example, planar_buffer_disabled equal to a first value (e.g., 1) may indicate that tracking the closest nodes using a buffer is not used in the process of coding the planar mode flag and the plane position in the planar mode. planar_buffer_disabled equal to a second value (e.g., 0) may indicate that tracking the closest nodes using a buffer is used in the process of coding the planar mode flag and the plane position in the planar mode. When not present, planar_buffer_disabled is inferred to a second value (e.g., 0). implicit_qtbt_angular_max_node_min_dim_log2_to_split_z may indicate that a log 2 value of a node size below which horizontal split of nodes is preferred over vertical split. implicit_qtbt_angular_max_diff to_split_z may specify the log2 value of the vertical over horizontal node size ratio allowed to a node. When implicit_qtbt_angular_max_diff to_split_z is not present, implicit_qtbt_angular_max_node_min_dim_log2_to_split_z may be inferred to 0.

neighbour_context_restriction_flag may indicate whether geometry node occupancy of the current node is coded with the contexts determined from neighbouring nodes which is located inside the parent node of the current node. For example, neighbour_context_restriction_flag equal to a first value (e.g., 0) may indicate that geometry node occupancy of the current node is coded with the contexts determined from neighbouring nodes which is located inside the parent node of the current node. neighbour_context_restriction_flag equal to a second value (e.g., 1) may indicate that geometry node occupancy of the current node is not coded with the contexts determined from neighbouring nodes which is located inside or outside the parent node of the current node. inferred_direct_coding_mode_enabled_flag may indicate whether direct_mode_flag is present in the corresponding geometry node syntax. inferred_direct_coding_mode_enabled_flag equal to a first value (e.g., 1) may indicate that direct_mode_flag may be present in the geometry node syntax. inferred_direct_coding_mode_enabled_flag equal to a second value (e.g., 0) may indicate that direct_mode_flag is not present in the geometry node syntax.

bitwise_occupancy_coding_flag may indicate whether the geometry node occupancy is encoded using bitwise contextualization of the syntax element occupancy_map. For example, bitwise_occupancy_coding_flag equal to a first value (e.g., 1) may indicate that geometry node occupancy is encoded using bitwise contextualisation of the syntax element ocupancy_map, and bitwise_occupancy_coding_flag equal to a second value (e.g., 0) may indicate that geometry node occupancy is encoded using the dictionary encoded syntax element occypancy_map. adjacent_child_contextualization_enabled_flag may indicate whether the adjacent children of neighbouring octree nodes are used for bitwise occupancy contextualization. adjacent_child_contextualization_enabled_flag equal to a first value (e.g., 1) may indicate that the adjacent children of neighbouring octree nodes are used for bitwise occupancy contextualization. adjacent_child_contextualization_enabled_flag equal to a second value (e.g., 0) may indicate that the children of neighbouring octree nodes are not used for the occupancy contextualization.

log2_neighbour_avail_boundary may specify the value of a variable NeighbAvailBoundary used for a decoding process. For example, the variable neighbour_context_restriction_flag is equal to a first value (e.g., 1), NeighbAvailabilityMask may be set to 1 and when the value of neighbour_context_restriction_flag is equal to a second value (e.g., 0), NeighbAvailabilityMask may be set to 1<<log2_neighbour_avail_boundary.

log2_intra_pred_max_node_size may specify the octree node size eligible for occupancy intra prediction. log2_trisoup_node_size may specify the variable TrisoupNodeSize as the size of the triangle nodes.

geom_scaling_enabled_flag may specify whether a scaling process for geometry positions is invoked during the geometry slice decoding process. For example, geom_scaling_enabled_flag equal to a first value (e.g., 1) may specify that the scaling process for geometry positions is invoked during the geometry slice decoding process, and geom_scaling_enabled_flag equal to a second value (e.g., 0) may specify that geometry positions do not require scaling. When the value ofgeom_scaling_enabled_flag is equal to a first value (e.g., 1), geom_base_qp may be further signaled. geom_base_qp may specify the base value of the geometry position quantization parameter. gps_implicit_geom_partition_flag may specify whether the implicit geometry partition is enabled for the sequence or slice. For example, gps_implicit_geom_partition_flag equal to a first value (e.g., 1) may specify that the implicit geometry partition is enabled for the sequence or slice, and gps_implicit_geom_partition_flag equal to a second value (e.g., 0) may specify that the implicit geometry partition is disabled for the sequence or slice. If gps_implicit_geom_partition_flag equals to a first value (e.g., 1), gps_max_num_implicit_qtbt_before_ot and gps_min_size_implicit_qtbt may be signaled. gps_max_num_implicit_qtbt_before_ot may specify the maximal number of implicit QT and BT partitions before OT partitions. gps_min_size_implicit_qtbt may specify the minimal size of implicit QT and BT partitions.

gps_extension_flag may specify whether gps_extension_data_flag syntax elements are present in the GPS syntax structure. For example, gps_extension_flag equal to a first value (e.g., 1) may specify that gps_extension_data_flag syntax elements are present in the GPS syntax structure, and gps_extension_flag equal to a second value (e.g., 0) may specify that no gps_extension_data_flag syntax elements are not present in the GPS syntax structure. When the value of gps_extension flag is equal to a first value (e.g., 1), gps_extension_data_flag may be further signaled. gps_extension_data_flag may have any value. Presence and value of gps_extension_data_flag do not affect decoder conformance to profiles.

APS Syntax Structure

FIG. 24 shows an example of an APS syntax structure. In FIG. 24, syntax elements (or fields) expressed in the syntax structure of the APS may be syntax elements included in the APS or syntax elements signaled through the APS.

aps_attr_parameter_set_id may provide an identifier for the APS for reference by other syntax elements, and aps_seq_parameter_set_id may specify the value of sps_seq_parameter_set_id for the active SPS. attr_coding_type may indicate that the coding type for the attribute. A table for values of attr_coding_type and an attribute coding type assigned to each of them is shown in FIG. 25. As illustrated in FIG. 25, when the value of attr_coding_type is a first value (e.g., 0), the coding type may indicate predicting weight lifting, and when the value of attr_coding_type is a second value (e.g., 1), the coding type may indicate RAHT, and when the value of attr_coding_type is a third value (e.g., 2), it may indicate fixed weight lifting.

aps_attr_initial_qp may specify the initial value of the variable SliceQp for each slice referring to the APS. The value of aps_attr_initial_qp shall be in the range of 4 to 51, inclusive. aps_attr_chroma_qp_offset may specify the offsets to the initial quantization parameter signalled by the syntax aps_attr_initial_qp. aps_slice_qp_delta_present_flag may specify whether the ash_attr_qp_delta_luma and ash_attr_qp_delta_chroma syntax elements are present in the attribute slice header (ASH). For example, aps_slice_qp_delta_present_flag equal to a first value (e.g., 1) may specify that the ash_attr_qp_delta_luma and ash_attr_qp_delta_chroma syntax elements are present in the ASH, and aps_slice_qppresent_flag equal to a second value (e.g., 0) may specify that the ash_attr_qp_delta_luma and ash_attr_qp_delta_chroma syntax elements are not present in the ASH.

When the value of attr_coding_type is a first value (e.g., 0) or a third value (e.g., 2), that is, when the coding type is predicting weight lifting or fix weight lifting, lifting_num_pred_nearest_neighbours_minus1, lifting_search_range_minus1, and lifting_neighbour_bias[k] may be further signaled. lifting_num_pred_nearest_neighbours_minus1 plus 1 may specify the maximum number of nearest neighbours to be used for prediction. The value of the variable NumPredNearestNeighbours is set equal to lifting_num_pred_nearest_neighbours (lifting_num_pred_nearest_neighbours_minus1 plus 1). lifting_search_range_minus1 plus 1 may specify the search range used to determine nearest neighbours to be used for prediction and to build distance-based levels of detail. The variable LiftingSearchRange may be obtained by adding 1 to the value of the lifting_search_range_minus1 field (LiftingSearchRange=lifting_search_range_minus1+1). lifting_neighbour_bias[k] may specify a bias used to weight the k-th components in the calculation of the euclidean distance between two points as part of the nearest neighbour derivation process.

When the value of attr_coding_type is a third value (e.g., 2), that is, the coding type indicates fixed weight lifting, lifting_scalability_enabled_flag may be further signaled. lifting_scalability_enabled_flag may specify whether the attribute decoding process allows the prune octree decode result for the input geometry points. For example, lifting_scalability_enabled_flag equal to a first value (e.g., 1) may specify that the attribute decoding process allows the pruned octree decode result for the input geometry points, and lifting_scalability_enabled_flag equal to a second value (e.g., 0) may specify that that the attribute decoding process requires the complete octree decode result for the input geometry points. When the value of lifting_scalability_enabled_flag is not a first value (e.g., 1), lifting_num_detaillevels_minus1 may be further signaled. lifting_num_detail_levels_minus1 may specify the number of LODs for the attribute coding. The variable LevelDetailCount specifying the number of LODs may be derived by adding 1 to the value of lifting_num_detail_levels_minus1 (LevelDetailCount=lifting_num_detail_levels_minus1+1).

When the value of lifting_num_detail_levels_minus1 is greater than 1, lifting_lod_regular_sampling_enabled_flag may be further signaled. lifting_lod_regular_sampling_enabled_flag may specify whether levels of detail are built by using a regular sampling strategy. lifting_lod_regular_sampling_enabled_flag equal to a first value (e.g., 1) may specify that levels of detail are built by using a regular sampling strategy. lifting_lod_regular_sampling_enabled_flag equal to a second value (e.g., 0) may specify that a distance-based sampling strategy is used instead.

When the value of lifting_scalability_enabled_flag is not a first value (e.g., 1), lifting_sampling_period_minus2[idx] or lifting_sampling_distance_squared_scale_minus1[idx] may be further signaled depending on whether levels of detail are built by using a regular sampling strategy (the value of lifting_lod_regular_sampling_enabled_flag). For example, when the value of lifting_lod_regular_sampling_enabled_flag is equal to a first value (e.g., 1), lifting_sampling_period_minus2[idx] may be signaled, and, when the value of lifting_lod_regular_sampling_enabled_flag is equal to a second value (e.g., 0), lifting_sampling_distance_squared_scale_minus1[idx] may be signaled. When the value of idx is not 0 (idx!=0), lifting_sampling_distance_squared_offset[idx] may be further siganled. idx may increase by from 0 to a value obtained by subtracting 1 from num_detail_levels_minus1. lifting_sampling_period_minus2[idx] plus 2 may specify the sampling period for the level of detail idx. lifting_sampling_distance_squared_scale_minus1[idx] plus 1 may specify the scaling factor for the derivation of the square of the sampling distance for the level of detail idx. lifting_sampling_distance_squared_offset[idx] may specify the offset for the derivation of the square of the sampling distance for the level of detail idx.

When the value of attr_coding_type is equal to a first value (e.g., 0), that is, when the coding type is predicting weight lifting, lifting_adaptive_prediction_threshold, lifting_intra_lod_prediction_num_layers, lifting_max_num_direct_predictors, and inter_component_prediction_enabled_flag may be signaled. lifting_adaptive_prediction_threshold may specify a threshold for enabling adaptive prediction. A variable AdaptivePredictionThreshold specifying the threshold to switch an adaptive predictor selection mode may be set equal to the value of lifting_adaptive_prediction_threshold. lifting_intra_lod_prediction_num_layers may specify number of LoD layer where decoded points in the same LoD layer could be referred to generate prediction value of target point. For example, lifting_intra_lod_prediction_num_layers equal to LevelDetailCount may indicate that target point could refer to decoded points in the same LoD layer for all LoD layers. lifting_intra_lod_prediction_num_layers equal to 0 indicates that target point could not refer to decoded points in the same LoD layer for any LoD layers. lifting_intra_lod_prediction_num_layers shall be in the range of 0 to LevelDetailCount. lifting_max_numdirect_predictors may specify the maximum number of predictors to be used for direct prediction. inter_component_prediction_enabled_flag may specify whether the primary component of a multi component attribute is used to predict the reconstructed value of non-primary components. For example, inter_component_prediction_enabled_flag equal to a first value (e.g., 1) may specify that the primary component of a multi component attribute is used to predict the reconstructed value of non-primary components. As another example, inter_component_prediction_enabled_flag equal to a second value (e.g., 0) may specify that all attribute components are reconstructed independently.

When the value of attr_coding_type is equal to a second value (e.g., 1), that is, when the attribute coding type is RAHT, raht_prediction_enabled_flag may be signaled. raht_prediction_enabled_flag may specify whether the transform weight prediction from the neighbour points is enabled in the RAHT decoding process. For example, raht_prediction_enabled_flag equal to a first value (e.g., 1) may specify that the transform weight prediction from the neighbour points is enabled in the RAHT decoding process, and raht_prediction_enabled_flag equal to a second value (e.g., 0) may specify that the transform weight prediction from the neighbour points is disabled in the RAHT decoding process. When the value of raht_prediction_enabled_flag is equal to a first value (e.g., 1), raht_prediction_threshold0 and raht_prediction_threshold1 may be further signaled. raht_prediction_threshold0 may specify the threshold to terminate the transform weight prediction from neighbour points. raht_prediction_threshold1 may specify the threshold to skip the transform weight prediction from neighbour points.

aps_extension_flag may specify whether aps_extension_data_flag syntax elements are present in the APS syntax structure. For example, aps_extension_flag equal to a first value (e.g., 1) may specify that aps_extension_data_flag syntax elements are present in the APS syntax structure, and aps_extension_flag equal to a second value (e.g., 0) may specify that no aps_extension_data_flag syntax elements are present in the APS syntax structure. When the value of aps_extension_flag is equal to a first value (e.g., 1), aps_extension_data_flag may be signaled. aps_extension_data_flag may have any value. Presence and value of aps_extension_data_flag do not affect decoder conformance to profiles.

Tile Inventory Syntax Structure

FIG. 26 shows an example of a syntax structure of a tile inventory. The tile inventory may be referred to as a tile parameter set (TPS). In FIG. 26, syntax elements (or fields) expressed in the syntax structure of the TPS may be syntax elements included in the TPS or syntax elements signaled through the TPS.

tile_frame_idx may contain an identifying number that may be used to identify the purpose of the tile inventory. tile_seq_parameter_set_id may specify the value of sps_seq_parameter_set_id for the active SPS. tile_id_present_flag may specify parameters for identifying tiles. For example, tile_id_present_flag equal to a first value (e.g., 1) may specify that tiles are identified according to the value of the tile_id syntax element. tile_id_present_flag equal to a second value (e.g., 0) may specify that tiles are identified according to their position in the tile inventory. tile_cnt may specify the number of tile bounding boxes present in the tile inventory. tile_bounding_box_bits may specify the bitdepth to represent the bounding box information for the tile inventory. While the loop variable tileIdx increases by 1 from 0 to (the number of tile bounding boxes−1), tile_id, tile_bounding_box_offset_xyz[tile_id][k], and tile_bounding_box_size_xyz[tile_id][k] may be signaled. tile_id may identify a particular tile within the the inventory. tile_id may be signaled when the value of tile_id_present_flag is equal to a first value (e.g., 1) and may be signaled by the number of tile bounding boxes. When tile_id is not present (not signaled), the value of tile_id is inferred to be the index of the tile within the tile inventory as given by the loop variable tileIdx. It is a requirement of bitstream conformance that all values of tile_id are unique within a tile inventory. tile_bounding_box_offset_xyz[tileId][k] and tile_bounding_box_size_xyz[tileId][k] and tile_bounding_box_offset_xyz[tileId][k] may indicate the bounding box containing the slice identified by the same gsh_tile_id as tileId. tile_bounding_box_offset_xyz[tileId][k] may be the k-th component of the (x, y, z) origin co-ordinate of the tile bounding box relative to TileOrigin[k]. tile_bounding_box_size_xyz[tileId][k] may be the k-th component of the tile bounding box width, height, and depth, respectively.

While the variable k increases by one from 0 to 2, tile_origin_xyz[k] may be signaled. tile_origin_xyz[k] may specify the k-th component of the tile origin in Cartesian co-ordinates. The value of tile_origin_xyz[k] should be equal to sps_bounding_box_offset[k]. tile_origin_log2_scale may specify a scaling factor to scale components of tile_origin_xyz. The value of tile_origin_log2_scale should be equal to sps_bounding_box_offset_log2_scale. The array TileOrigin, with elements TileOrigin[k] for k=0 . . . 2, is derived by 'TileOrigin[k]=tile_origin_xyz[k] <<tile_origin_log2_scale'.

Geometry Slice Syntax Structure

FIGS. 27 and 28 illustrate an example of a syntax structure of a geometry slice. The syntax elements (or fields) shown in FIGS. 27 and 28 may be syntax elements included in a geometry slice or syntax elements signaled through the geometry slice.

A bitstream transmitted from a transmission device to a reception device may include one or more slices. Each slice may include a geometry slice and an attribute slice. Here, the geometry slice may be a geometry slice bitstream, and the attribute slice may be an attribute slice bitstream. A geometry slice may include a geometry slice header (GSH), and an attribute slice may include an attribute slice header (ASH).

As illustrated in FIG. 27a, a geometry slice bitstream (geometry_slice_bitstream( )) may include a geometry slice header (geometry_slice_header( )) and geometry slice data (geometry_slice_data( )). The geometry slice data may include geometry or geometry related data associated with a part or entire point clouds. As illustrated in FIG. 27b, syntax elements signaled through the geometry slice header are as follows.

gsh_geometry_parameter_set_id may specify the value of the gps_geom_parameter_set_id of the active GPS. gsh_tile_id may specify the value of the tile id that is referred to by the GSH. gsh_slice_id may specify the identifier of the slice for reference by other syntax elements. frame_idx may specify the log2_max_frame_idx+1 least significant bits of a notional frame number counter. Consecutive slices with differing values of frame_idx may form parts of different output point cloud frames. Consecutive slices with identical values of frame_idx without an intervening frame boundary marker data unit may form parts of the same output point cloud frame. gsh_num_points may specify the maximum number of coded points in the slice. It is a requirement of bitstream conformance that the value of gsh_num_points is greater than or equal to the number of decoded points in the slice.

When the value of gps_box_present_flag is equal to a first value (e.g., 1), gsh_box_log2_scale, gsh_box_origin_x, gsh_box_origin_y, and gsh_box_origin_z may be signaled. In some embodiments, gsh_box_log2_scale may be signaled when the value of gps_box_present_flag is equal to a first value (e.g., 1) and the value of gps_gsh_box_log2_scale_present_flag is equal to a first value (e.g., 1). gsh_box_log2_scale may specify the scaling factor of bounding box origin for the slice. gsh_box_origin_x may specify the x value of bounding box origin that scaled by gsh_box_log2_scale value. gsh_box_origin_y may specify the y value of bounding box origin that scaled by gsh_box_log2_scale value. gsh_box_origin_z may specify the z value of bounding box origin that scaled by gsh_box_log2_scale value. The variable slice_origin_x, slice_origin_y, and/or slice_origin_z may be derived as follows:

If gps_gshbox_log2_scale_present_flag is equal to a second value (e.g., 0), originScale is set equal to gsh_box_log2_scale. Otherwise, if gps_gsh_box_log2_scale_present_flag is equal to a first value (e.g., 1), originScale is set equal to gps_gsh_box_log2_scale. If gps_box_present_flag is equal to a second value (e.g., 0), the value of slice_origin_x and slice_origin_y and slice_origin_z may be inferred to be 0. Otherwise, if gps_box_present_flag is equal to a first value (e.g., 1), the following equations may apply:

slice_origin_x=gsh_box_origin_x<<originScale slice_origin_y=gsh_box_origin_y<<originScale slice_origin_z=gsh_box_origin_z<<originScale When the value of gps_implicit_geom_partition_flag is equal to a first value (e.g., 1), gsh_log2_max_nodesize_x, gsh_log2_max_nodesize_y_minus_x, gsh_log2_max_nodesize_z_minus_y may be further signaled. If the value of gps_implicit_geom_partition_flag is equal to a second value (e.g., 0), gsh_log2_max_nodesize may be signaled.

gsh_log2_max_nodesize_x may specify the bounding box size in the x dimension, i.e., MaxNodesizeXLog2 that is used in the decoding process as follows.

MaxNodeSizeXLog2 = gsh_log2_max_nodesize_x
MaxNodeSizeX = 1 << MaxNodeSizeXLog2 gsh_log2_max_nodesize_y_minus_x may specify the bounding box size in the y dimension, i.e., MaxNodesizeYLog2 that is used in the decoding process as follows:

MaxNodeSizeYLog2=gsh_log2_max_nodesize_y_minus_x + MaxNodeSizeXLog2.
MaxNodeSizeY = 1 << MaxNodeSizeYLog2.

gsh_log2_max_nodesize_z_minus_y may specify the bounding box size in the z dimension, i.e., MaxNodesizeZLog2 that is used in the decoding process as follows.

MaxNodeSizeZLog2=gsh_log2_max_nodesize_z_minus_y + MaxNodeSizeYLog2
MaxNodeSizeZ = 1 << MaxNodeSizeZLog2 gsh_log2_max_nodesize may specify the size of the root geometry octree node when gps_implicit_geom_partition_flag is equal to a first value (e.g., 1). The variables MaxNodeSize, and MaxGeometryOctreeDepth are derived as follows.

MaxNodeSize = 1 << gsh_log2_max_nodesize
MaxGeometryOctreeDepth = gsh_log2_max_nodesize − log2_trisoup_node_size When the value of geom_scaling_enabled_flag is equal to a first value (e.g., 1), geom_slice_qp_offset and geom_octree_qp_offsets_enabled_flag may be signaled. geom_slice_qp_offset may specify an offset to the base geometry quantisation parameter geom_base_qp. geom_octree_qp_offsets_enabled_flag may specify whether geom_node_qp_offset_eq0_flag may be present in the geometry node syntax geom_octree_qp_offsets_enabled_flag equal to a first value (e.g., 1) may specify that geom_node_qp_offset_eq0_flag may be present in the geometry node syntax. geom_octree_qp_offsets_enabled_flag equal to a second value (e.g., 0) may specify that geom_node_qp_offset_eq0_flag is not present in the geometry node syntax. When the value of geom_octree_qp_offsets_enabled_flag is equal to a first value (e.g., 1), geom_octree_qp_offsets_depth may be signaled. geom_octree_qp_offsets_depth may specify the depth of the geometry octree when geom_node_qp_offset_eq0_flag is present in the geometry node syntax.

As illustrated in FIG. 28, syntax elements signaled through geometry slice data may be as follows. The geometry slice data may include a loop (first loop) that is repeated by the value of MaxGeometryOctreeDepth. MaxGeometryOctreeDepth may represent the maximum value of the depth of the geometry octree. In the first loop, depth may increase by 1 from 0 to (MaxGeometryOctreeDepth−1). The first loop may include a loop (second loop) that is repeated by the value of NumNodesAtDepth. NumNodesAtDepth[depth] may indicate the number of nodes to be decoded at the depth. In the second iteration, nodeidx may increase by 1 from 0 to (NumNodesAtDepth−1). Through the first loop and the second loop, xN=NodeX[depth][nodeIdx], yN=NodeY[depth][nodeIdx], zN=NodeZ[depth][nodeIdx], geometry_node(depth, nodeIdx, xN, yN, zN) may be signaled. Variables NodeX[depth][nodeIdx], NodeY[depth][nodeIdx], NodeZ[depth][nodeIdx] may represent x, y, z coordinates of the Idx-th node in decoding order at a given depth. A geometry bitstream of the node of the depth may be transmitted through geometry_node(depth, nodeIdx, xN, yN, zN).

When the value of log2_trisoup_node_size is greater than 0, geometry_trisoup_data( ) may be further signaled. That is, if the size of the triangle nodes is greater than 0, the trisoup geometry-encoded geometry bitstream may be signaled through geometry_trisoup_data( ).

Attribute Slice Syntax Structure

FIGS. 29 and 30 illustrate an example of a syntax structure of an attribute slice. The syntax elements (or fields) shown in FIGS. 29 and 30 may be syntax elements included in an attribute slice or syntax elements signaled through the attribute slice.

As illustrated in FIG. 29a, an attribute slice bitstream (attribute_slice_bitstream( )) may include an attribute slice header (attribute_slice_header( )) and attribute slice data (attribute_slice_data( )). The attribute slice data attribute_slice_data( ) may contain the attribute or attribute related data associated with a part or entire point clouds. As illustrated in FIG. 29b, syntax elements signaled through the attribute slice header may be as follows.

ash_attr_parameter_set_id may specify the value of the aps_attr_parameter_set_id of the active APS. ash_attr_sps_attr_idx may specify the attribute set in the active SPS. ash_attr_geom_slice_id may specify the value of the gsh_slice_id of the active Geometry Slice Header. aps_slice_qp_delta_present_flag may specify whether ash_attr_layer_qp_delta_luma and ash_attr_layer_qp_delta_chroma syntax elements are present in the current ASH. For example, aps_slice_qp_delta_present_flag equal to a first value (e.g., 1) may specify that ash_attr_layer_qp_delta_luma and ash_attr_layer_qp_delta_chroma are present in the current ASH, and aps_slice_qp_delta_present_flag equal to a second value (e.g., 0) may specify that ash_attr_layer_qp_delta_luma and ash_attr_layer_qp_delta_chroma are not present in the current ASH. When the value of aps_slice_qp_delta_present_flag is a first value (e.g., 1), ash_attr_qp_delta_luma may be signaled. ash_attr_qp_delta_luma may specify the luma delta quantization parameter (qp) from the initial slice qp in the active attribute parameter set. When the value of attribute_dimension_minus1[ash_attr_sps_attr_idx] is greater than 0, ash_attr_qp_delta_chroma may be signaled. ash_attr_qp_delta_chroma may specify the chroma delta qp from the initial slice qp in the active attribute parameter set. The variable InitialSliceQpY and the variable InitialSliceQpC may be derived as follows.

InitialSliceQpY = aps_attrattr_initial_qp + ash_attr_qp_delta_luma
InitialSliceQpC = aps_attrattr_initial_qp + aps_attr_chroma_qp_offset + ash_attr_qp_delta_chroma When the value of ash_attr_layer_qp_delta_present_flag is equal to a first value (e.g., 1), ash_attr_num_layer_qp_minus1 may be signaled. ash_attr_num_layer_qp_minus1 plus 1 may specify the number of layer in which ash_attr_qp_delta_luma and ash_attr_qp_delta_chroma are signalled. When ash_attr_num_layer_qp is not signalled, the value of ash_attr_num_layer_qp may be inferred to be 0. The variable NumLayerQp specifying the number of layers may be derived by adding 1 to the value of ash_attr_num_layer_qp_minus1 as follows. (NumLayerQp=ash_attr_num_layer_qp_minus1+1).

When the value of ash_attr_layer_qp_delta_present_flag is equal to a first value (e.g., 1), ash_attr_layer_qp_delta_luma[i] may be repeatedly signaled by the value of NumLayerQp. i may increase by 1 from 0 to (NumLayerQp-1). In addition, in the repeated process of increasing i by 1, when the value of attribute_dimension_minus1[ash_attr_sps_attr_idx] is greater than 0, ash_attr_layer_qp_delta_chroma[i] may be further signaled. ash_attr_layer_qp_delta_luma may indicate a luma delta quantization parameter (qp) from InitialSliceQpY in each layer. ash_attr_layer_qp_delta_chroma may indicate a chroma delta quantization parameter (qp) from InitialSliceQpC in each layer. The variable SliceQpY[i] and the variable SliceQpC[i] may be derived as follows.

SliceQpY[i] = InitialSliceQpY + ash_attr_layer_qp_delta_luma[i]
SliceQpC[i] = InitialSliceQpC + ash_attr_layer_qp_delta_chroma[i]

ash_attr_region_qp_delta_present_flag may be further signaled. ash_attr_region_qp_delta_present_flag equal to a first value (e.g., 1) may indicate that ash_attr_region_qp_delta, region bounding box origin, and size are present in the current attribute slice header. ash_attr_region_qp_delta_present_flag equal to a second value (e.g., 0) indicate that ash_attr_region_qp_delta and region bounding box origin and size are not present in the current attribute slice header. When the value of ash_attr_layer_qp_delta_present_flag is equal to a first value (e.g., 1), ash_attr_qp_region_box_origin_x, ash_attr_qp_region_box_origin_y, ash_attr_qp_region_box_origin_z, ash_attr_qp_region_box_width, ash_attr_qp_region_box_height, ash_attr_qp_region_box_depth, and ash_attr_region_qp_delta may be further signaled. ash_attr_qp_region_box_origin_x may indicate the x offset of the region bounding box relative to slice_origin_x. ash_attr_qp_region_box_origin_y may indicate the y offset of the region bounding box relative to slice_origin_y. ash_attr_qp_region_box_origin_z may indicate the z offset of the region bounding box relative to slice_origin_z. ash_attr_qp_region_box_size_width may indicate the width of the region bounding box. ash_attr_qp_region_box_size_height may indicate the height of the region bounding box. ash_attr_qp_region_box_size_depth may indicate the depth of the region bounding box. ash_attr_region_qp_delta may specify the delta qp from the SliceQpY[i] and SliceQpC[i] of the region specified by ash_attr_qp_region_box. The variable RegionboxDeltaQp specifying the region box delta quantization parameter may be set equal to ash_attr_region_qp_delta.

As illustrated in FIG. 30, syntax elements signaled through attribute slice data may be as follows. Zerorun may indicate the number of preceding zeros in residual or predIndex. predIndex[i] may indicate a predictor index for decoding the i-th point value of the attribute. The value of predIndex[i] may have a range from 0 to the value of max_num_predictors.

Metadata Slice Syntax Structure

FIG. 31 shows an example of a syntax structure of a metadata slice. The syntax elements (or fields) shown in FIG. 31 may be syntax elements included in an attribute slice or syntax elements signaled through the attribute slice.

As illustrated in (a) of FIG. 31, the metadata slice bitstream (metadata_slice_bitstream( )) may include a metadata slice header (metadata_slice_header( )) and metadata slice data (metadata_slice_data(_). (b) of FIG. 31 shows an example of a metadata slice header, and (c) of FIG. 31 shows an example of metadata slice data.

As illustrated in (b) of FIG. 31, syntax elements signaled through the metadata slice header may be as follows. msh_slice_id may indicate an identifier for identifying the meta data slice bitstream. msh_geom_slice_id may indicate an identifier for identifying a geometry slice related to metadata carried to the metadata slice. msh_attr_id may indicate an identifier for identifying an attribute related to metadata carried to the metadata slice. msh_attr_slice_id may indicate an identifier for identifying an attribute slice related to metadata carried to the metadata slice. As illustrated in (c) of FIG. 31, a metadata bitstream (metadata_bitstream( )) may be signaled through metadata slice data.

TLV Structure

As described above, the G-PCC bitstream may mean a bitstream of point cloud data consisting of a sequence of TLV structures. The TLV structure may be referred to as "TLV encapsulation structure", "G-PCC TLV encapsulation structure", or "G-PCC TLV structure".

Figure 32:
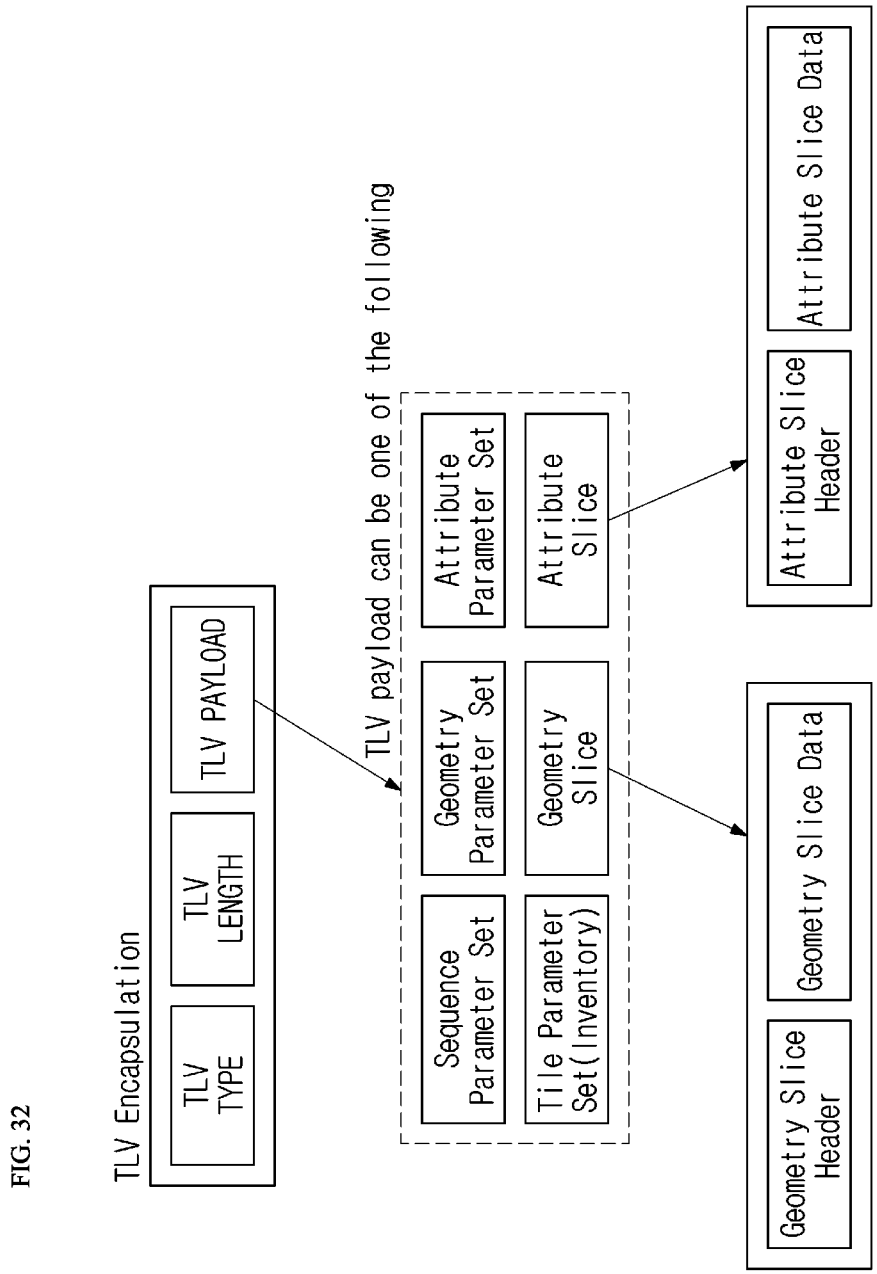
FIG. 32 illustrates an example of a TLV encapsulation structure according to embodiments of the present disclosure.

An example of a TLV encapsulation structure is shown in FIG. 32, an example of a syntax structure of TLV encapsulation is shown in FIG. 33a, and an example of a payload type of the TLV encapsulation structure is shown in FIG. 33b. As illustrated in FIG. 32, each TLV encapsulation structure may be composed of a TLV type (TLV TYPE), a TLV length (TLV LENGTH), and/or a TLV payload (TLV PAYLOAD). The TLV type may be type information of the TLV payload, the TLV length may be length information of the TLV payload, and the TLV payload may be a payload (or payload bytes). Referring to the TLV encapsulation syntax structure (tlv_encapsulation( )) illustrated in FIG. 33a, tlv_type may indicate type information of the TLV payload, and tlv_num_payload_bytes may indicate length information of the TLV payload. Also, tlv_payload_byte[i] may indicate the TLV payload. tlv_payload_byte[i] may be signaled by the value of tlv_num_payload_bytes, and i may increase by 1 from 0 to (tlv_num_payload_bytes−1).

TLV payloads may include an SPS, a GPS, one or more APSs, a tile inventory, a geometry slice, one or more attribute slices, and one or more metadata slices. In some embodiments, the TLV payload of each TLV encapsulation structure may include an SPS, a GPS, one or more APSs, a tile inventory, a geometry slice, one or more attribute slices, and one or more metadata slices according to the type information of the TLV payload. Data included in the TLV payload may be distinguished through type information of the TLV payload. For example, as illustrated in FIG. 33b, tlv_type equal to 0 may indicates that data included in the TLV payload is an SPS, and tlv_type equal to 1 may indicate that the data included in the TLV payload is a GPS. tlv_type equal to 2 may indicate that data included in the TLV payload is a geometry slice, tlv_type equal to 3 may indicate that data included in the TLV payload is an APS. tlv_type equal to 4 may indicate that data included in the TLV payload is an attribute slice, and tlv_type equal to 5 may indicate that data included in the TLV payload is a tile inventory (or tile parameter set). tlv_type equal to 6 may indicate that data included in the TLV payload is a frame boundary marker, and tlv_type equal to 7 may indicate that data included in the TLV payload is a metadata slice. The payload of the TLV encapsulation structure may conform to the format of a High Efficiency Video Coding (HEVC) Network Abstraction Layer (NAL) unit.

The information included in the SPS in the TLV payload may include some or all of the information included in the SPS of FIG. 21. The information included in the tile inventory in the TLV payload may include some or all of the information included in the tile inventory of FIG. 26. The information included in the GPS in the TLV payload may include some or all of the information included in the GPS of FIG. 23. The information included in the APS in the TLV payload may include some or all of the information included in the APS of FIG. 24. The information included in the geometry slice in the TLV payload may include some or all of the information included in the geometry slice of FIGS. 27 and 28. The information included in the attribute slice in the TLV payload may include all or part of the information included in the attribute slice of FIGS. 29 and 30. The information included in the meta data slice in the TLV payload may include all or part of the information included in the meta data slice of FIG. 31.

Encapsulation/Decapsulation

Such a TLV encapsulation structure may be generated by the transmission unit, transmission processing unit, and encapsulation unit mentioned in this specification. The G-PCC bitstream composed of TLV encapsulation structures may be transmitted to the reception device without change, or may be encapsulated and transmitted to the reception device. For example, the encapsulation processing unit 1525 may encapsulate a G-PCC bitstream composed of TLV encapsulation structures in the form of a file/segment and transmit it. The decapsulation processing unit 1710 may acquire a G-PCC bitstream by decapsulating the encapsulated file/segment.

In some embodiments, the G-PCC bitstream may be encapsulated in an ISOBMFF-based file format. In this case, the G-PCC bitstream may be stored in a single track or multiple tracks in the ISOBMFF file. Here, the single track or multiple tracks in a file may be referred to as "tracks" or "G-PCC tracks". The ISOBMFF-based file may be referred to as a container, a container file, a media file, a G-PCC file, and the like. Specifically, the file may be composed of boxes and/or information that may be referred to as ftyp, moov, mdat, and the like.

The ftyp box (file type box) may provide file type or file compatibility related information for the file. The reception device may identify the file by referring to the ftyp box. The mdat box is also called a media data box and may include actual media data. In some embodiments, a geometry slice (or coded geometry bitstream) and zero or more attribute slices (or coded attribute bitstream) may be included in a sample of an mdat box in a file. Here, the sample may be referred to as a G-PCC sample. The moov box is also called a movie box, and may include metadata for media data of the file. For example, the moov box may include information necessary for decoding and playback of the media data, and may include information on tracks and samples of the file. The moov box may act as a container for all metadata. The moov box may be a box of the uppermost layer among metadata-related boxes.

In some embodiments, the moov box may include a track (trak) box providing information related to a track of a file, and the trak box may include a media (mdia) box (MediaBox) providing media information of the track, and a track reference container (tref) box for linking (referencing) the track and a sample of a file corresponding to the track. The media box MediaBox may include a media information container (minf) box that provides information on the media data and a handler (hdlr) box that indicates a stream type. The minf box may include a sample table (stbl) box that provides metadata related to a sample of the mdat box. The stbl box may include a sample description (stsd) box that provides information on a used coding type and initialization information required for the coding type. In some embodiments, a sample description (stsd) box may include a sample entry for a track. In some embodiments, signaling information (or metadata) such as SPS, GPS, APS, and tile inventory may be included in a sample entry of a moov box or a sample of an mdat box in a file.

A G-PCC track may be defined as a volumetric visual track carrying a geometry slice (or coded geometry bitstream) or attribute slice (or coded attribute bitstream), or both a geometry slice and an attribute slice. In some embodiments, the volumetric visual track may be identified by a volumetric visual media handler type 'volv' in a handler box HandlerBox of a media box (MediaBox) and/or a volumetric visual media header vvhd in a minf box of a media box MediaBox. The minf box may be referred to as a media information container or a media information box. The minf box may be included in the media box MediaBox, the media box MediaBox may be included in the track box, and the track box may be included in the moov box of the file. A single volumetric visual track or multiple volumetric visual tracks may be present in a file.

Volumetric Visual Media Header Box (VolumetricVisualMediaHeaderBox)

Volumetric visual tracks may use a volumetric visual media header (vvhd) box in a media information box (MediaInformationBox). The volumetric visual media header box may be defined as follows.

Box Type: 'vvhd'
  Container: MediaInformationBox
  Mandatory: Yes
  Quantity: Exactly one The syntax of the volumetric visual media header box may be as follows.

```
aligned(8) class VolumetricVisualMediaHeaderBox
    extends FullBox('vvhd', version = 0, 1) {
}
```

In the above syntax, the version may be an integer value indicating the version of the volumetric visual media header box.

Volumetric Visual Sample Entry (VolumetricVisualSampleEntry)

In some embodiments, the volumetric visual tracks may use the volumetric visual sample entry as follows for transmission of signaling information.

```
class VolumetricVisualSampleEntry(codingname) extends SampleEntry
    (codingname)
{
    unsigned int(8)[32] compressorname;
    // other boxes from derived specifications
}
```

In the above syntax, compressomame may indicate the name of a compressor for informative purposes. In some embodiments, a sample entry (i.e., a higher class of Volumetric VisualSampleEntry) from which a volumetric visual sample entry VolumetricVisualSampleEntry is inherited may include a GPCC decoder configuration box GPCCConfigurationBox.

G-PCC Decoder Configuration Box (GPCCConfigurationBox)

In some embodiments, the G-PCC decoder configuration box may include GPCCDecoderConfigurationRecord( ) as follows.

```
class GPCCConfigurationBox extends Box('gpcC') {
    GPCCDecoderConfigurationRecord( ) GPCCConfig;
}
```

In some embodiments, GPCCDecoderConfigurationRecord( ) may provide G-PCC decoder configuration information for geometry-based point cloud content. The syntax of GPCCDecoderConfigurationRecord( ) may be defined as follows.

```
aligned(8) class GPCCDecoderConfigurationRecord {
    unsigned int(8) configurationVersion = 1;
    unsigned int(8) profile_idc;
    unsigned int(24) profile_compatibility_flags
    unsigned int(8) level_idc;
    unsigned int(8) numOfSetupUnitArrays;
    for (i=0; i< numOfSetupUnitArrays; i++) {
        unsigned int(7) SetupUnitType;
        bit(1) SetupUnit completeness;
        unsigned int(8) numOfSepupUnit;
        for (i=0; numOfSepupUnit; i++) {
            tlv_encapsulation setupUnit;
        }
    }
    // additional fields
}
``` configurationVersion may be a version field. Incompatible changes to the record may be indicated by a change in the version number. Values for profile_idc, profile_compatibility_flags, and level_idc may be valid for all parameter sets activated when a bitstream described by the record is decoded. profile_idc may indicate a profile to which a bitstream related to the configuration record conforms. profile_idc may include a profile code to indicate a specific profile of G-PCC. profile_compatibility_flags equal to 1 may indicate that the bitstream conforms to the profile indicated by the profile_idc field. Each bit in profile_compatibility_flags may be set only when all parameter sets set the bit. level_idc may include a profile level code. level_idc may indicate a capability level equal to or higher than the highest level indicated for the highest tier in all parameter sets. numOfSetupUnitArrays may indicate the number of arrays of G-PCC setup units of the type indicated by setupUnitTye. That is, numOfSetupUnitArrays may indicate the number of arrays of G-PCC setup units included in GPCCDecoderConfigurationRecord( ). setupUnitType, setupUnit_completeness, and numOfSetupUnits may be further included in GPCCDecoderConfigurationRecord( ). setupUnitType, setupUnit_completeness, and numOfSetupUnits are contained by a loop that is repeated by the value of numOfSetupUnitArrays, and this loop can be repeated while increasing by 1 until i is from 0 to (numOfSetupUnitArrays−1). setupUnitType may indicate the type of G-PCC setupUnits. That is, the value of setupUnitType may be one of values indicating SPS, GPS, APS, or tile inventory. setupUnit_completeness equal to 1 may indicate that all setup units of a given type are in the next array, and there is nothing in the stream. In addition, the setupUnit_completeness field equal to 0 may indicate that additional setup units of the indicated type are present in the stream. numOfSetupUnits may indicate the number of G-PCC setup units of the type indicated by setupUnitTye. setupUnit(tlv_encapsulatuon setupUnit) may be further included in GPCCDecoderConfigurationRecord( ). setupUnit is included by a loop that is repeated by the value of numOfSetupUnits, and this loop may be repeated while increasing by 1 until i is from 0 to (numOfSetupUnits−1). A setupUnit may be an instance of a setup unit of the type indicated by setupUnitTye, for example, SPS, GPS, APS, or TLV encapsulation structure carrying a tile inventory.

Volumetric Visual Tracks may use a volumetric visual sample (VolumetricVisualSample) for transmission of actual data. A volumetric visual sample entry may be referred to as a sample entry or a G-PCC sample entry, and a volumetric visual sample may be referred to as a sample or a G-PCC sample. A single volumetric visual track may be referred to as a single track or G-PCC single track, and multiple volumetric visual tracks may be referred to as multiple tracks or multiple G-PCC tracks. Signaling information related to grouping of samples, grouping of tracks, single track encapsulation of a G-PCC bitstream, or multiple-track encapsulation of a G-PCC bitstream, or signaling information to support spatial access may be added to the sample entry in the form of a box or a FullBox. The signaling information may include at least one of a GPCC entry information box (GPCCEntryInfoBox), a GPCC component type box (GPCCComponentTypeBox), a cubic region information box (CubicRegionInfoBox), a 3D bounding box information box (3DBoundingBoxInfoBox), or a tile inventory box (TileInventoryBox).

GPCC Entry Information Structure

The syntax structure of the G-PCC entry information box (GPCCEntryInfoBox) may be defined as follows.

```
class GPCCEntryInfoBox extends Box('gpsb') {
GPCCEntryInfoStruct ( );
}
```

In the above syntax structure, a GPCCEntryInfoBox having a sample entry type of 'gpsb' may include GPCCEntryInfoStruct( ). The syntax of GPCCEntryInfoStruct( ) may be defined as follows.

```
aligned(8) class GPCCEntryInfoStruct {
unsigned int (1) main_entry_flag;
unsigned int(1) dependent_on;
if (dependent_on) { //non-entry
unsigned int(16) dependency_id;
}
}
```

GPCCEntryInfoStruct( ) may include main_entry_flag and dependent_on. main_entry_flag may indicate whether or not it is an entry point for decoding the G-PCC bitstream. dependent_on indicates whether its decoding is dependent on others. If dependent_on is present in a sample entry, dependent_on may indicate that decoding of samples in a track is dependent on other tracks. If the value of dependent_on is 1, GPCCEntryInfoStruct( ) may further include dependency_id. dependency_id may indicate an identifier of tracks for decoding related data. If dependency_id is present in a sample entry, dependency_id may indicate an identifier of a track carrying a G-PCC sub-bitstream on which decoding of samples in the track is dependent. If dependency_id is present in a sample group, dependency_id may indicate an identifier of samples carrying a G-PCC sub-bitstream on which decoding of related samples is dependent.

G-PCC Component Information Structure

The syntax structure of the G-PCC component type box (GPCCComponentTypeBox) may be defined as follows.

```
aligned(8) class GPCCComponentTypeBox extends FullBox('gtyp',
version = 0, 0) {
GPCCComponentTypeStruct( );
}
```

A GPCCComponentTypeBox having a sample entry type of 'gtyp' may include GPCCComponentTypeStruct( ). The syntax of GPCCComponentTypeStruct( ) may be defined as follows.

```
aligned(8) class GPCCComponentTypeStruct {
unsigned int(8) numOfComponents;
for (i=0; i< numOfComponents; i++) {
unsigned int(8) gpcc_type;
if(gpcc_type == 4)
unsigned int(8) AttrIdx;
}
// additional fields
}
``` numOfComponents may indicate the number of G-PCC components signaled to the GPCCComponentTypeStruct. gpcc_type may be included in GPCCComponentTypeStruct by a loop that is repeated by the value of numOfComponents. This loop can be repeated while increasing by 1 until i is from 0 to (numOfComponents−1). gpcc_type may indicate the type of the G-PCC component. For example, if the value of gpcc_type is 2, it may indicate a geometry component, and if it is 4, it may indicate an attribute component. If the value of gpcc_type is 4, that is, when it indicates an attribute component, the loop may further include AttrIdx. AttrIdx may indicate the identifier of the attribute signaled in SPS( ). A G-PCC component type box (GPCCComponentTypeBox) may be included in a sample entry for multiple tracks. If a G-PCC component type box (GPCCComponentTypeBox) is present in the sample entry of tracks carrying part or whole of the G-PCC bitstream, then GPCCComponentTypeStruct( ) may indicate one or more G-PCC component types carried by each track. GPCCComponentTypeBox including GPCCComponentTypeStruct( ) or GPCCComponentTypeStruct( ) may be referred to as G-PCC component information.

Sample Group

The encapsulation processing unit mentioned in the present disclosure may generate a sample group by grouping one or more samples. The encapsulation processing unit, the metadata processing unit, or the signaling processing unit mentioned in the present disclosure may signal signaling information associated with a sample group in a sample, a sample group, or a sample entry. That is, the sample group information associated with the sample group may be added to a sample, a sample group, or a sample entry. The sample group information may be 3D bounding box sample group information, 3D region sample group information, 3D tile sample group information, 3D tile inventory sample group information, and the like.

Track Group

The encapsulation processing unit mentioned in the present disclosure may generate a track group by grouping one or more tracks. The encapsulation processing unit, the metadata processing unit, or the signaling processing unit mentioned in the present disclosure may signal signaling information associated with a track group in a sample, a track group, or a sample entry. That is, the track group information associated with the track group may be added to a sample, track group or sample entry. The track group information may be 3D bounding box track group information, point cloud composition track group information, spatial region track group information, 3D tile track group information, 3D tile inventory track group information, and the like.

Sample Entry

FIG. 34 is a diagram for explaining an ISOBMFF-based file including a single track. (a) of FIG. 34 illustrates an example of the layout of an ISOBMFF-based file including a single track, and (b) of FIG. 34 illustrates an example of a sample structure of a mdat box when a G-PCC bitstream is stored in a single track of a file. FIG. 35 is a diagram for explaining an ISOBMFF-based file including multiple tracks. (a) of FIG. 35 illustrates an example of the layout of an ISOBMFF-based file including multiple tracks, and (b) of FIG. 35 illustrates an example of a sample structure of a mdat box when a G-PCC bitstream is stored in a single track of a file.

The stsd box (SampleDescriptionBox) included in the moov box of the file may include a sample entry for a single track storing the G-PCC bitstream. The SPS, GPS, APS, tile inventory may be included in a sample entry in a moov box or a sample in an mdat box in a file. Also, geometry slices and zero or more attribute slices may be included in the sample of the mdat box in the file. When a G-PCC bitstream is stored in a single track of a file, each sample may contain multiple G-PCC components. That is, each sample may be composed of one or more TLV encapsulation structures. A sample entry of a single track may be defined as follows.

Sample Entry Type: 'gpe1', 'gpeg'
Container: SampleDescriptionBox
Mandatory: A 'gpe1' or 'gpeg' sample entry is mandatory
Quantity: One or more sample entries may be present The sample entry type 'gpe1' or 'gpeg' is mandatory, and one or more sample entries may be present. The G-PCC track may use a VolumetricVisualSampleEntry having a sample entry type of 'gpe1' or 'gpeg'. The sample entry of the G-PCC track may include a G-PCC decoder configuration box GPCCConfigurationBox, and the G-PCC decoder configuration box may include a G-PCC decoder configuration record (GPCCDecoderConfigurationRecord( )). GPCCDecoderConfigurationRecord( ) may include at least one of configurationVersion, profile_idc, profile_compatibility_flags, level_idc, numOfSetupUnitArrays, SetupUnitType, completeness, numOfSepupUnit, or setupUnit. The setupUnit array field included in GPCCDecoderConfigurationRecord( ) may include TLV encapsulation structures including one SPS.

If the sample entry type is 'gpe1', all parameter sets, e.g., SPS, GPS, APS, tile inventory, may be included in the array of setupUints. If the sample entry type is 'gpeg', the above parameter sets may be included in the array (i.e., sample entry) of setupUints or included in the stream (i.e., sample). An example of the syntax of a G-PCC sample entry (GPCCSampleEntry) having a sample entry type of 'gpe1' is as follows.

```
aligned(8) class GPCCSampleEntry( )
extends VolumetricVisualSampleEntry ('gpe1') {
GPCCConfigurationBox config; //mandatory
3DBoundingBoxInfoBox( );
CubicRegionInfoBox( );
TileInventoryBox( );
}
```

A G-PCC sample entry (GPCCSampleEntry) having a sample entry type of 'gpe1' may include GPCCConfigurationBox, 3DBoundingBoxInfoBox( ), CubicRegionInfoBox( ), and TileInventoryBox( ). 3DBoundingBoxInfoBox ( ) may indicate 3D bounding box information of point cloud data related to samples carried by the track. CubicRegionInfoBox( ) may indicate information on one or more spatial regions of point cloud data carried by samples in the track. TileInventoryBox( ) may indicate 3D tile inventory information of point cloud data carried by samples in the track.

As illustrated in (b) of FIG. 34, the sample may include TLV encapsulation structures including a geometry slice. In addition, a sample may include TLV encapsulation structures including one or more parameter sets. In addition, a sample may include TLV encapsulation structures including one or more attribute slices.

As illustrated in (a) of FIG. 35, when a G-PCC bitstream is carried by multiple tracks of an ISOBMFF-based file, each geometry slice or attribute slice may be mapped to an individual track. For example, a geometry slice may be mapped to track 1, and an attribute slice may be mapped to track 2. The track (track 1) carrying the geometry slice may be referred to as a geometry track or a G-PCC geometry track, and the track (track 2) carrying the attribute slice may be referred to as an attribute track or a G-PCC attribute track. In addition, the geometry track may be defined as a volumetric visual track carrying a geometry slice, and the attribute track may be defined as a volumetric visual track carrying an attribute slice.

A track carrying part of a G-PCC bitstream including both a geometry slice and an attribute slice may be referred to as a multiplexed track. In the case where the geometry slice and attribute slice are stored on separate tracks, each sample in the track may include at least one TLV encapsulation structure carrying data of a single G-PCC component. In this case, each sample contains neither geometry nor attributes, and may not contain multiple attributes. Multi-track encapsulation of a G-PCC bitstream may enable a G-PCC player to effectively access one of the G-PCC components. When a G-PCC bitstream is carried by multiple tracks, in order for a G-PCC player to effectively access one of the G-PCC components, the following conditions need to be satisfied.

a) When a G-PCC bitstream consisting of TLV encapsulation structures is carried by multiple tracks, the track carrying the geometry bitstream (or geometry slice) becomes the entry point.

b) In the sample entry, a new box is added to indicate the role of the stream included in the track. The new box may be the aforementioned G-PCC component type box (GPCCComponentTypeBox). That is, GPCCComponentTypeBox may be included in the sample entry for multiple tracks.

c) Track reference is introduced from a track carrying only a G-PCC geometry bitstream to a track carrying a G-PCC attribute bitstream.

GPCCComponentTypeBox may include GPCCComponentTypeStruct( ). If a GPCCComponentTypeBox is present in the sample entry of tracks carrying part or whole of the G-PCC bitstream, then GPCCComponentTypeStruct( ) may specify the type (e.g., geometry, attribute) of one or more G-PCC components carried by each track. For example, if the value of the gpcc_type field included in GPCCComponentTypeStruct( ) is 2, it may indicate a geometry component, and if it is 4, it may indicate an attribute component. In addition, when the value of the gpcc_type field indicates 4, that is, an attribute component, an AttrIdx field indicating an attribute identifier signaled to SPS( ) may be further included.

In the case where the G-PCC bitstream is carried by multiple tracks, the syntax of the sample entry may be defined as follows.

Sample Entry Type: 'gpe1', 'gpeg', 'gpc1' or 'gpcg'
Container: SampleDescriptionBox
Mandatory: 'gpc1', 'gpcg' sample entry is mandatory
Quantity: One or more sample entries may be present The sample entry type 'gpc1', 'gpcg', 'gpc1' or 'gpcg' is mandatory, and one or more sample entries may be present. Multiple tracks (e.g., geometry or attribute tracks) may use a VolumetricVisualSampleEntry having a sample entry type of 'gpc1', 'gpcg', 'gpc1' or 'gpcg'. In the 'gpe1' sample entry, all parameter sets may be present in the setupUnit array. In the 'gpeg' sample entry, the parameter set is present in the array or stream. In the 'gpe1' or 'gpeg' sample entry, the GPCCComponentTypeBox shall not be present. In the 'gpc1' sample entry, the SPS, GPS and tile inventory may be present in the SetupUnit array of the track carrying the G-PCC geometry bitstream. All relevant APSs may be present in the SetupUnit array of the track carrying the G-PCC attribute bitstream. In the 'gpcg' sample entry, an SPS, GPS, APS or tile inventory may be present in the array or stream. In the 'gpc1' or 'gpcg' sample array, the GPCC-ComponentTypeBox shall be present.

An example of the syntax of the G-PCC sample entry is as follows.

```
aligned(8) class GPCCSampleEntry( )
    extends VolumetricVisualSampleEntry (codingname) {
    GPCCConfigurationBox      config; //mandatory
    GPCCComponentTypeBox      type;   // optional
}
```

The compressorname, that is, codingname, of the base class VolumetricVisualSampleEntry may indicate the name of a compressor used together with the recommended "013GPCC coding" value. In "\013GPCC coding", the first byte (octal number 13 or decimal number 11 represented by \013) is the number of remaining bytes, and may indicate the number of bytes of the remaining string. congif may include G-PCC decoder configuration information. info may indicate G-PCC component information carried in each track. info may indicate the component tile carried in the track, and may also indicate the attribute name, index, and attribute type of the G-PCC component carried in the G-PCC attribute track.

Sample Format

When the G-PCC bitstream is stored in a single track, the syntax for the sample format is as follows.

```
aligned(8) class GPCCSample
{
unsigned int GPCCLength = sample_size; //Size of Sample
for (i=0; i< GPCCLength; ) // to end of the sample
{
tlv_encapsulation gpcc_unit;
i += (1+4)+ gpcc_unit.tlv_num_payload_bytes;
}
}
```

In the above syntax, each sample (GPCCSample) corresponds to a single point cloud frame, and may be composed of one or more TLV encapsulation structures belonging to the same presentation time. Each TLV encapsulation structure may include a single type of TLV payload. In addition, one sample may be independent (e.g., a sync sample). GPCCLength indicates the length of the sample, and gpcc_unit may include an instance of a TLV encapsulation structure including a single G-PCC component (e.g., a geometry slice).

When the G-PCC bitstream is stored in multiple tracks, each sample may correspond to a single point cloud frame, and samples contributing to the same point cloud frame in different tracks may have to have the same presentation time. Each sample may consist of one or more G-PCC units of the G-PCC component indicated in the GPCCComponentInfoBox of the sample entry and zero or more G-PCC units carrying one of a parameter set or a tile inventory. When a G-PCC unit including a parameter set or a tile inventory is present in a sample, the F-PCC sample may need to appear before the G-PCC unit of the G-PCC component. Each sample may contain one or more G-PCC units containing an attribute data unit, and zero or more G-PCC units carrying a parameter set. In the case where the G-PCC bitstream is stored in multiple tracks, the syntax and semantics for the sample format may be the same as the syntax and semantics for the case where the G-PCC bitstream is stored in a single track described above.

Subsample

In the receiving device, since the geometry slice is first decoded and the attribute slice needs to be decoded based on the decoded geometry, when each sample consists of multiple TLV encapsulation structures, it is necessary to access each TLV encapsulation structure in the sample. In addition, if one sample is composed of multiple TLV encapsulation structures, each of the multiple TLV encapsulation structures may be stored as a sub-sample. A subsample may be referred to as a G-PCC subsample. For example, if one sample includes a parameter set TLV encapsulation structure including a parameter set, a geometry TLV encapsulation structure including a geometry slice, and an attribute TLV encapsulation structure including an attribute slice, the parameter set TLV encapsulation structure, the geometry TLV encapsulation structure, and the attribute TLV encapsulation structure may be stored as subsamples, respectively. In this case, in order to enable access to each G-PCC component in the sample, the type of the TLV encapsulation structure carried by the subsample may be required.

When the G-PCC bitstream is stored in a single track, the G-PCC subsample may include only one TLV encapsulation structure. One Sub SampleInformationBox may be present in a sample table box (SampleTableBox, stbl) of a moov box, or may be present in a track fragment box (TrackFragmentBox, traf) of each of the movie fragment boxes (MovieFragmentBox, moof). If the SubSampleInformationBox is present, the 8-bit type value of the TLV encapsulation structure may be included in the 32-bit codec_specific_parameters field of the sub-sample entry in the SubSampleInformationBox. If the TLV encapsulation structure includes the attribute payload, the 6-bit value of the attribute index may be included in the 32-bit codec_specific_parameters field of the subsample entry in the SubSampleInformationBox. In some embodiments, the type of each subsample may be identified by parsing the codec_specific_parameters field of the subsample entry in the SubSampleInformationBox. Codec_specific_parameters of SubSampleInformationBox may be defined as follows.

```
if (flags == 0) {
unsigned int(8) PayloadType;
if(PayloadType = 4) { // attribute payload
unsigned int(6) AttrIdx;
bit(18) reserved = 0;
}
else
bit(24) reserved = 0;
} else if (flags == 1) {
unsigned int(1)          tile_data;
bit(7)                   reserved = 0;
```

```
    if (tile_data)
    unsigned int(24)              tile_id;
    else
    bit(24)                       reserved = 0;
}
```

In the above subsample syntax, payloadType may indicate the tlv_type of the TLV encapsulation structure in the subsample. For example, if the value of payloadType is 4, the attribute slice (i.e., attribute slice) may be indicated. attrIdx may indicate an identifier of attribute information of a TLV encapsulation structure including an attribute payload in the subsample. attrIdx may be the same as ash_attr_sps_attr_idx of the TLV encapsulation structure including the attribute payload in the subsample. tile_data may indicate whether a subsample includes one tile or another tile. When the value of tile_data is 1, it may indicate that the subsample includes TLV encapsulation structure(s) including a geometry data unit or an attribute data unit corresponding to one G-PCC tile. When the value of tile_data is 0, it may indicate that the subsample includes TLV encapsulation structure(s) including each parameter set, tile inventory, or frame boundary marker. tile_id may indicate an index of a G-PCC tile with which a subsample is associated in a tile inventory.

When the G-PCC bitstream is stored in multiple tracks (in case of multiple-track encapsulation of G-PCC data in ISOBMFF), if subsamples are present, only SubSampleInformationBox whose flag is 1 in SampleTableBox or TrackFragmentBox of each MovieFragmentBox may need to be present. In the case where the G-PCC bitstream is stored in multiple tracks, the syntax elements and semantics may be the same as the case where flag=1 in the syntax elements and semantics when the G-PCC bitstream is stored in a single track.

Reference Between Tracks

When the G-PCC bitstream is carried in multiple tracks (that is, when the G-PCC geometry bitstream and the attribute bitstream are carried in different (separate) tracks), in order to connect between the tracks, a track reference tool may be used. One TrackReferenceTypeBoxes may be added to a TrackReferenceBox in the TrackBox of a G-PCC track. The TrackReferenceTypeBox may contain an array of track IDs specifying the tracks referenced by the G-PCC track.

In some embodiments, the present disclosure may provide a device and method for supporting temporal scalability in the carriage of G-PCC data (hereinafter, may be referred to as a G-PCC bitstream, an encapsulated G-PCC bitstream, or a G-PCC file). In addition, the present disclosure may propose a device and methods for providing a point cloud content service, which efficiently stores a G-PCC bitstream in a single track in a file, or divisionally stores it in a plurality of tracks, and provides a signaling therefor. In addition, the present disclosure proposes a device and methods for processing a file storage technique to support efficient access to a stored G-PCC bitstream.

Temporal Scalability

Temporal scalability may refer to a function that allows the possibility of extracting one or more subsets of independently coded frames. Also, temporal scalability may refer to a function of dividing G-PCC data into a plurality of different temporal levels and independently processing each G-PCC frame belonging to different temporal levels. If temporal scalability is supported, the G-PCC player (or the transmission device and/or the reception device of the present disclosure) may effectively access a desired component (target component) among G-PCC components. In addition, if temporal scalability is supported, since G-PCC frames are processed independently of each other, temporal scalability support at the system level may be expressed as more flexible temporal sub-layering. In addition, if temporal scalability is supported, the system (the point cloud content provision system) that processes G-PCC data can manipulate data at a high level to match network capability or decoder capability, the performance of the point cloud content provision system can be improved.

Problems of Prior Art

The prior art related to the point cloud content provision system or the carriage of G-PCC data did not support temporal scalability. That is, the prior art processes G-PCC data according to only one temporal level. Therefore, the prior art cannot provide the effect according to the above-described temporal scalability support.

1. Embodiment 1

A flowchart of the embodiment 1 supporting temporal scalability is shown in FIGS. 36 to 39.

Figure 36:
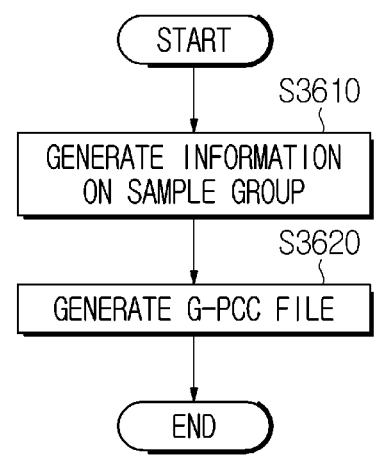
FIGS. 36 and 37 are flowcharts illustrating an embodiment supporting temporal scalability.

Referring to FIG. 36, the transmission devices 10 and 1500 may generate information on a sample group (S3610). As described below, the sample group may be one in which samples (G-PCC samples) in a G-PCC file are grouped based on one or more temporal levels. Also, the transmission devices 10 and 1500 may generate the G-PCC file (S3620). Specifically, the transmission devices 10 and 1500 may generate the G-PCC file including the point cloud data, information on the sample group, and/or information on the temporal levels. Steps S3610 and S3620 may be performed by one or more of the encapsulation processing unit 13, the encapsulation processing unit 1525, and/or the signaling processing unit 1510. The transmission devices 10 and 1500 may signal the G-PCC file.

Figure 37:
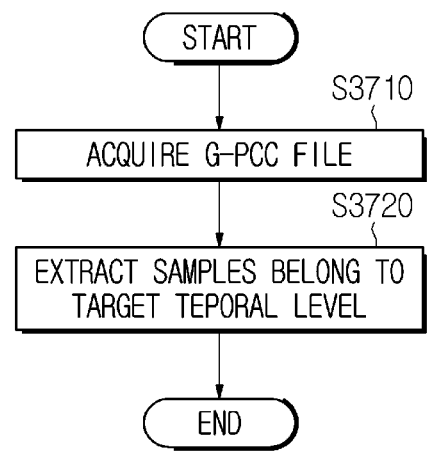

Referring to FIG. 37, the reception devices 20 and 1700 may acquire the G-PCC file (S3710). The G-PCC file may include the point cloud data, information on the sample group, and/or information on the temporal levels. The sample group may be one in which samples (G-PCC samples) in the G-PCC file are grouped based on one or more temporal levels. The receiving apparatuses 20 and 1700 may extract one or more samples belonging to a target temporal level from among the samples (G-PCC samples) in the G-PCC file (S3720). Specifically, the reception devices 20 and 1700 may decapsulate or extract samples belonging to a target temporal level based on the information on the sample group and/or the information on temporal levels. Here, the target temporal level may be a desired temporal level. In some embodiments, step S3720 may include determining whether one or more temporal levels are present, determining whether a desired temporal level and/or a desired frame rate is available when one or more temporal levels are present, and/or a, and extracting samples in a sample group belonging to the desired temporal level when the desired temporal level and/or the desired frame rate are available. Steps S3710 (and/or step of parsing the sample entry) and S3720 may be performed by one or more of the decapsulation processing unit 22, the decapsulation processing unit 1710, and/or the signaling processing unit 1715. In some embodiments, the reception devices 20 and 1700 may perform step of determining the temporal level of the samples in the G-PCC file based on the information on the sample group and/or the information on the temporal levels between step S3710 and step S3720.

Sample Grouping

As a method for supporting temporal scalability, there may be a sample grouping method and a track grouping method. The sample grouping method may be a method of grouping samples in a G-PCC file according to a temporal level, and the track grouping method may be a method of grouping tracks in a G-PCC file according to a temporal level. Hereinafter, the present disclosure will be described focusing on a device and methods supporting temporal scalability based on the sample grouping method.

A sample group may be used to associate samples and a temporal level designated thereto with each other. That is, the sample group may indicate which sample belongs to which temporal level. Also, the sample group may be information on a result of grouping one or more samples into one or more temporal levels. The sample group may be referred to as a 'tele' sample group or a temporal level sample group 'tele'.

Information on Sample Group

The information on the sample group may include information on a result of sample grouping. Accordingly, the information on the sample group may be information for use in associating samples and a temporal level designated thereto with each other. That is, the information on the sample group may indicate which sample belongs to which temporal level, and may be information on a result of grouping one or more samples into one or more temporal levels.

The information on the sample group may be present in tracks containing a geometric data unit. In the case where G-PCC data is carried in multiple tracks, the information on the sample group may be present only in the geometry track to group each sample in the track to a designated temporal level. Samples in attribute tracks can be inferred based on their relationship with the geometry track associated therewith. For example, samples in attribute tracks may belong to the same temporal level as samples in a geometry track associated therewith.

When the information on the sample group is present in the G-PCC tile track referenced by the G-PCC tile base track, the information on the sample group may be present in the rest tile track referenced by the G-PCC tile base track. Here, the G-PCC tile track may be a volumetric visual track carrying all G-PCC components or a single G-PCC component corresponding to one or more G-PCC tiles. Also, the G-PCC tile base track may be a volumetric visual track carrying all parameter sets and tile inventory corresponding to the G-PCC tile track.

Information on Temporal Level

In order to explain the temporal scalability supported by the G-PCC file, information on the temporal level may be signaled. The information on the temporal level may be present in a sample entry of a track including a sample group (or information on a sample group). For example, information on the temporal level may be present in GPCCDecoderConfigurationRecord ( ) or in a G-PCC scalability information box (GPCCScalabilityInfoBox) signaling scalability information of a G-PCC track.

As expressed in the syntax structure below, the information on the temporal level includes one or more of number information (e.g., num_temporal_levels), temporal level identification information (e.g., level_idc) and/or information on the frame rate. In addition, the information on the frame rate may include frame rate information (e.g., avg_frame_rate) and/or frame rate presence information (e.g., avg_frame_rate_present_flag).

```
aligned(8) class GPCCDecoderConfigurationRecord {
    unsigned int(8) configurationVersion = 1;
    unsigned int(8) profile_idc;
    unsigned int(24)profile_compatibility_flags;
    unsigned int(3) num_temporal_levels;
    unsigned int(1) avg_frame_rate_present;
    bit(4)                 reserved = '1111'b;
    for (i=0; i = = 0 || i< num_temporal_levels; i++) {
        unsigned int(8) level_idc[ i ];
        if (avg_frame_rate_present)
            unsigned int(16)avg_frame_rate[ i ];
    }
    unsigned int(8) numOfSetupUnits;
    for (i=0; i<numOfSetupUnits; i++) {
        tlv_encapsulation  setupUnit;   //as defined in
    }
    // additional fields
}
```

(1) Number Information

The number information may indicate the number of temporal levels. For example, when the value of num_temporal_levels is greater than a first value (e.g., 1), the value of num_temporal_levels may indicate the number of temporal levels. In some embodiments, the number information may further indicate whether samples in the G-PCC file are temporally scalable. For example, when the value of num_temporal_levels is equal to the first value (e.g., 1), this may indicate that temporal scalability is not possible (temporal scalability is not supported). As another example, when the value of num_temporal_levels is less than the first value (e.g., 1) (e.g., 0), this may indicate that whether temporal scalability is possible is not known. In summary, when the value of num_temporal_levels is equal to or less than the first value (e.g., 1), the value of num_temporal_levels may indicate whether the value of num_temporal_levels is temporally scalable.

(2) Temporal Level Identification Information

The temporal level identification information may indicate a temporal level identifier (or level code) for the track. That is, the temporal level identification information may indicate temporal level identifiers of samples in the track. In some embodiments, when the value of num_temporal_levels is equal to or less than the first value (e.g., 1), the temporal level identification information may indicate level codes of samples in the G-PCC file. The temporal level identification information may be generated by the number of temporal levels indicated by the number information in step S3620, and may be acquired by the number of temporal levels indicated by the number information in step S3710. For example, as i increases by 1 from 0 to 'num_temporal_levels-1', the temporal level identification information may be generated/acquired.

(3) Information on Frame Rate

As described above, the information on the frame rate may include frame rate information (e.g., avg_frame_rate) and/or frame rate presence information (e.g., avg_frame_rate_present_flag).

The frame rate information may indicate the frame rate of temporal levels. For example, the frame rate information may indicate a frame rate of temporal levels in units of frames, and the frame rate indicated by the frame rate information may be an average frame rate. In some embodiments, when the value of avg_frame_rate is equal to a first value (e.g., 0), it may indicate an unspecified average frame rate. Frame rate information may be generated by the number of temporal levels indicated by the number information, and may be obtained by the number of temporal levels indicated by the number information. For example, the frame rate information may be generated/acquired while i increases by 1 from 0 to 'num_temporal_levels-1'

The frame rate presence information may indicate whether frame rate information is present (i.e., whether frame rate information is signaled). For example, when the value of avg_frame_rate_present_flag is equal to a first value (e.g., 1), it may indicate that frame rate information is present, and when the value of avg_frame_rate_present_flag is equal to a second value (e.g., 0), it may indicate that the frame rate information is not present.

Figure 38:
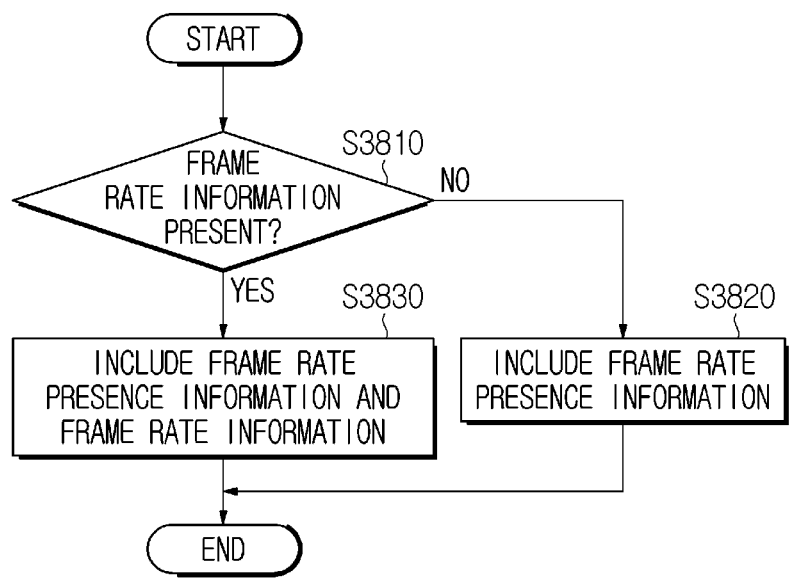
FIGS. 38 and 39 are flowcharts illustrating an example of determining signaling and acquisition of frame rate information.
Figure 39:
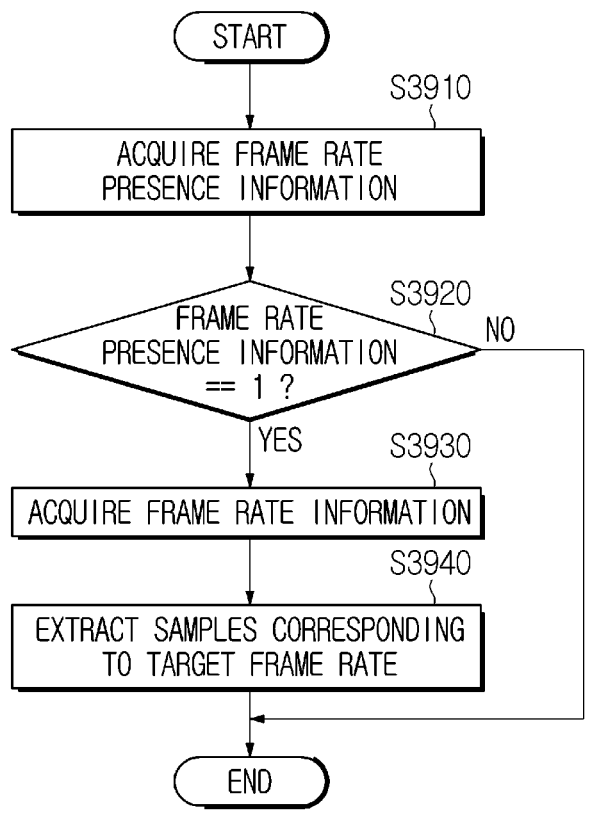

The frame rate information may be signaled regardless of the value of the frame rate presence information. In some embodiments, whether to signal the frame rate information may be determined according to a value of the frame rate presence information. FIGS. 38 and 39 are flowcharts for explaining an example in which whether frame rate information is signaled according to a value of frame rate presence information is determined.

Referring to FIG. 38, the transmission devices 10 and 1500 may determine whether frame rate information is present (S3810). When frame rate information is not present, the transmission devices 10 and 1500 may include only frame rate presence information in information on temporal levels. That is, when frame rate information is not present, the transmission devices 10 and 1500 may signal only frame rate presence information. In this case, the value of avg_frame_rate_present_flag may be equal to a second value (e.g., 0). In contrast, when frame rate information is present, the transmission devices 10 and 1500 may include frame rate presence information and frame rate information in information on temporal levels (S3830). That is, when frame rate information is present, the transmission devices 10 and 1500 may the signal frame rate presence information and the frame rate information. In this case, the value of avg_frame_rate_present_flag may be equal to a first value (e.g., 1). Steps S3810 to S3830 may be performed by one or more of the encapsulation processing unit 13, the encapsulation processing unit 1525, and/or the signaling processing unit 1510.

Referring to FIG. 39, the reception devices 20 and 1700 may acquire frame rate presence information (S3910). In addition, the reception devices 20 and 1700 may determine a value indicated by the frame rate presence information (S3920). When the value of avg_frame_rate_present_flag is equal to a second value (e.g., 0), the reception devices 20 and 1700 may end step of acquiring information on the frame rate without acquiring frame rate information. On the contrary, when the value of avg_frame_rate_present_flag is equal to a first value (e.g., 1), the reception devices 20 and 1700 may acquire frame rate information (S3930). The reception devices 20 and 1700 may extract samples corresponding to a target frame rate from among the samples in the G-PCC file (S3940). Here, the 'samples corresponding to the target frame rate' may be a temporal level or track having a frame rate corresponding to the target frame rate. In addition, the 'frame rate corresponding to the target frame rate' may include not only a frame rate having the same value as the target frame rate but also a frame rate having a value less than the value of the target frame rate. Steps S3910 to S3940 may be performed by one or more of the decapsulation processing unit 22, the decapsulation processing unit 1710, and/or the signaling processing unit 1715. In some embodiments, step of determining the frame rate of temporal levels (or tracks) based on frame rate information may be performed between steps S3930 and S3940.

As such, when whether or not to signal the frame rate information is determined according to the value of the frame rate presence information, bits for signaling the frame rate information are reduced, thereby increasing bit efficiency. For example, a particular file parser or player (e.g., a reception device) may use frame rate information, but other file parsers or players may not want to or may not use the frame rate information. If the G-PCC file is reproduced by the file parser or player which does not want to use frame rate information or does not use frame rate information, the value of frame rate presence information is set to a second value (e.g., 0), thereby increasing efficiency of bits for signaling frame rate information.

2. Embodiment 2

The embodiment 2 is an embodiment in which a condition for 'smallest composition time difference between consecutive samples' is added to the embodiment 1.

If temporal scalability is used or activated for a G-PCC file, the coded frames of the G-PCC bitstream may be aligned at different temporal levels. Also, different temporal levels may be stored in different tracks. Also, the frame rate of each temporal level (or each track) may be determined based on the frame rate information.

For example, samples are arranged in three temporal levels (temporal level 0, temporal level 1 and temporal level 2), and each temporal level may be stored in one track so that three tracks (track 0, track 1 and track 2) can be configured. In this case, the file parser or player (e.g., the reception device) may easily determine what the frame rate is when only track 0 is played, or what the frame rate is when track 0 and track 1 are played together. A file parser or player (e.g., a reception device) may select a track to be played when a target frame rate is given. For example, if the target frame rate is 60 fps in a state in which temporal level 0 is associated with a frame rate of 30 fps, temporal level 1 is associated with a frame rate of 60 fps and temporal level 2 is associated with 120 fps, it may be easily determined that the file parser or player shall play track 0 and track 1 together.

On the other hand, if samples having a higher temporal level (or a track associated with a higher temporal level) are associated with a larger frame rate, the complexity and size of the track may increase as file playback proceeds at the higher temporal level. That is, if samples having a certain temporal level (or a track associated with an arbitrary temporal level) have double the frame rate (double the number of frames) compared to the track having the immediately lower temporal level, as the temporal level of a track to be played increases, the complexity for playback may increase many times.

Therefore, for smooth and gradual playback, it may be necessary to limit a difference in frame rate of each track. The constraint that a distance between two different frames within each track (i.e., a composition time difference) shall be the same no matter which track(s) is selected for playback may be an ideal condition for smooth, gradual playback. However, since this condition may occur under an ideal situation, realistic constraints for smooth and gradual playback may be required in a practical situation where the ideal situation may not occur.

The present disclosure proposes a constraint that a smallest time difference between consecutive samples (frames) of each of the tracks for playback may be equal to each other.

Specifically, assuming that the temporal levels include a 'first temporal level' and a 'second temporal level having a level value greater than the first temporal level', the 'smallest time difference between consecutive samples in the second temporal level' may be equal to the 'smallest time difference between consecutive samples in the first temporal level' or greater than the 'smallest time difference between consecutive samples in the first temporal level'. That is, the 'smallest time difference between consecutive samples in the second temporal level' may be greater than or equal to the 'smallest time difference between consecutive samples in the first temporal level'.

When such a constraint is applied, it is possible to prevent a very large number of frames from being included in a temporal level having a relatively high value compared to a temporal level having a relatively low value, so that an increase in complexity for playback is reduced and a smooth and gradual playback may be possible.

3. Embodiment 3

A embodiment 3 is an embodiment in which redundant signaling of information on temporal levels is prevented, based on the embodiment 1 and/or the embodiment 2.

As described above, a sample group (or information on a sample group) may be present in tracks including a geometric data unit, and information on a temporal level may be present in a sample entry of a track including a sample group (or information on a sample group). That is, information on the temporal level may be present only in a track including a geometry track. Also, samples in attribute tracks can be inferred based on their relationship with the geometry track associated therewith. Accordingly, signaling information on a temporal level even for a track that does not include a geometry track may cause a problem of redundant signaling.

The following syntax structure is a syntax structure according to the embodiment 3.

```
aligned(8) class GPCCDecoderConfigurationRecord {
    unsigned int(8) configurationVersion = 1;
    unsigned int(8) profile_idc;
    unsigned int(24)profile_compatibility_flags;
    unsigned int(1) multiple_temporal_level_tracks_flag;
    unsigned int(1) frame_rate_present_flag;
    unsigned int(3) num_temporal_levels;
    bit(3)          reserved = 0;
    for(i=0; i < num_temporal_levels; i++){
        unsigned int(8) level_idc;
        unsigned int(16)temporal_level_id;
        if (frame_rate_present_flag)
            unsigned int(16)frame_rate;
    }
    unsigned int(8) numOfSetupUnits;
    for (i=0; i<numOfSetupUnits; i++) {
        tlv_encapsulation setupUnit;  //as defined in ISO/IEC 23090-9
    }
    //additional fields
}
```

In the above syntax structure, multiple_temporal_level_tracks_flag is a syntax element included in information on temporal levels, and may indicate whether multiple temporal level tracks are present in the G-PCC file. For example, when the value of multiple_temporal_level_tracks_flag is equal to a first value (e.g., 1), it may indicate that G-PCC bitstream frames are grouped into multiple temporal level tracks, and, when the value of multiple_temporal_level_tracks_flag is equal to a second value (e.g., 2), it may indicate that all temporal level samples are present in a single track. 'When the type (gpcc_data) of component carried by the current track is an attribute' and/or 'if the current track is a track having a predetermined sample entry type (e.g., 'gpc1' and/or 'gpcg'), multiple_temporal_level_tracks_flag may not be signaled. In this case, a value of multiple_temporal_level_tracks_flag may be the same as a corresponding syntax element (information on temporal levels) in a geometry track referenced by the current track.

frame_rate_present_flag is frame rate presence information, and its meaning may be as described above. 'When the type (gpcc_data) of component carried by the current track is an attribute' and/or 'if the current track is a track having a predetermined sample entry type (e.g., 'gpc1' and/or 'gpcg'), the frame_rate_present_flag may not be signaled. In this case, the value of frame_rate_present_flag may be the same as the corresponding syntax element (information on temporal levels) in the geometry track referenced by the current track.

num_temporal_levels is number information and may indicate a maximum number of temporal levels in which G-PCC bitstream frames are grouped. When information on temporal levels is not available or all frames are signaled with a single temporal level, the value of num_temporal_levels may be set to 1. The minimum value of num_temporal_levels may be 1. 'If the type (gpcc_data) of component carried by the current track is an attribute' and/or 'if the current track is a track having a predetermined sample entry type (e.g., 'gpc1' and/or 'gpcg'), num_temporal_levels may not be signaled. In this case, the value of num_temporal_levels may be the same as a corresponding syntax element (information on temporal levels) in the geometry track referenced by the current track.

Figure 40:
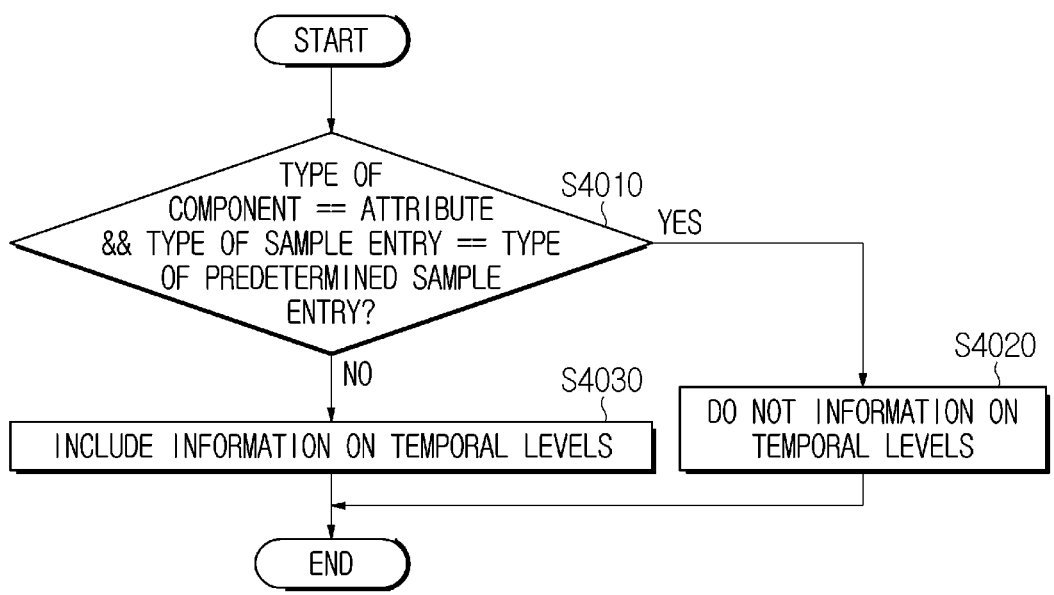
FIGS. 40 and 41 are flowcharts illustrating an embodiment capable of preventing the problem of redundant signaling.
Figure 41:
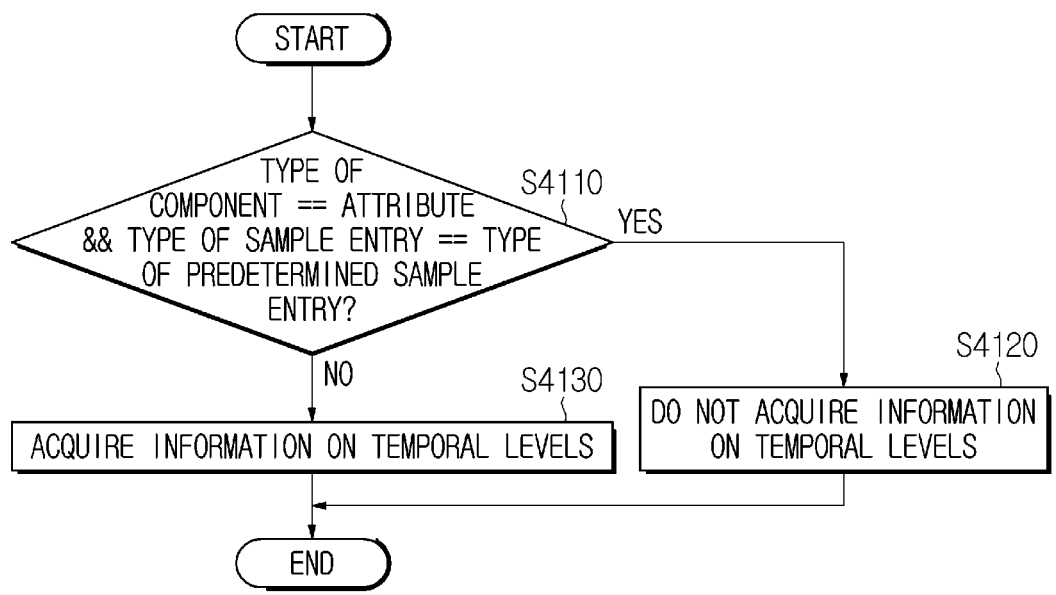

FIGS. 40 and 41 are flowcharts illustrating a method capable of preventing the problem of redundant signaling.

Referring to FIG. 40, the transmission devices 10 and 1500 may determine the type of the component carried by the current track (the type of the component of the current track) (S4010). The component type may be determined according to the value of gpcc_type and Table 4 below.

TABLE 4

| G-PCC Component Type | |
| --- | --- |
| gpcc_type value | Description |
| 1 | Reserved |
| 2 | Geometry Data |
| 3 | Reserved |
| 4 | Attribute Data |
| 5 . . . 31 | Reserved. |

When the type of the component carried by the current track is an attribute (or attribute data) (gpcc_type==4), the transmission devices 10 and 1500 may not include information on temporal levels (S4020). That is, when the type of the component carried by the current track is an attribute, the transmission devices 10 and 1500 may not signal information on temporal levels. In this case, one or more values of multiple_temporal_level_tracks_flag, frame_rate_present_flag and/or frame_rate_present_flag may be the same as a corresponding syntax element (information on temporal levels) in a geometry track referenced by the current track. On the contrary, when the type of the component carried by the current track is an attribute, the transmission devices 10 and 1500 may include information on temporal levels (S4030). That is, when the type of the component carried by the current track is an attribute, the transmission devices 10 and 1500 may signal information on temporal levels. Steps S4010 to S4030 may be performed by one or more of the encapsulation processing unit 13, the encapsulation processing unit 1525, and/or the signaling processing unit 1510.

In some embodiments, in step S4010, the transmission devices 10 and 1500 may further determine the type of the sample entry of the current track. If the type of the component carried by the current track is an attribute and the current track is a track having a predetermined sample entry type (e.g., 'gpc1' and/or 'gpcg'), the transmission devices 10 and 1500 may not include (signal) information on temporal levels (S4020). In this case, one or more values of multiple_temporal_level_tracks_flag, frame_rate_present_flag and/or frame_rate_present_flag may be the same as a corresponding syntax element (information on temporal levels) in a geometry track referenced by the current track. Conversely, if the type of component carried by the current track is not an attribute, or if the current track is not a track having a predetermined sample entry type (e.g., 'gpc1' and/or 'gpcg'), the transmission devices 10 and 1500 may include (signal) information on temporal levels (S4030).

Referring to FIG. 41, the reception devices 20 and 1700 may determine the type of the component carried by the current track (S4110). The type of the component may be determined according to the value of gpcc_type and Table 4 above.

When the type of the component carried by the current track is an attribute, the reception devices 20 and 1700 may not acquire information on temporal levels (S4120). In this case, one or more values of multiple_temporal_level_tracks_flag, frame_rate_present_flag, and/or frame_rate_present_flag may be set to be the same as a corresponding syntax element (information on temporal levels) in a geometry track referenced by the current track. On the contrary, when the type of the component carried by the current track is not an attribute, the reception devices 20 and 1700 may acquire information on temporal levels (S4130). Steps S4110 to S4130 may be performed by one or more of the decapsulation processing unit 22, the decapsulation processing unit 1710, and/or the signaling processing unit 1715.

In some embodiments, in step S4110, the reception devices 20 and 1700 may further determine the type of the sample entry of the current track. If the type of component carried by the current track is an attribute and the current track is a track having a predetermined sample entry type (e.g., 'gpc1' and/or 'gpcg'), the reception devices 20 and 1700 may not acquire information on the temporal levels (S4120). In this case, one or more values of multiple_temporal_level_tracks_flag, frame_rate_present_flag and/or frame_rate_present_flag may be set to be the same as a corresponding syntax element (information on temporal levels) in a geometry track referenced by the current track. Conversely, if the type of component carried by the current track is not an attribute or if the current track is not a track having a predetermined sample entry type (e.g., 'gpc1' and/or 'gpcg'), the reception devices 20 and 1700 may acquire information on temporal levels (S4130).

The scope of the present disclosure includes software or machine-executable instructions (e.g., operating system, application, firmware, program, etc.) that cause operation according to the method of various embodiments to be executed on a device or computer, and anon-transitory computer-readable medium in which such software, instructions and the like are stored and executable on a device or computer.

INDUSTRIAL APPLICABILITY

Embodiments according to the present disclosure may be used to provide point cloud content. Also, embodiments according to the present disclosure may be used to encode/decode point cloud data.

The invention claimed is:

1. A method performed by a reception device of point cloud data, the method comprising:
   obtaining geometry-based point cloud compression (G-PCC) file including the point cloud data; and
   wherein the G-PCC file includes information on a sample group in which samples in the G-PCC file are grouped based on one or more temporal levels, and
   wherein the G-PCC file further includes information on the temporal levels,
   extracting one or more samples belonging to a target temporal level from the samples in the G-PCC file based on the information on the sample group and the information on the temporal levels,
   wherein the information on the temporal levels comprises number information indicating a number of temporal levels and temporal level identification information for identifying the temporal levels.

2. The method of claim 1, wherein the number information further indicates temporal scalability of the samples in the G-PCC file.

3. The method of claim 2,
   wherein the number information indicates the number of temporal levels based on a value of the number information being greater than a first value, and
   wherein the number information indicates temporal scalability of the samples in the G-PCC file based on the value of the number information being equal to or less than the first value.

4. The method of claim 1, wherein, based on the G-PCC file being carried by multiple tracks the information on the sample group is present in a geometry track carrying geometry data of the point cloud data among the multiple tracks.

5. The method of claim 4,
   wherein a temporal level of one or more samples present in an attribute track is equal to a temporal level of a corresponding sample in the geometry track, and
   wherein the attribute track carries attribute data of the point cloud data among the multiple tracks.

6. The method of claim 1,
   wherein the information on the temporal levels comprises frame rate information indicating a frame rate of the temporal levels, and
   wherein the extracting comprises extracting one or more samples corresponding to a target frame rate among the samples in the G-PCC file.

7. The method of claim 6,
   wherein the information on the temporal levels comprises frame rate presence information indicating whether the frame rate information is present, and
   wherein the frame rate information is included in the information on the temporal levels based on the frame rate presence information indicating the presence of the frame rate information.

8. The method of claim 6,
   wherein the temporal levels comprise a first temporal level and a second temporal level having a level value greater than the first temporal level,
   a smallest composition time difference between consecutive samples in the second temporal level is equal to a smallest composition time difference between consecutive samples in the first temporal level or is greater than the smallest composition time difference between the consecutive samples in the first temporal level.

9. The method of claim 1, wherein the information on the temporal levels has the same value as corresponding information in a geometry track referenced by the current track based on the type of a component carried by the current track being an attribute of the point cloud data.

10. The method of claim 9, wherein the information on the temporal levels has the same value as corresponding information in a geometry track referenced by the current track based on the type of the component being the attribute of the point cloud data and a type of a sample entry of the current track being a predetermined sample entry type.

11. The method of claim 10, wherein the predetermined sample entry type comprises one or more of a gpc1 sample entry type or a gpcg sample entry type.

12. A reception device of point cloud data, the reception device comprising:
   a memory; and
   at least one processor,
   wherein the at least one processor is configured to:
   obtain geometry-based point cloud compression (G-PCC) file including the point cloud data, and
      wherein the G-PCC file includes information on a sample group in which samples in the G-PCC file are grouped based on one or more temporal levels, and
   wherein the G-PCC file further includes information on the temporal levels,
   extract one or more samples belonging to a target temporal level from the samples in the G-PCC file based on the information on the sample group and the information on the temporal levels,
   wherein the information on the temporal levels comprises number information indicating a number of temporal levels and temporal level identification information for identifying the temporal levels.

13. A method performed by a transmission device of point cloud data, the method comprising:
   generating information on a sample group in which geometry-based point cloud compression (G-PCC) samples are grouped based on one or more temporal levels, and
   generating a G-PCC file including the information on the sample group, the information on the temporal levels and the point cloud data,
   wherein the information on the temporal levels comprises number information indicating a number of temporal levels and temporal level identification information for identifying the temporal levels.

14. A transmission device of point cloud data, the transmission device comprising:
   a memory; and
   at least one processor,
   wherein the at least one processor is configured to:
   generate information on a sample group in which geometry-based point cloud compression (G-PCC) samples are grouped based on one or more temporal levels, and
   generate a G-PCC file including the information on the sample group, the information on the temporal levels and the point cloud data,
   wherein the information on the temporal levels comprises number information indicating a number of temporal levels and temporal level identification information for identifying the temporal levels.

* * * * *